United States Patent [19]
Kokuryo et al.

[11] 3,991,139
[45] Nov. 9, 1976

[54] HIGH HEAT STABILITY COMPOSITION OF RING-OPENING POLYMERIZATION PRODUCT

[75] Inventors: Shiro Kokuryo, Yokohama; Hiroyasu Kawahara; Hiroshi Akiyama, both of Kawasaki; Takashi Ueshima, Yokohama; Chutatsu Tsuge, Tokyo, all of Japan

[73] Assignee: Showa Denko Kabushiki Kaisha, Tokyo, Japan

[22] Filed: Apr. 22, 1975

[21] Appl. No.: 570,425

[30] Foreign Application Priority Data
Apr. 23, 1974  Japan................. 49-45051

[52] U.S. Cl................... 260/897 A; 260/45.7 PH; 260/45.85 S; 260/45.85 B; 260/45.9 NC; 260/45.95 C; 260/45.95 D; 260/45.95 R; 260/897 C
[51] Int. Cl.$^2$...................... C08K 5/53; C08K 5/36; C08K 5/20; C08K 5/13
[58] Field of Search................. 260/45.85 S, 45.7 P, 260/45.9 R, 45.95, 93.1, 89.3, 45.8 R, 897 A, 897 C, 45.95 B

[56] References Cited
UNITED STATES PATENTS

| | | | |
|---|---|---|---|
| 3,039,993 | 6/1962 | Friedman | 260/45.8 R |
| 3,367,924 | 2/1968 | Rinehart | 260/89.3 |
| 3,557,062 | 1/1971 | Vergne et al. | 260/89.3 |
| 3,597,403 | 8/1971 | Ofstead | 260/93.1 |
| 3,636,022 | 1/1972 | Bright | 260/45.75 N |
| 3,684,781 | 8/1972 | Nützel et al. | 260/93.1 |
| 3,798,175 | 3/1974 | Streck et al. | 260/93.1 |
| 3,804,803 | 4/1974 | Streck et al. | 260/93.1 |
| 3,817,964 | 6/1974 | Schön et al. | 260/93.1 |
| 3,883,495 | 5/1975 | Maertens et al. | 260/93.1 |

*Primary Examiner*—V.P. Hoke
*Attorney, Agent, or Firm*—Carroll F. Palmer

[57] ABSTRACT

High stability composition of ring-opening polymerization product which is formed of (A) 100 parts by weight of at least one ring-opening polymerization product selected from the group consisting of (a) ring-opening polymerization homopolymers of norbornene derivatives containing at least one cyano group, (b) ring-opening polymerization homopolymers of norbornene derivatives containing at least one ester group, (c) ring-opening polymerization homopolymers of norbornene derivatives containing at least one ether group, (d) ring-opening polymerization homopolymers containing at least one N-substituted cyclic imide group, (e) ring-opening polymerization interpolymers of the above-mentioned types of norbornene derivatives, and (f) other ring-opening polymerization copolymers obtained by the ring-opening copolymerization of said various types of norbornene derivatives and 50 mol% at most of other unsaturated cyclic compounds; and (B) 0.01 to 10.0 parts by weight of specified phenolic compounds.

32 Claims, No Drawings

HIGH HEAT STABILITY COMPOSITION OF RING-OPENING POLYMERIZATION PRODUCT

This invention relates to a composition of ring-opening polymerization product, and more particularly to the type of high heat stability.

A product prepared by the ring-opening polymerization of 5-cyano-bicyclo[2,2,1]-heptene-2 using a catalyst consisting of compounds of tungsten and/or molybdenum and organic aluminium compounds or both types of compounds and a third component not only has a greater impact strength than polyvinyl chloride resin (PVC) and polypropylene resin (PP), and such tensile strength and hardness as are well comparable with those of PVC and higher than those of PP, but also generally displays high heat resistance (namely, has a high glass transition temperature). Therefore, this ring-opening polymerization product is known to be available for high temperature application (refer to the Japanese Pat. application No. 31755/72).

Further, a group of the present inventors previously found that it was possible to provide a novel type of polymer by the ring-opening polymerization of a norbornene derivative which was a different type from 5-cyano-bicyclo[2,2,1]- heptene-2 and contained at least one nitrile group or a substituent including said nitrile group, in the presence of the catalytic system disclosed in the above-mentioned Japanese Pat. application No. 31755/72 (refer to the Japanese Pat. application No. 108902/72).

The same group of joint inventors also found that it was possible to produce another novel type of polymer by the ring-opening polymerization of a norbornene derivative containing at least one ester group or a substituent including said ester group (ester type norbornene derivative) by using the catalytic system set forth in the above-mentioned Japanese Pat. application No. 31755/72 (refer to the Japanese Pat. application No. 119785/72).

Moreover, said group of joint inventors further found that it was possible to prepare other novel useful polymers by the ring-opening polymerization of a norbornene derivative containing at least one ether group or a substituent including said ether group (ether type norbornene derivative) and other norbornene derivative containing at least one N-substituted cyclic imide group (imide type norbornene derivative) by using the catalytic system described in the aforesaid Japanese Pat. application No. 31755/72 which consisted of compounds of tungsten and/or molybdenum and organic aluminium compounds or both types of compounds and a third component (refer to the Japanese Pat. applications Nos. 119968/73 and 123329/73).

Like the first mentioned product prepared by the ring-opening polymerization of 5-cyano-bicyclo[2,2,1]-heptene-2, the similar products later proposed by said group of joint inventors not only have more excellent mechanical properties such as impact strength and impact strength at low temperature and higher transparency than polyvinyl chloride resin and polypropylene resin manufactured on an industrial scale and now widely accepted, but also display good moldability and in consequence can be made into various forms, for example, containers and films by the molding processes widely accepted in the field of synthetic resins, such as injection molding, extrusion molding and press molding.

However, a composition solely or mainly consisting of these ring-opening polymerization products has to be molded into articles at a relatively high temperature. Such high temperature molding causes the product to be partly deteriorated by heat and atmospheric oxygen and also undesirably colored. Further, when used long, the product is similarly deteriorated by atmospheric oxygen and colored.

It is accordingly the object of this invention to provide a composition of ring-opening polymerization product which is saved from the drawbacks accompanying the prior art and displays a prominent stability to oxygen and heat.

This object is attained by providing a composition which is formed of 100 parts by weight of (A) at least one ring-opening polymerization product selected from the group consisting of (a) a ring-opening polymerization homopolymer of a norbornene derivative containing at least one cyano group, (b) a ring-opening polymerization homopolymer of a norbornene derivative containing at least one ester group, (c) a ring-opening polymerization homopolymer of a norbornene derivative containing at least one ether group, (d) a ring-opening polymerization homopolymer of a norbornene derivative containing at least one N-substituted cyclic imide group, (e) a ring-opening polymerization interpolymers of the above-listed various norbornene derivatives, and (f) a ring-opening polymerization copolymer obtained by said various types of norbornene derivatives and 50 percent at most of other unsaturated cyclic compound; and (B) 0.01 to 10.0 parts by weight of at least one selected from the group consisting of phenolic compounds expressed by any of the following formulas:

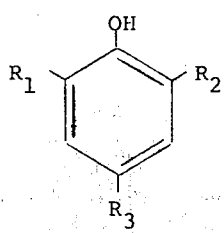 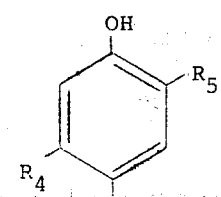 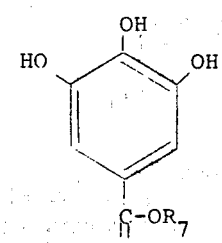

-continued

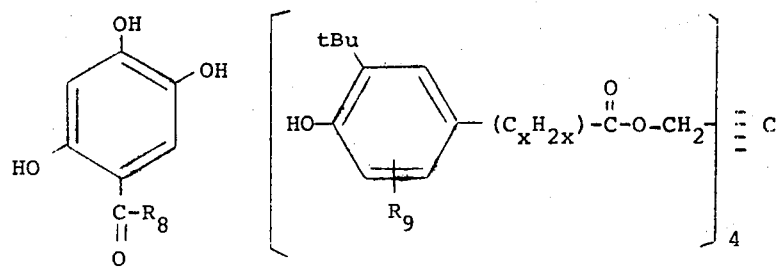

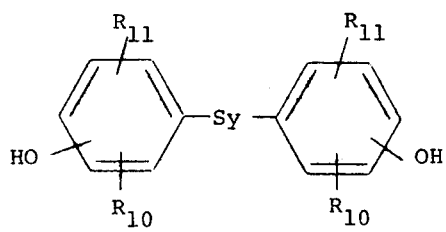

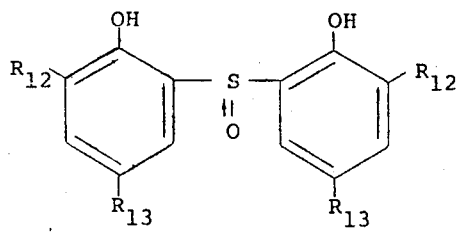

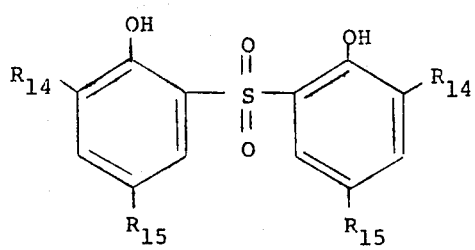

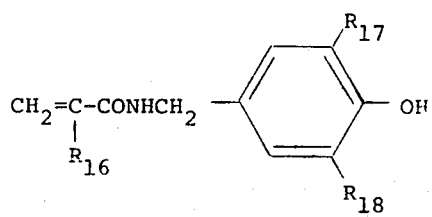

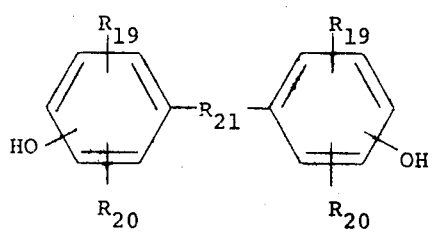

Where:
$R_1, R_2, R_3, R_4, R_5$ = hydrogen atom or hydrocarbon radicals selected from the group consisting of an alkyl radical having 1 to 20 carbon atoms, cycloalkyl radical having 4 to 20 carbon atoms, 1-alkylcycloalkyl radical containing an alkyl radical having 1 to 20 carbon atoms, and 1-alkylbenzyl radical containing an alkyl radical having 1 to 20 carbon atoms at least two of $R_1, R_2, R_3$ = hydrocarbon radicals at least one of $R_4, R_5$ = hydrocarbon radical $R_6, R_7, R_8$ = alkyl radicals each having 1 to 20 carbon atoms $R_9$ = alkyl radical having 1 to 6 carbon atoms $R_{10}, R_{11}$ = hydrogen atom or hydrocarbon radicals selected from the group consisting of an alkyl radical having 1 to 20 carbon atoms, cycloalkyl radical having 4 to 20 carbon atoms, alkyl-substituted cycloalkyl radical having 5 to 20 carbon atoms and aralkyl radical having 7 to 20 carbon atoms or alkoxy radical having 1 to 20 carbon atoms at least one of $R_{10}$, $R_{11}$ = hydrocarbon radical $R_{12}$, $R_{13}$, $R_{14}$, $R_{15}$ = hydrogen atom or hydrocarbon radicals selected from the group consisting of an alkyl radical having 1 to 20 carbon atoms, aryl radical having 6 to 20 carbon atoms, cycloalkyl radical having 4 to 20 carbon atoms and aralkyl radical having 7 to 20 carbon atoms $R_{16}$ = hydrogen atom or methyl radical $R_{17}$, $R_{18}$ = alkyl radical having 1 to 4 carbon atoms $R_{19}$, $R_{20}$ = hydrogen atom, alkyl radicals having 1 to 12 carbon atoms, cycloalkyl radicals having 4 to 20 carbon atoms, aryl radical having 6 to 20 carbon atoms, 1-alkylcycloalkyl radical containing an alkyl radical having 1 to 12 carbon atoms or 1-alkylbenzyl radical containing an alkyl radical having 1 to 12 carbon atoms $R_{21}$ = alkylidene radical having 2 to 12 carbon atoms or alkylene radical having 2 to 12 carbon atoms x = integer of 1 to 6 y = integer of 1, 2 or 3

The (A) component of the composition of this invention may be replaced by a compound prepared by adding a resinous and/or rubber-like material to the ring-opening polymerization product.

The (A) and (B) components of the composition of this invention may further be blended with a component (C) consisting of 0.01 to 10.0 parts by weight of thioether of carboxylic ester expressed by the general formula:

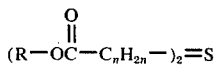

where:

R = a hydrocarbon radical selected from the group consisting of an alkyl radical having 1 to 20 carbon atoms, aryl radical having 6 to 20 carbon atoms and aralkyl radical having 7 to 20 carbon atoms n = integer of 1 to 20

It is further possible to mix the above-mentioned (A), (B) and (C) components with a component (D) formed of 0.01 to 10.0 parts by weight of one selected from the phosphite compounds expressed by the following general formulas:

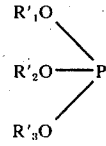

and

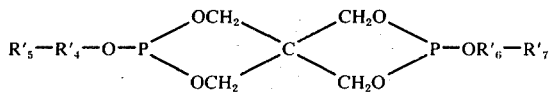

where:

$R'_1$, $R'_2$, $R'_3$ = alkyl radicals having 1 to 20 carbon atoms, cycloalkyl radical having 4 to 20 carbon atoms, aryl radical having 6 to 20 carbon atoms, aralkyl radical having 7 to 20 carbon atoms, alkoxy alkyl radical having 2 to 20 carbon atoms, or substituted or nonsubstituted phenyloxyalkyl radical having 7 to 20 carbon atoms $R'_4$, $R'_6$ = alkylene radicals having 1 to 20 carbon atoms, alkylidene radical having 2 to 20 carbon atoms or phenylene radical $R'_5$, $R'_7$ = hydrogen atom, alkyl radicals having 1 to 20 carbon atoms, aryl radical having 6 to 20 carbon atoms, aralkyl radical having 7 to 20 carbon atoms, alkaryl radical having 7 to 20 carbon atoms, aryl radical having 6 to 20 carbon atoms and containing a hydroxyl radical, aralkyl radical having 7 to 20 carbon atoms and containing a hydroxyl radical or alkaryl radical having 7 to 20 carbon atoms and containing a hydroxyl radical.

The above-mentioned (B), (C), (D) components do not mainly obstruct the transparency of the ring-opening polymerization product or a blend thereof constituting the (A) component, nor undesirably colorize said (A) component but are well compatible therewith. Therefore, these three (B), (C), (D) components save the ring-opening polymerization product from bleeding or blooming and even at relatively high temperatures stabilize said product and prevent it from decreasing in physical properties. Thus, the composition of this invention is a very useful product due to its prominent stability to oxygen and heat.

The ring-opening polymerization product used in the method of this invention is selected from the group consisting of (a) a ring-opening polymerization homopolymer of cyano-substituted norbornene derivatives, (b) a ring-opening polymerization homopolymer of ester type norbornene derivatives, (c) a ring-opening polymerization homopolymer of ether type norbornene derivatives, (d) a ring-opening polymerization homopolymer of imide type norbornene derivatives, (e) a ring-opening polymerization interpolymer of the abovelisted various norbornene derivatives and (f) a ring-opening polymerization copolymer obtained by said various types of norbornene derivatives and 50 mol% at most of other unsaturated cyclic compound. Obviously, these raw ring-opening polymerization or copolymerization products may be used alone or in combination.

The cyano-substituted norbornene derivatives derivative used as a monomer in preparing the above-mentioned ring-opening polymerization product contain at least one nitrile group or a substituent including said nitrile group at the positions of 5 and 6 of bicyclo[2,2,1]-heptent-2 as shown in the following general formula:

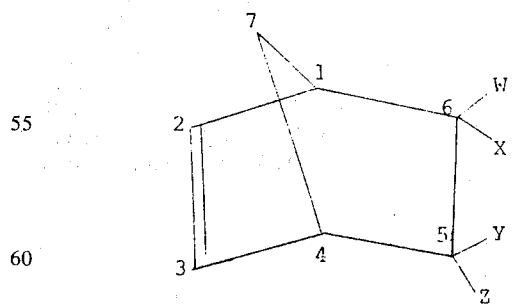

where:

W, X, Y, Z = the same or different ones selected from the group consisting of hydrogen atom, nitrile group, hydrocarbon radicals selected from alkyl radical having 1 to 20 carbon atoms, alkenyl radical having 2 to 20 carbon atoms, cycloalkyl radical having 4 to 20 carbon atoms, alkyl substituted cycloalkyl radical having 5 to 20 carbon atoms, aryl radical having 6 to 20 carbon atoms and aralkyl radical having 7 to 20 carbon atoms, and said hydrocarbon radicals substituted by the nitrile group, at least one of said W, X, Y and Z being a nitrile group or said hydrocarbon radicals substituted by the nitrile group.

The hydrocarbon radicals substituted by the nitrile group include a cyanomethyl radical, cyanoethyl radical, cyanopropyl radical, cyano-n-butyl radical, cyanoisobutyl radical and ω-cyano-n-heptyl radical. The hydrocarbon radicals include a methyl radical, ethyl radical, propyl radical, n-butyl radical, isobutyl radical, octyl radical, phenyl radical, cyclohexyl radical and 2-octenyl radical.

The above-mentioned cyano-substituted norbornene derivatives can be synthesized by the Diels-Alder reaction between cyclopentadiene and vinyl compounds containing a nitrile group or substituent including said nitrile group, for example, acrylonitrile, methacrylonitrile, vinylidene cyanide, and maleonitrile (refer to "Organic Reactions" by H. L. Holmes, Vol. 4, pp. 60 to 173, 1948, published by John Wiley and Sons, Inc.). Formation of said cyano-substituted norbornene derivatives is also attained by reacting dicyclopentadiene with the above-mentioned vinyl compounds. Typical among the cyano-substituted norbornene derivatives are 5-cyano-bicyclo[2,2,1]-heptent-2, 5-methyl-5-cyano-bicyclo[2,2,1]-heptent-2, 5-ehtyl-5-cyano-bicyclo[2,2,1]-heptent-2, 5-n-propyl-5-cyano-bicyclo[2,2,1]-hpetent-2, 5-n-butyll-5-cyano-bicyclo[2,2,1]-heptene-2, 5-isobutyl-5-cyano-bicyclo[2,2,1]-heptene-2, 5-n-octyl-5-cyano-bicyclo[2,2,1]-heptene-2, 5-phenyl-5-cyano-bicyclo[2,2,1]-heptene-2, 5-cyclohexyl-5-cyano-bicyclo[2,2,1]-heptene-2, 5-(2-octenyl)-5-cyano-bicyclo[2,2,1]-heptene-2, 5,5-dicyano-bicyclo[2,2,1]-heptene-2, 5,6-dicyano-bicyclo[2,2,1]-heptene-2, 5-methyl-6-cyano-bicyclo[2,2,1]-heptene-2, 5-ethyl-6-cyano-bicyclo[2,2,1]-heptene-2, 5-n-butyl-6-cyano-bicyclo[2,2,1]-heptent-2, 5-isobutyl-6-cyano-bicyclo[2,2,1]-heptene-2, 5-phenyl-6-cyano-bicyclo[2,2,1]-heptene-2, 5-cyanomethyl-bicyclo[2,2,1]-heptene-2, 5-cyanoethyl-bicyclo[2,2,1]-heptene-2, 5-(cyano-n-butyl)-bicyclo[2,2,1]-heptene-2, 5-(cyanoisobutyl)-bicyclo[2,2,1]-heptene-2, 5-(ω-cyano-n-heptyl)-bicyclo[2,2,1]-heptene-2, and 5-cyanophenyl-bicyclo[2,2,1]-heptene-2. In this case, the substituent is attached to the chain in the endo and exo positions.

The ester type norbornene derivative used as a monomer in preparing the ring-opening polymerization product applied in the method of this invention contains at least one ester group or substituent including said ester group at the 5 and 6 positions of bicyclo[2,2,1]-heptene-2, as shown in the following general formula:

where:

W, X, Y, Z = the same or different ones selected from the group consisting of hydrogen atom, ester group, hydrocarbon radicals selected from alkyl radical having 1 to 20 carbon atoms, alkenyl radical having 2 to 20 carbon atoms, cycloalkyl radical having 4 to 20 carbon atoms, alkyl substitutes cycloalkyl radical having 5 to 20 carbon atoms, aryl radical having 6 to 20 carbon atoms and aralkyl radical having 7 to 20 carbon atoms, and said hydrocarbon radicals substituted by the ester group, at least one of said W, X, Y and Z being an ester group or said hydrocarbon radicals substituted by the ester group.

The above-mentioned ester type norbornene derivatives can be synthesized by the Diels-Alder reaction between cyclopentadiene and vinyl compounds containing an ester group or substituent including said ester group (for example, methyl acrylate, methyl methacrylate, dimethyl maleate, hexyl crotonate, and vinyl acetate), and also between dicyclopentadiene and said vinyl compounds.

Typical among the ester type norbornene derivatives each are 5-methoxycarbonyl-bicyclo[2,2,1]-heptene-2, 5-ethoxycarbonyl-bicyclo[2,2,1]-heptene-2, 5-butoxycarbonyl-bicyclo[2,2,1]-heptene-2, 5-allyloxycarbonyl-bicyclo[2,2,1]-heptene-2, 5-methyl-5-methoxycarbonyl-bicyclo[2,2,1]-heptene-2, 5-hexyloxycarbonyl-6-methyl-bicyclo[2,2,1]-heptene-2, 5-ethoxycarbonyl-6-phenyl-bicyclo[2,2,1-heptene-2, 5-heptyl-6-octyloxycarbonyl-bicyclo[2,2,1]-heptene-2, 5-methoxycarbonyl-6-methoxycarbonylmethyl-bicyclo[2,2,1]-heptene-2, 5,6-dimethoxycarbonyl-bicyclo[2,2,1]-heptene-2, 5,6-diethoxycarbonyl-bicyclo[2,2,1]-heptene-2, 5,5-dibutoxycarbonyl-bicyclo[2,2,1]-heptene-2, 5-methyl-6,6-diemthoxycarbonyl-bicyclo[2,2,1]-heptent-2, 5-ω-methoxycarbonylheptyl-6-octyl-bicyclo[2,2,1]-heptene-2, 5-ω-methoxycarbonyl-2-decenyl-6-pentyl-bicyclo[2,2,1]-heptene-2, 5-ω-methoxycarbonylheptyl-6-2-octenyl-bicyclo[2,2,1]-heptene-2, 5-acetoxymethyl-bicyclo[,2,1]-heptene-2, 5-acetoxy-bicyclo[2,2,1]-heptene-2, 5-propionoxymethyl-bicyclo[2,2,1]-heptene-2, and 5-stearoxymethyl-bicyclo[2,2,1]-heptene-2. In this case, the substituent is attached to the chain in the endo and exo positions.

Ether type norbornene derivatives used as a monomer in preparing the ring-opening polymerization product applied in the method of this invention contain at least one ether group or substituent including said ether group at the 5 and 6 positions of bicyclo-[2,2,1]-heptene-2, as shown in the following general formula:

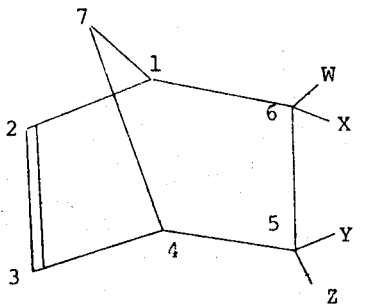
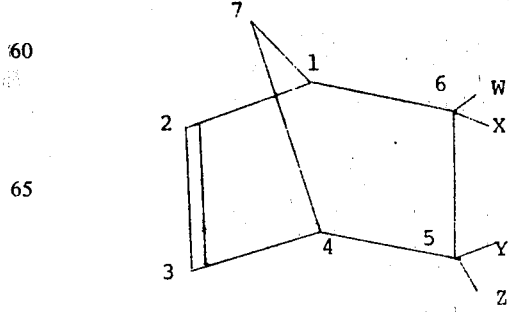

Where:
 W, X, Y, Z = the same or different ones selected from the group consisting of hydrogen atom, ether group, hydrocarbon radicals selected from alkyl radical having 1 to 20 carbon atoms, alkenyl radical having 2 to 20 carbon atoms, cycloalkyl radical having 4 to 20 carbon atoms, alkyl substituted cycloalkyl radical having 5 to 20 carbon atoms, aryl radical having 6 to 20 carbon atoms and aralkyl radical having 7 to 20 carbon atoms, and said hydrocarbon radicals substituted by the ether group, at least one of said W, X, Y and Z being an ether group or said hydrocarbon radicals substituted by the ether group.

The hydrocarbon radicals substituted by the ether group include a methoxy radical, ethoxy radical, propoxy radical, n-butoxy radical, isobutoxy radical, n-octyloxy radical, methoxy methyl radical, 2-methoxyethyl radical, phenoxy radical and benzyloxy radical. The hydrocarbon radicals include a methyl radical, ethyl radical, propyl radical, n-butyl radical, isobutyl radical, octyl radical, phenyl radical, cyclohexyl radical and 2-octenyl radical.

The above-mentioned ether type norbornene derivatives can be synthesized by the Diels-Alder reaction between cyclopentadiene and vinyl compounds containing an ether group or substituent including said ether group (for example, methylvinyl ether, n-butylvinyl ether, cyclohexylvinyl ether, allylmethyl ether, 1,3-dimethoxypropylene, and phenylvinyl ether), and also between dicyclopentadiene and said vinyl compounds.

Typical among the ether type norbornene derivatives are 5-methoxy-bicyclo[2,2,1]-heptene-2, 5-ethoxy-bicyclo[2,2,1]-heptene-2, 5-n-propoxy-bicyclo[2,2,1]-heptene-2, 5-isopropoxy-bicyclo[2,2,1]-heptene-2, 5-n-butoxy-bicyclo[2,2,1]-heptene-2, 5-cyclohexoxy-bicyclo[2,2,1]-heptene-2, 5-methoxymethyl-bicyclo[2,2,1]-heptene-2, 5-butoxymethyl-bicyclo[2,2,1]-heptene-2, 5-methoxy-6-methoxymethyl-bicyclo[2,2,1]-heptene-2, and 5-phenoxy-bicyclo[2,2,1]-heptene-2. In this case, the substituent is attached to the chain in the endo and exo positions as in the cyanosubstituted norbornene derivatives and ester type norbornene derivatives.

The imide type norbornene derivatives may be broadly divided into two types. One type is imide type norbornene derivatives obtained from those norbornene derivatives which contain a cyclic carboxylic anhydride group (hereinafter referred to as the "A-type imide type norbornene derivatives"). The other type is imide type norbornene derivatives obtained from norbornene derivatives containing an amino group and a cyclic acid anhydrides (hereinafter referred to as the "B-type imide type norbornene derivatives").

The A-type imide type norbornene derivatives can be prepared by reacting primary amines with the later described norbornene derivatives containing an acid anhydride group which can be synthesized by the Diels-Alder reaction between cyclopentadiene or dicyclopentadiene and vinyl compounds containing a cyclic carboxylic anhydride group.

On the other hand, the B-type imide type norbornene derivatives can be easily obtained by reaction between the later described norbornene derivatives containing an amino group or substituent including said amino group and cyclic carboxylic anhydride, using a process resembling the N-phenyl maleimide synthesizing process proposed by M. P. Cava (Refer to "Organic Syntheses" by John D. Roberts, Vol. 41, pp. 93 to 95, 1961, published by John Wiley and Sons, Inc.).

Typical among the A-type imide type norbornene derivatives are N-substituted-3,6-methylene-1,2,3,6-tetrahydro-cis-phthalimide compounds, N-substituted-3,6-methylene-1-methyl-1,2,3,6-tetrahydro-cis-phthalimide compounds, bicyclo[2,2,1]-hepta-2-ene-5-spiro-3'-CN-substituted succinimide compounds, 2-substituted-2-aza-1,3-dioxo-5,8-methano-1,2,3,4,4a,5,8,8a -octahydronaphthalene compounds, N-substituted-5,8-methano-1,2,3,4,4a,5,8,8a-octahydronaphthalene-2,3-dicarboxyimide compounds, N-substituted-5,8-methano-2-methyl-1,2,3,4,4a,5,8,8a-octahydronaphthalene-2,3-dicarboxyimide compounds, 1,4-methano-1,4,4a,5,6,7,8,8a-octahydronaphthalene-6-spiro-3'-(N-substituted succinimide) compounds, 2 -substituted-2-aza-1,3-dioxo-5,8-methano-1,2,3,4,4a,5,8,8a,9,9a,10,10a-dodecahydroanthracene compounds, N-substituted-1,4,5,8-dimethano-1,2,3,4,4a,5,8,8a-octahydronaphthalene-2,3-dicarboxyimide compounds, N-substituted-1,4,5,8-dimethano-2-methyl-1,2,3,4,4a,5,8,8a-octahydronaphthalene-2,3-dicarboxyimide compounds, 1,4,5,8-dimethano-2-methyl-1,2,3,4,4a,5,8,8a-octahydronaphthalene-2,3-dicarboxyimide compounds, N-substituted-2-aza-5,8,9,10-dimethano-1,3-dioxo-1,2,3,4,4a,5,8,8a,9-,9a,10,10a-dodecahydroanthracene compounds, and N-substituted-4-(5-bicyclo[2,2,1]-hepta-2-enyl) phthalimide compounds.

The typical ones of the N-substituted-3,6-methylene-1,2,3,6-tetrahydro-cis-phthalimide compounds have the following general formula:

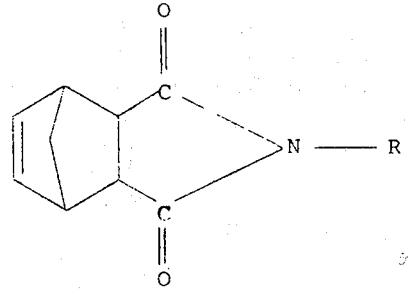

where:
 R = a hydrocarbon radical selected from the group consisting of an alkyl radical having 1 to 10 carbon atoms, alkenyl radical having 2 to 10 carbon atoms, cycloalkyl radical or cycloalkenyl radical having 4 to 10 carbon atoms, aryl radical having 6 to 10 carbon atoms, aryl radical substituted by an alkyl radical having 1 to 10 carbon atoms and aralkyl radical having 7 to 10 carbon atoms, or -(CH$_2$)$_n$COOR'
 (where n is an integer of 1 to 10 and R' denotes the abovementioned hydrocarbon radical) or —(CH$_2$)$_m$OCOR'' (where m is an integer of 1 to 10 and R'' represents the same hydrocarbon radical).

The N-substituted-3,6-methylene-1,2,3,6-tetrahydro-cis-phthalimide compounds may be typically exemplified by N-methyl-3,6-methylene-1,2,3,6-tetrahydro-cis-phthalimide, N-ethyl-3,6-methylene-1,2,3,6-tetrahydro-cis-phthalimide, N-hexyl-3,6-methylene-1,2,3,6-tetrahydro-cis-phthalimide, N-amyl-3,6-methylene-1,2,3,6-tetrahydro-cis-phthalimide, N-decyl-3,6-methylene-1,2,3,6-tetrahydro-cis-phthalimide, N-cyclohexyl-3,6-methylene-1,2,3,6-tetrahydro-cis-phthalimide, N-(4-methylcyclohexyl)-3,6-methylene-1,2,3,6-tetrahydro-cis-phthalimide, N-phenyl-3,6-methylene-1,2,3,6-tetrahydro-cis-phthalimide, N-(4-ethylphenyl)-3,6-methylene-1,2,3,6-tetrahydro-cis-phthalimide, N-methoxycarbonyl-3,6-methylene-1,2,3,6-tetrahydro-cis-phthalimide, N-ethoxycarbonylmethyl-3,6-methylene-1,2,3,6-tetrahydro-cis-phthalimide, and N-acetoxy-3,6-methylene-1,2,3,6-tetrahydro-cis-phthalimide.

Other A-type imide type norbornene derivatives than the N-substituted-3,6-methylene-1,2,3,6-tetrahydro-cis-phthalimide compounds may be typically exemplified in the same manner as described above. Said other A-type imide type norbornene derivatives have such a general formula as set forth in the Japanese Pat. application No. 123,329/73.

The B-type imide type norbornene derivatives typically include N-[ω-(5-bicyclo[2,2,1]-hepta-2-enyl)-alkyl substituted]-maleimide compounds, N-[ω-(5-bicyclo[2,2,1]-hepta-2-enyl) alkyl substituted]-citraconimide compounds, N-[ω-(5-bicyclo [2,2,1]-hepta-2-enyl) alkyl substituted]-glutaconimide compounds, N-[ω-(5-bicyclo[2,2,1]-hepta-2-enyl)alkyl substituted]-succinimide compounds, N-[ω-(5-bicyclo[2,2,1]-hepta-2-enyl) alkyl substituted]-phthalimide compounds, N-[ω-(5-bicyclo[2,2,1]-hepta-2-enyl) alkyl substituted]-naphthalene-1,8-dicarboxyimide compounds, and N-[ω-(5-bicyclo[2,2,1]-hepta-2-enyl)alkyl substituted]-naphthalene-2,3-dicarboxyimide compounds.

The typical ones of the N-[ω-(5-bicyclo[2,2,1]-hepta-2-enyl)alkyl substituted] maleimide compounds may be expressed by the following general formula:

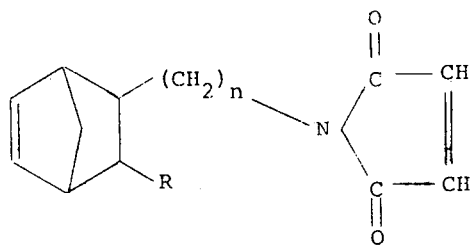

where:
R = an alkyl radical having 1 to 20 carbon atoms
n = an integer of 1 to 20

Typical among the N-[ω-(5-bicyclo[2,2,1]-hepta-2-enyl) alkyl substituted]maleimide compounds are N-(5-bicyclo[2,2,1]-hepta-2-enyl)methylmaleimide, N-[3-(5-bicyclo[2,2,1]-hepta-2-enyl)propyl]maleimide, N-[6-(5-bicyclo[2,2,1]-hepta-2-enyl) hexyl]maleimide, N-[12-(5-bicyclo[2,2,1]-hepta-2-enyl) dodecyl]maleimide, N-(6-methyl-5-bicyclo[2,2,1]-hepta-2-enyl)methylmaleimide, N-[4-(6-methyl-5-bicyclo[2,2,1]-hepta-2-enyl)butyl]maleimide, N-[10-(6-methyl-5-bicyclo[2,2,1]-hepta-2-enyl)decyl] maleimide, N-[16-(6-methyl-5-bicyclo[2,2,1]-hepta-2-enyl)hexadecyl]maleimide, N-(6-ethyl-bicyclo[2,2,1]-hepta-2-enyl)methylmaleimide, N-[2-(6-ethyl-5-bicyclo[2,2,1]-hepta-2-enyl)ethyl]maleimide, N-[8-(6-ethyl-5-bicyclo[2,2,1]-hepta-2-enyl)octyl] maleimide, N-[18-(6-ethyl-5-bicyclo [2,2,1]-hepta-2-enyl) octadecyl] maleimide, N-[3-(6-propyl-5-bicyclo[2,2,1]-hepta-2-enyl) propyl] maleimide, N-[9-(6-propyl-5-bicyclo[2,2,1]-hepta-2-enyl) nonyl] maleimide, N-[11-(6-butyl-5-bicyclo[2,2,1]-hepta-2-enyl) undecyl] maleimide, N-(6-hexyl-5-bicyclo[2,2,1]-hepta-2-enyl) methyl-maleimide, N-(6-dodecyl-5-bicyclo[2,2,1]-hepta-2-enyl) methylmaleimide, N'-[12-(6-dodecyl-5-bicyclo[2,2,1]-hepta-2-enyl) dodecyl] maleimide, and N-(6-octadecyl-5-bicyclo 2,2,1]-hepta-2-enyl) methylmaleimide.

Other B-type imide type norbornene derivatives than the N-[ω-(5-bicyclo[2,2,1]-hepta-2-enyl) alkyl substituted] maleimide compounds may be typically exemplified in the same manner as described above. Said other B-type imide type norbornene derivatives may be expressed by such general formula as presented in the Japanese Pat. application No. 123329/73.

For the object of this invention, the ring-opening polymerization homopolymers prepared from the respective types of norbornene derivatives may be used alone. Or it is possible to use copolymers obtained by the ring-opening polymerization of two or more of the above-mentioned types of norbornene derivatives or a mixture of more than 50 mol% of any of said norbornene derivatives as a main component and 50% at most of an unsaturated cyclic compound. This unsaturated cyclic compound may be typically exemplified by acid anhydride type norbornene derivatives, aromatic norbornadiene derivatives, ester type norbornadiene derivatives, aromatic nitrogen-bearing heterocyclic norbornene derivatives, amide type norbornene derivatives, aromatic norbornene derivatives, and aromatic dimethanooctahydronaphthalene derivatives, cycloolefinic compounds and halogenated norbornene derivatives.

Typical among the acid anhydride type norbornene derivatives are 3,6-methylene-1,2,3,6-tetrahydro-cis-phthalic anhydride, 6-(5-carboxy-bicyclo[2,2,1]-hepta-2-enyl)acetic anhydride, 3,6-methano-1-methyl-1,2,3,6-tetrahydro-cis-phthalic anhydride, 2-oxa-1,4-dioxo-5,8-methano-1,2,3,4,4a,5,8,8a-octahydronaphthalene, 5,8-methano-1,2,3,4,4a,5,8,8a-octahydronaphthalene-1,2-dicarboxylic anhydride, 5,8-methano-1-methyl-1,2,3,4,4a,5,8,8a-octahydronaphthalene-2,3-dicarboxylic anhydride, 4,7-methano-1-methyl-1,2,3,3a,4,7,7a,8-naphthalene-1,2-dicarboxylic anhydride, 1,4,5,8-dimethano-1,2,3,4,4a,5,8,8a-octahydronaphthalene-2,3-dicarboxylic anhydride, 2-oxa-1,3-dioxo-1,2,3,4,4a,5,8,8a,9,9a,10,10a-dodecahydroanthracene and 4-(5-bicyclo[2,2,1]-hepta-2-enyl) phthalic anhdyride.

These formulas are already indicated in the Japanese Pat. application No. 106902/73.

The aromatic norbornene derivatives contain at least one aromatic hydrocarbon radical or substituent including said aromatic hydrocarbon radical at the 5 and/or 6 position of the bicyclo[2,2,1]-heptene-2(namely, norbornene). The typical ones of said aromatic norbornene derivatives may be expressed by the following general formula (A):

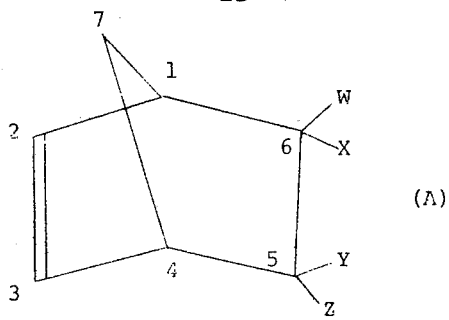

(A)

The aromatic dimethanooctahydronaphthalene derivatives contain at least one aromatic hydrocarbon radical or substituent including said aromatic hydrocarbon radical at the 2 and/or 3 position of the 1,4:5,8-dimethano-1,2,3,4,5,8,8a-octahydronaphthalene. The typical ones of said aromatic dimethanooctahydronaphthalene derivatives may be expressed by the following general formula (B):

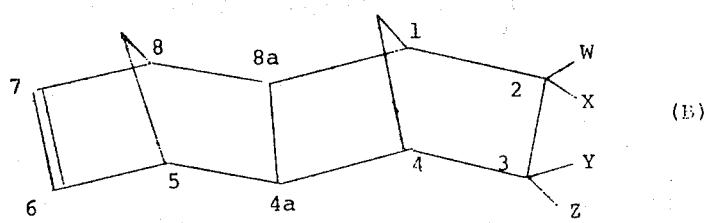

(B)

Throughout the above structural formulas (A), (B), W, X, Y, Z may denote the same or different ones selected from the group consisting of a hydrogen atom, aromatic hydrocarbon radical, substituent including said aromatic hydrocarbon radical, and alkyl or alkenyl radical having 1 to 20 carbon atoms. In this case, at least one of said W, X, Y, Z is an aromatic hydrocarbon radical or substituent including said aromatic hydrocarbon radical. Said substituent may be expressed by any of the following general formulas:

where:
$R_1$, $R_2$, $R_3$, $R_4$, $R_5$, $R_6$, $R_7$, $R_8$, $R_9$ = the same or different ones selected from the group consisting of a hydrogen atom, alkyl or alkenyl radical having 1 to 20 carbon atoms, cycloalkyl radical having 4 to 10 carbon atoms, aryl radical having 6 to 10 carbon atoms and aralkyl radical having 7 to 10 carbon atoms.

The aromatic norbornene derivatives typically include 5-phenyl-bicyclo[2,2,1]-heptene-2, 5-methyl-5-phenyl-bicyclo[2,2,1]-heptene-2, 5,5-diphenyl-bicyclo[2,2,1]-heptene-2, 5-hexyl-5-phenyl-bicyclo[2,2,1]-heptene-2, 5-decenyl-5-phenyl-bicyclo[2,2,1]-heptene-2, 5-cyclohexyl-5-phenyl-bicyclo[2,2,1]-heptene-2, 5-phenyl-6-ethyl-bicyclo[2,2,1]-heptene-2, 5-α-naphthyl-bicyclo[2,2,1]-heptene-2, and 5-(P-tolyl)-bicyclo[2,2,1]-heptene-2.

The aromatic dimethanooctahydronaphthalene derivatives may be typically exemplified by 2-phenyl-1,4:5,8-dimethano-1,2,3,4,4a,5,8,8a-octahydronaphthalene, 2-methyl-2-phenyl-1,4:5,8-dimethano-1,2,3,4,4a,5,8,8a-octahydronaphthalene, 2-n-butyl-2-phenyl-1,4:5,8-dimethano-1,2,3,4,4a,5,8,8a-octahydronaphthalene, 2-cyclohexyl-1,4:5,8-dimethano-1,2,3,4,4a,5,8,8a-octahydronaphthalene, 2,2,2- or 2,3-diphenyl- 1,4:5,8-dimethano-1,2,3,4,4a,5,8,8a-octahydronaphthalene, 2-(p-tert-butyl-phenyl)-1,4:5,8-dimethano-1,2,3,4,4a,5,8,8a-octahydronaphthalene, 2-decyl-2-phenyl-1,4:5,8-dimethano-1,2,3,4,4a,5,8,8a-octahydronaphthalene, and 2-α-anthryl-1,4:5,8-dimethano-1,2,3,4,4a,5,8,8a-octahydronaphthalene.

Other aromatic norbornene derivatives and aromatic dimethanooctahydronaphthalene derivatives than de-

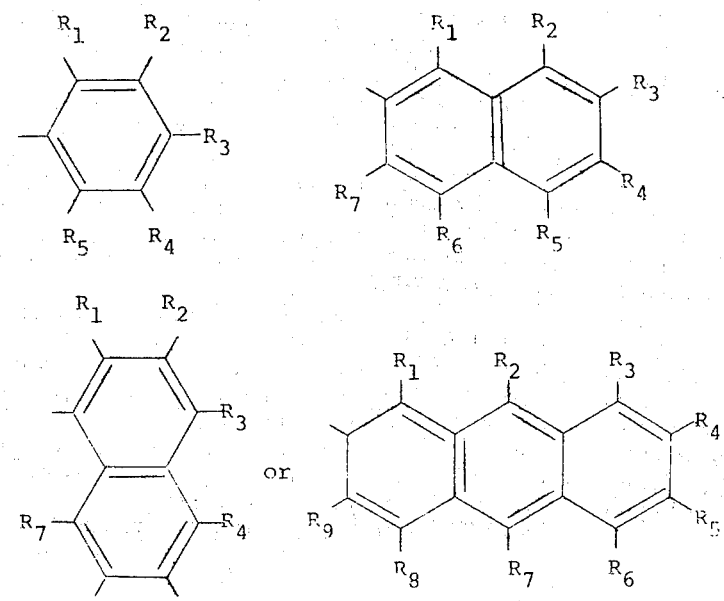

scribed above as well as the method of preparing the same are set forth in the Japanese Pat. application No. 61851/74.

The aromatic nitrogen-bearing heterocyclic norbornene derivatives contain at least one aromatic heterocyclic ring having at least one nitrogen atom in said ring (for example, pyridine nucleus, or quinoline nucleus) in the 5 and/or 6 position of the norbornene (namely, bicyclo[2,2,1]-heptene-2)(Refer to the item "Aromatic Character" of the "Chemical Encyclopedia", Vol. 8, p. 601, 1969, published by Kyoritsu Publishing Company). The typical ones of the aromatic nitrogen-bearing heterocyclic norbornene derivatives may be expressed by the following general formula:

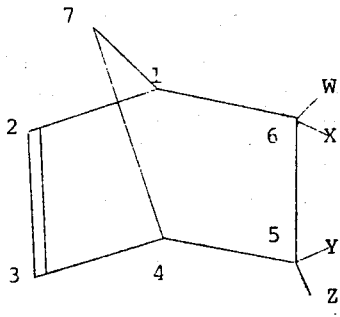

where:
W, X, Y, Z = the same or different ones selected from the group consisting of a hydrogen atom, alkyl radical having 1 to 20 carbon atoms, cycloalkyl radical having 4 to 10 carbon atoms, alkyl substituted cycloalkyl radical having 5 to 10 carbon atoms, aryl radical having 6 to 10 carbon atoms and aralkyl radical having 7 to 10 carbon atoms or other radicals containing an aromatic nitrogen-bearing heterocyclic ring, at least one of said W, X, Y, Z being a radical containing said aromatic nitrogen-bearing heterocyclic ring.

Typical among the aromatic nitrogen-bearing heterocyclic norbornene derivatives are 5-(2-pyridyl)-bicyclo[2,2,1]-heptene-2, 5-(3-pyridyl)-bicyclo[2,2,1]-heptene-2, 5-(4-pyridyl)-bicyclo[2,2,1]-heptene-2, 5-(3-methyl-2-pyridyl)-bicyclo[2,2,1]heptene-2, 5-(5-n-butyl-3-pyridyl)-bicyclo[2,2,1]-heptene-2, 5-(4-cyclohexyl-2-pyridyl)-bicyclo[2,2,1]-heptene-2, 5-(3-phenyl-4-pyridyl)-bicyclo[2,2,1]-heptene-2, 5-(2,6-dimethyl-4-pyridyl)-bicyclo[2,2,1]-heptene-2, 5-(3-hexyl-2-pyridyl)-bicyclo[2,2,1]-heptene-2, 5-(4-quinolyl)-bicyclo[2,2,1]-heptene-2, 5-(9-carbazolyl)-bicyclo[2,2,1]-heptene-2, 5-(9-propyl-3-carbazoline)-bicyclo[2,2,1]-heptene-2, and 5-(9-dodecyl-3-carbazoyl)-bicyclo[2,2,1]-heptene-2. The other aromatic nitrogen-bearing heterocyclic norbornene derivatives are typically set forth in the Japanese Pat. application No. 15310/74.

The amide type norbornene derivatives contain at least one N,N-disubstituted carbonamide radical or substituent including said N,N-disubstituted carbonamide radical at the 5 and/or 6 positions of the bicyclo[2,2,1]-heptene-2. The typical ones of said amide type norbornene derivatives may be expressed by the following general formula:

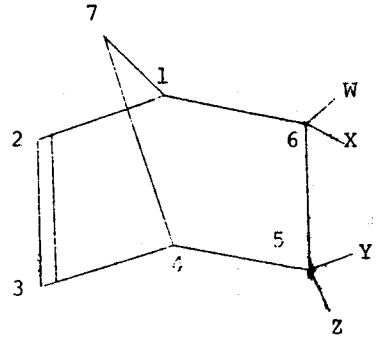

where:
W, X, Y, Z = the same or different ones selected from the group consisting of a hydrogen atoms, atom, alkyl radical having 1 to 12 carbon atoms, alkenyl radical having 2 to 12 carbon atoms, cycloalkyl radical having 4 to 12 carbon atoms, alkyl substituted cycloalkyl radical having 5 to 12 carbon atoms, aryl radical having 6 to 10 carbon atoms and aralkyl radical having 7 to 10 carbon atoms or N-disubstituted carbonamide radical

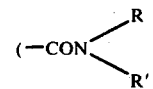

where R,R' denote the same or different ones selected from the group consisting of a hydrogen atom and the above-mentioned hydrocarbon radicals).

The amide type norbornene derivatives typically include N,N-dimethyl-bicyclo[2,2,1]-heptene-2-carbonamide-5, N-methyl-N-ethyl-bicyclo[2,2,1]-heptene-2-carbonamide-5, N-methyl-N-octyl-bicyclo[2,2,1]-heptene-2-carbonamide-5, N,N-dicyclohexyl-bicyclo[2,2,1]-heptene-2-carbonamide-5, N,N-di(-methylcyclohexyl)-bicyclo[2,2,1]-heptene-2-carbonamide-5, N,N-diphenyl-bicyclo[2,2,1]-heptene-2-carbonamide-5, N,N-dibenzyl-bicyclo[2,2,1]-heptene-2-carbonamide-5, N,N-di(3-methylphenyl)-bicyclo[2,2,1]-heptene-2-carbonamide-5, N,N-dimethyl-5-methyl-bicyclo[2,2,1]-heptene-2-carbonamide-5, N,N-dimethyl-5,6-methyl-bicyclo[2,2,1]-heptene-2-carbonamide-5, N,N-diethyl-5-hexyl-bicyclo[2,2,1]-heptene-2-carbonamide-5, N,N-di(cyclohexyl)-5-phenyl-bicyclo[2,2,1]-heptene-2-carbonamide-5, N,N-diphenyl-5-methyl-bicyclo[2,2,1]-heptene-2-carbonamide-5, and N,N,N',N'-tetramethyl-bicyclo[2,2,1]-heptene-2 carbonamide. The other amide type norbornene derivatives are typically indicated in the Japanese Pat. application No. 129581/74.

The aromatic norbornadiene derivatives are the compounds in which carbon atoms occupying the 5 and 6 positions of the formula (C) of the bicyclo[2,2,1]-heptene-2[namely, norbornene] concurrently constitute the two adjacent carbon atoms of an aromatic cyclic compound. The typical ones of said aromatic norbornadiene derivatives may be expressed by either of the following general formulas (D) and (E):

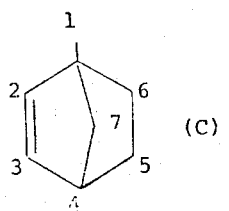 (C)

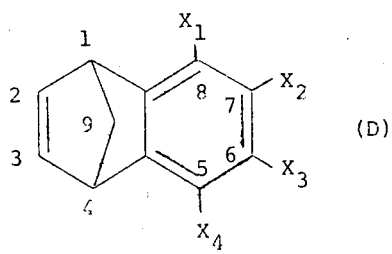 (D)

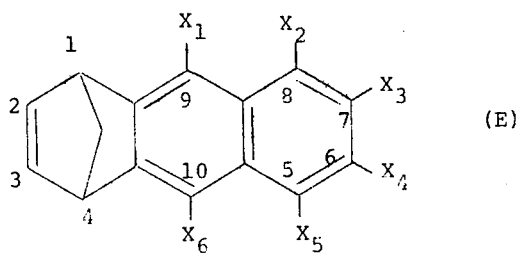 (E)

where:

X₁, X₂, X₃, X₄, X₅, X₆ = the same or different ones selected from the group consisting of a hydrogen atom, alkyl radical having 1 to 10 carbon atoms, alkenyl radical having 2 to 10 carbon atoms, cycloakyl radical having 4 to 10 carbon atoms, aryl radical having 6 to 10 carbon atoms and aralkyl radical having 7 to 10 carbon atoms or polar radicals selected from the group consisting of a nitrile group, ester group and halogen atom or the above-mentioned hydrocarbon radicals containing said polar radicals.

The aromatic norbornadiene derivatives may be typically exemplified by 1,4-dihydro-1,4-methanonaphthalene, 1,4-dihydro-1,4-methano-6-methylnaphthalene, 1,4-dihydro-1,4-methano-6-methoxynaphthalene, 1,4-dihydro-6-fluoro-1,4-methanonaphthalene, 6-chloro-1,4-dihydro-1,4-methanonapthalene, 6-cyano-1,4-dihydro-1,4-methanonaphthalene, 5,8-diacetoxy-1,4-dihydro-1,4-methanonaphthalene, 5,8-diacetoxy-1,4-dihydro-6,7-dimethyl-1,4-methanonaphthalene, 9,10-diacetoxy-1,4-dihydro-1,4-methanoanthracene, and 1,4-dihydro-9,10-diphenyl-1,4-methanoanthracene.

The method of preparing the aromatic norbornadiene derivatives and the typical examples thereof are described in the Japanese Pat. application No. 109295/73.

The ester type norbornadiene derivatives have at least one ester group or substituent containing said ester group at the 2 and 3 positions of the bicyclo[2,2,1]-heptadiene-2,5. The typical ones of said ester type norbornadiene derivatives may be expressed by the following general formula:

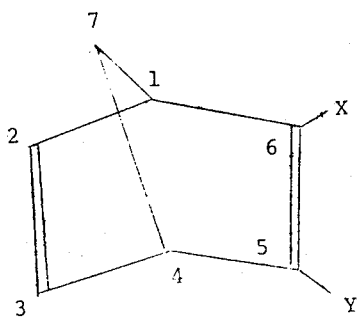

where:

X, Y = the same or different ones selected from the group consisting of a hydrogen atom, alkyl radical having 1 to 10 carbon atoms, alkenyl radical having 2 to 10 carbon atoms, cycloalkyl radical having 4 to 10 carbon atoms, alkyl substituted cyclo radical having 5 to 10 carbon atoms, aryl radical having 6 to 10 carbon atoms and aralkyl radical having 7 to 10 carbon atoms, ester group and hydrocarbon radicals substituted by the ester group, at least one of said X and Y denoting an ester group or said hydrocarbon radicals substituted by the ester group.

The ester type norbornadiene derivatives typically include 2-methoxycarbonyl-bicyclo[2,2,1]-hepta-2,5-diene, 2-butyloxycarbonyl-bicyclo[2,2,1]-hepta-2,5-diene, 2-octyloxycarbonyl-bicyclo[2,2,1]-hepta-2,5-diene, 2-decycloxy-carbonyl-bicyclo[2,2,1]-hepta-2,5-diene, 2-methoxycarbonyl-3-methyl-bicyclo[2,2,1]-hepta-2,5-diene, 2-ethoxycarbonyl-3-hexyl-bicyclo[2,2,1]-hepta-2,5-diene, 2-methoxycarbonyl-3-cyclohexyl-bicyclo[2,2,1]-hepta-2,5-diene, 2-ethoxy-3-(4-methylcyclohexyl)-bicyclo[2,2,1]-hepta-2,5-diene, 2-methoxycarbonyl-3-phenyl-bicyclo[2,2,1]-hepta-2,5-diene, 2-ethoxycarbonyl-3-tolyl-bicyclo[2,2,1]-hepta-2,5-diene, 2,3-dimethoxycarbonyl-bicyclo[2,2,1]-hepta-2,5-diene, 2-methoxycarbonyl-3-ethoxycarbonyl-bicyclo[2,2,1]-hepta-2,5-diene, 2-acetoxymethyl-bicyclo[2,2,1]-hepta-2,5-diene, 2-caproyloxy-3-methyl-bicyclo[2,2,1]-hepta-2,5-diene, 2-ethoxycarbonyl-3-hexyloxycarbonyl-bicyclo[2,2,1]-hepta-2,5-diene, 2,3-di(propionyloxymethyl)-bicyclo[2,2,1]-hepta-2,5-diene, 2-acetoxymethyl-3-cyclohexyl-bicyclo[2,2,1]-hepta-2,5-diene, 2-valeryloxy-3-ethyl-bicyclo[2,2,1]-hepta-2,5-diene, 2-valeryloxymethyl-decyl-bicyclo[2,2,1]-hepta-2,5-diene, and 2-valeryoxymethyl-3-phenyl-bicyclo[2,2,1]-hepta-2,5-diene.

The method of preparing the ester type norbornadiene derivatives and the other typical examples thereof than listed above are set forth in the Japanese Pat. application No. 9208/74.

The cycloolefinic compounds in the unsaturated cyclic compounds used as a monomer in preparing the ring-opening polymerization copolymer applied in the method of this invention may be broadly divided into three groups: (1) nonconjugated cyclic polyene compounds having at least two carbon-carbon double bonds (hereinafter referred to as "nonconjungated cyclic polyene compounds"), (2) monocyclic olefinic compounds and (3) polycyclic olefinic compounds having one carbon-carbon double bond (hereinafter referred to as "polycyclic olefinic compounds").

For the object of this invention, the nonconjugated cyclic polyene compounds may be of the monocyclic or polycyclic type, and are preferred to contain 6 to 20 carbon atoms for preparation of the ring-opening polymerization product applied in the method of this invention. Said nonconjungated cyclic polyene compounds typically include 1,5-cyclooctadiene, dicyclopentadiene, 1,5,9-cyclododecatriene, 1-chloro-1,5-cyclooctadiene, and norbornadiene.

The monocyclic olefinic compounds are preferred to contain 20 carbon atoms at most for preparation of the ring-opening polymerization product applied in the method of this invention, and may be typically exemplified by cyclobutene, cyclopentene, cycloheptene, cyclooctene and cyclododecene.

The polycyclic olefinic compounds are preferred to contain 20 carbon atoms at most for preparation of the ring-opening polymerization product applied in the method of this invention and typically include bicyclo[2,2,1]-heptene-2 (norbornene), 5-methyl-bicyclo[2,2,1]-heptene-2, 5,5 or 5,6-dimethyl-bicyclo[2,2,1]-heptene-2, 1,4:5,8-dimethano-1,2,3,4,4a,5,8,8a-octahydronaphthalene, 2-methyl-1,4:5,8-dimethano-1,2,3,4,4a,5,8,8a-octahydronaphthalene, isoprophenyl-bicyclo[2,2,1]-heptene-2, 2-n-propyl-1,4:5,8-dimethano-1,2,3,4,4a,5,8,8a-octahydronaphthalene.

Further, the unsaturated cyclic compounds used as a monomer in preparing the ring-opening copolymerization products applied in the method of this invention include halogenated norbornene derivatives.

The halogenated norbornene derivatives contain at least one halogen atom or substituent including said halogen atom at the 5 and/or 6 positions of the bicyclo[2,2,1]-heptene-2, as shown in the following general formula:

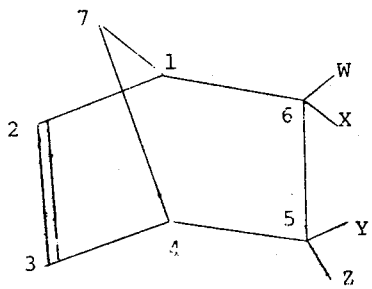

where:
W, X, Y, Z = the same or different ones selected from the group consisting of hydrogen atom, halogen atom, hydrocarbon radicals selected from alkyl radical having 1 to 20 carbon atoms, alkenyl radical having 2 to 20 carbon atoms, cycloalkyl radical having 4 to 20 carbon atoms, alkyl substituted cycloalkyl radical having 5 to 20 carbon atoms, aryl radical having 6 to 20 carbon atoms, and aralkyl radical having 7 to 20 carbon atoms, and said hyrocarbon radicals substituted by the halogen atom, at least one of said W, X, Y and Z being a halogen atom, or said hydrocarbon radicals substituted by the halogen atom.

The above-mentioned halogenated norbornene derivatives can be synthesized by the Diels-Alder reaction between cyclopentadiene and halogen atom-bearing compounds (for example, vinyl chloride, 1,2-dichloroethylene, vinyl bromide, and vinylidene chloride), and also between said halogen atom-bearing compounds and dicyclopentadiene. Typical among the halogen type norbornene derivatives are 5-chlorobicyclo[2,2,1]-heptene-2, 5,5-dichloro-bicyclo[2,2,1]-heptene-2, 5,6-dichloro-bicyclo[2,2,1]-heptene-2, 5,5,6-trichloro-bicyclo[2,2,1]-heptene-2, 5,5,6,6-tetrachloro-bicyclo[2,2,1]-heptene-2, 5-chloromethyl-bicyclo[2,2,1]-heptene-2, 5,6-di(chloromethyl)-bicyclo[2,2,1]-heptene-2, 5-chloro-5-methyl-bicyclo[2,2,1]-heptene-2, 5-chloro-6-methyl-bicyclo[2,2,1]-heptene-2, 5-($\beta$-chloroethyl)-bicyclo[2,2,1]-heptene-2, 5-($\alpha$-chloroethyl)-bicyclo[2,2,1]-heptene-2, 5-($\beta$-chloropropyl)-bicyclo[2,2,1]-heptene-2, 5-($\gamma$-chloropropyl)-bicyclo[2,2,1]-heptene-2, 5-($\beta$-chloroethyl)-6-methyl-bicyclo[2,2,1]-heptene-2, and 5-chloromethyl-6-ethyl-bicyclo[2,2,1]-heptene-2.

The cyano-, ester-, ether-, acid anhydride-, amide- and aromatic-type norbornene derivatives, chlorinated norbornene derivatives, aromatic dimethanooctahydronaphthalene derivatives, aromatic nitrogen-bearing heterocyclic norbornene derivatives and some (for example, 5-methylbicyclo[2,2,1]-heptene-2) of the cycloolefinic compounds all have two forms of isomers which are designated as the endo- and exo-types according to the manner in which the substituent is attached to the chain. For the object of preparing the ring-opening polymerization product applied in the method of this invention, the above-listed compounds may be used either after separating said isomers, for example, by precision distillation or recrystallization or without separating said isomers, that is, in the form still mixed therewith.

In the case of the cyano-, ester and ether-type norbornene derivatives, a larger total number of carbon atoms contained in the radicals represented by W, X, Y, Z given in the general formulas of said derivatives undesirably leads to the lower heat resistance of the resultant ring-opening polymerization product and in consequence the composition intended by this invention. Therefore, the radicals denoted by W, X, Y, Z are preferably chosen to contain 10 carbon atoms at most, or more preferably 6 carbon atoms at most in total.

Similarly with the chlorinated norbornene derivatives in the unsaturated cyclic compounds, a larger total number of carbon atoms contained in the radicals indicated by W, X, Y, Z undesirably results in the lower heat resistance of the ring-opening polymerization product obtained and in consequence the composition intended by this invention. Accordingly, said total number of carbon atoms is desired to fall below 10, or more preferably 6.

A ring-opening polymerization product prepared from those of the chlorinated norbornene derivatives which contain two or more chlorine atoms displays not only excellent flame retardancy but also high heat resistance and is particularly favorable where it is desired to provide a composition possessed of such prominent properties.

The ring-opening polymerization product prepared from those of the A-type imide type norbornene derivatives in which the radical represented by R given in the general formula has a large number of carbon atoms and the ring-opening polymerization product prepared from those of the B-type imide type norbornene derivatives in which the radical denoted by R given in the general formula has a large number of carbon atoms and also n indicated in said formula represents a large integer generally have low heat resistance or workability. Where, therefore, it is desired to obtain a composition possessed of excellent heat resistance or workability, application of the above-mentioned forms of ring-opening polymerization product is not preferred. Consequently, with the A-type imide type norbornene derivatives, the radical indicated by R given in the general formula is preferably chosen to contain 8 carbon atoms at most, or more preferably 6 carbon atoms at most. With the B-type imide type norbornene derivatives the radical denoted by R given in the general formula is preferably chosen to have 6 carbon atoms at most, or more preferably 4 carbon atoms at most, and n given in said formula is preferably chosen to be an integer of 6 at most, or more preferably 4 at most.

With the amide- and aromatic-type norbornene derivatives, aromatic dimethanooctahydronaphthalene derivatives and aromatic nitrogen-bearing heterocyclic norbornene derivatives, a larger total number of carbon atoms contained in the radicals represented by W, X, Y, Z given in the general formula undesirably gives rise to the lower heat resistance of the resultant ring-opening polymerization product, and in consequence the composition obtained therefrom. Therefore, the radicals denoted by said W, X, Y, Z are preferably chosen to contain 8 carbon atoms at most or more preferably 6 carbon atoms at most in total.

With the acid anhydride type norbornene derivatives, in the unsaturated cyclic compounds, a larger number of carbon atoms contained in the other rings than in the norbornene ring undesirably decreases the mechanical properties, and further heat resistance or workability of the resultant ring-opening polymerization product. With the acid anhydride type norbornene derivatives, the other rings than the norbornene ring are preferably chosen to contain 2 to 10 or more preferably 2 to 8 carbon atoms.

With the aromatic norbornadiene derivatives, a larger number of carbon atoms contained in the other rings than in the norbornadiene ring generally tends to decrease the mechanical properties, further heat resistance or workability of the resultant ring-opening polymerization product. Therefore, such form of aromatic norbornadiene derivatives is not acceptable where it is desired to provide a composition possessed of prominent mechanical properties, heat resistance and workability. Accordingly, the other rings than the norbornadiene ring are preferably chosen to contain 20 carbon atoms at most, or more preferably 16 carbon atoms at most.

With the ester type norbornadiene derivatives, a larger total number of carbon atoms contained in the radicals represented by X, Y given in the general formula tends to reduce the mechanical properties and further heat resistance or workability of the resultant ring-opening polymerization product. Such form of ester type norbornadiene derivatives is not preferred where it is demanded to provide a composition possessed of excellent mechanical properties, heat resistance and workability. Therefore, the radicals denoted by X, Y given in the general formula of said ester type norbornadiene derivatives are preferably chosen to contain a total number of 16 carbon atoms at most, or more preferably 12 carbon atoms at most.

Obviously, the above-mentioned requirements are governed by the properties of the aforesaid unsaturated cyclic compounds contained in the ring-opening polymerization copolymer. Also, the above-mentioned requirements are of course affected by various polymerization conditions in preparation of the ring-opening polymerization product, such as the kind and proportion of a catalytic system, the kind and proportion of a third catalytic component when applied or omission thereof, the proportion of the catalytic system based on the monomer, polymerization temperature, and the kind and proportion of a molecular weight-controlling agent when applied or omission thereof.

Where ring-opening copolymerization is carried out between unsaturated cyclic compounds and norbornene derivatives of the cyano-, ester-, ether- and imide-types, the proportion of said unsaturated cyclic compounds is chosen to be 50 mol% at most. Ring-opening polymerization copolymers of said various types of norbornene derivatives and more than 59 mol% of said unsaturated cyclic compounds are not desired, because such form of copolymer often give rise to decreases in mechanical properties such as impact strength, impact strength at low temperature, tensile strength and hardness, and other physical properties such as heat resistance (for example, softening point), moldability, gas impermeability and transparency, as compared with the ring-opening polymerization homopolymers prepared from the cyano—, ester—, ether— and imide-type norbornene derivatives respectively or copolymers of any combination of said derivatives.

Ring-opening polymerization copolymers containing a relatively large amoung of monocyclic olefinic compounds (for example, cyclohexene and cyclooctene) generally have good impact strength but undesirably tend to decrease in heat resistance (softening point), mechanical properties such as tensile strength and hardness. During preparation of a ring-opening polymerization copolymer containing a relatively large amount of polycyclic olefinic compounds and nonconjugated cyclic polyene compounds (for example, dicyclopentadiene and norbornene), gelation sometimes takes place, decreasing the workability of said copolymer and consequently presenting difficulties in providing satisfactory moldings.

Ring-opening polymerization copolymers containing a large amount of acid anhydride type norbornene derivative often become insoluble in many kinds of inert organic solvent, undesirably imposing limitations on the manufacturing process.

Ring-opening polymerization copolymers containing a relatively large amount of aromatic nitrogen-bearing heterocyclic norbornene derivatives generally have a low softening point and unsatisfactory chemicals-resistance.

From the above-mentioned facts, a preferred form of ring-opening polymerization copolymer is such that the copolymerization proportion of acid anhydride type norbornene derivatives or aromatic nitrogen-bearing heterocyclic norbornene derivatives in said copolymer is less than 25 mol%, more preferably less than 10 mol%.

Ring-opening polymerization copolymers containing a relatively large amount of amide type norbornene derivatives are often subject to limitation in manufacture due to the low polymerization activity of said derivatives. However, ring-opening polymerization copolymers containing a relatively small amount (generally less than 20 mol%) of amide type norbornene derivatives display good antistaticity. Therefore, this form of copolymer is preferably chosen to contain 20 mol% at most, more preferably 10 mol% at most of said amide type norbornene derivatives.

Ring-opening polymerization copolymers containing a relatively large amount of aromatic norbornene derivatives or aromatic dimethanooctahydronaphthalene derivatives often give rise to gelation during manufacture, undesirably decreasing the moldability of said copolymer. If, however, containing a relatively small amount of said unsaturated cyclic compounds, such form of copolymer has a larger molecular weight (or higher reduced viscosity) and more prominent mechanical properties such as impact strength and tensile strength than the ring-opening polymerization homopolymer of chlorinated norbornene derivatives and ring-opening polymerization copolymer of any combination of the cyano—, ester—, ether— and imide-type norbornene derivatives, and offers great advantage in practising this invention. Therefore, the above-mentioned form of ring-opening polymerization copolymer is generally chosen to contain less than 3 mol%, preferably less than 1 mol% of said aromatic norbornene derivatives or aromatic dimethanooctahydronaphthalene derivatives.

Ring-opening polymerization copolymers containing a relatively large amount of aromatic norbornadiene derivatives or ester type norbornadiene derivatives generally have a relatively high softening point and low moldability (requiring high molding temperature). Moreover, such form of ring-opening polymerization copolymer is disadvantageous, because it is necessary to devise a process for suppressing the gelation of said copolymer during molding. Since, however, a ring-opening polymerization containing a relatively small amount of such aromatic norbornadiene derivatives or ester-type norbornadiene derivatives has good heat resistance, the proportion of said derivatives is preferably chosen to be 15 mol% at most, more preferably 10 mol% at most. Obviously, the proportion of the above-mentioned unsaturated cyclic compounds is largely governed by the kind thereof and the conditions in which a ring-opening polymerization copolymer is prepared by reaction between said compounds and other components.

The acid anhydride- and aromatic-type norbornene derivatives, aromatic dimethanooctahydronaphthalene derivatives, aromatic nitrogen-bearing heterocyclic norbornene derivatives and ester type norbornadiene derivatives tend to give rise to crosslinking by heating when a ring-opening polymerization copolymer is prepared or when the resultant copolymer is kneaded and molded. Said copolymer has a considerably high softening point and imposes limitation on the temperature at which it is kneaded and molded, thus presenting great difficulties in molding. The amide type norbornene derivatives undesirably reduce the activity of a catalytic system applied in the preparing of a ring-opening polymerization product.

As seen from the foregoing description, such form of ring-opening polymerization product as does not tend to be gelation should be used in practising this invention, for otherwise molding would be obstructed.

As used in the method of this invention, ring-opening polymerization homopolymers of the cyano-, ester-, ether- and imide-type norbornene derivatives respectively or ring-opening polymerization copolymers of any combination of said derivatives or other copolymers of said derivatives and 50 mol% at most of unsaturated cyclic compounds can be prepared in the presence of a catalytic system (hereinafter referred to as the "catalytic system A") consisting of compounds of tungsten and/or molybdenum and organic aluminium compounds or both forms of compounds and another compound (a third component) or a catalytic system (hereinafter referred to as the "catalytic system B") consisting of oxides of tungsten and Lewis acids or both forms of components and organic aluminium compounds with or without inert organic solvents.

The compounds of tungsten and molybdenum may be typically exemplified by tungsten hexachloride, molybdenum pentachloride, tungsten oxytetrachloride ($WOCl_4$) and aluminium-tungsten halides (for example, $Al_4W_3Cl_{18}$) obtained by reducing tungsten halides with aluminium powders.

Organic aluminium compounds constituting a part of the catalytic system used in the ring-opening polymerization are of the type whose chemical structure may be expressed by the general formula $AlR_3$ or $AlR_nX_{3-n}$ (where R represents the alkyl, aryl radical or aralkyl radical, X denotes halogens, hydrogen or alkoxy radical and n is 1, 1.5 or 2) or $AlR_3$—$H_2O$ (where the mol ratio of $H_2O$ to $AlR_3$ has a value of $<1.5$).

Most preferable among the above-listed organic aluminium compounds are triethyl aluminium, triisobutyl aluminium, trihexyl aluminium, diethyl aluminium monochloride, di-n-butyl aluminium monochloride, ethyl aluminium sesquichloride, diethyl aluminium momobutoxide and a mixture of triethyl aluminium and water in which the triethyl aluminium and water bear the mole ratio of 1:0.5.

Other catalytic compounds than those of tungsten, molybdenum and organic aluminium are set forth in the Japanese Pat. applications Nos. 31755/72 and 108902/72.

the mole ratio of organic aluminium compounds to the compounds of tungsten or molybdenum is generally more than 0.1, preferably more than 0.5. Use of less than 0.1 mol of organic aluminium compounds based on 1 mol of compounds of tungsten or molybdenum failed to attain practical polymerization activity. A catalytic system consisting of 10 mols of organic aluminium compounds based on 1 mol of compounds of tungsten or molybdenum realized an extremely high degree of polymerization activity.

A third component whose proportion varies with the kind should preferably be used in an amount of 10 mols at most or usually 5 mols at most per mol of the compound of tungsten or molybdenum. The reason is that any larger application of said third component than 10 mols will not attain the elevation of the polymerization activity of the resultant catalytic system.

While the amount of the subject catalytic system added to the monomer of the norbornene derivatives varies with the type of said monomer, etc. the compounds of tungsten or molybdenum should generally be added at the rate of 0.001 to 20 mols, or preferably 0.1 to 5 mols based on 100 mols of said monomer. Addition of more than 20 mols of the compounds of tungsten or molybdenum based on 100 mols of said monomer not only results in high cost but also fails to promote the catalytic action, namely, such excess addition does not elevate the polymerization activity. Further, if unduly large amounts of said compounds of tungsten or molybdenum are used, the reaction system will contain such amounts of residual tungsten or molybdenum compounds as will be difficult to eliminate after completion of the ring-opening polymerization. The presence of said catalytic component in the polymer obtained will undesirably color the polymer. Said coloration increases the tint of the polymer in the subsequent operation of molding the polymer or causes the thermal deterioration of the resultant product.

The ring-opening polymerization is carried out generally at a temperature ranging from −100° C to +200° C or more preferably from −40° C to +150° C or most preferably from room temperature to +100° C. At a lower temperature than −100° C, the reaction system does not display desirable polymerization activity with the resultant extremely slow progress of polymerization. In such case, progress of the polymerization consumes a great deal of time, furthermore, sometimes causing a mixture of the inert organic solvent and monomer to be solidified. Conversely, a higher temperature than 200° C fails to provide a good quality of polymer prepared by ring-opening polymerization, and is practically undesirable.

The third component used in forming the catalytic system (A) includes water, hydrogen peroxide, oxygen-bearing organic compounds (for example, alkyl peroxides, epoxides, acetal compounds, alcoholic compounds, carboxylic acids or anhydrides thereof, carboxylic acid esters and ketones), nitrogen-bearing organic compounds (for example, amines, nitrogen-bearing heterocyclic compounds and acid amides), halogen-bearing organic compounds (for example, halogenated aromatic hydrocarbons, tertiary hypoharites and halogenated alcoholic compounds), phosphorus-bearing organic compounds (for example, phosphine compounds, phosphine oxides, phospites and phosphates), sulfur-bearing organic compounds (for example, sulfides, sulfoxides and sulfones), and metal-bearing organic compounds (for example, metal salts of saturated monovalent carboxylic acid having 30 carbon atoms at most, saturated carboxylic acid having 30 carbon atoms at most and containing a cycloalkyl radical or substituted cycloalkyl radical or carboxylic acid having 30 carbon atoms at most and containing a phenyl radical or substituted phenyl radical).

The other kinds of compounds of tungsten and molybdenum, organic aluminium compounds and third catalytic components, the typical examples thereof and the ratio in which said three components are applied, and the proportions of the respective components based on he monomer used in the ring-opening polymerization are indicated in the Japanese Pat. application No. 31755/72.

The ring-opening polymerization product applied in the method of this invention can be prepared in the presence of a catalytic system consisting of compounds of tungsten and/or molybdenum and organic aluminium compounds or both types of compounds and a third component by carrying out the ring-opening polymerization at a temperature ranging from −100° C to +200° C with or without the aforesaid inert organic solvent. Further, the ring-opening polymerization product used in this invention can be prepared in the presence of another catalytic system formed of oxides of tungsten and/or molybdenum (hereinafter referred to as "oxides"), for example, tungsten trioxide, molybdenum trioxide and the Lewis acids, or said oxides, Lewis acids and organic aluminium compounds at a temperature ranging from −50° C to +150° C with our without the inert organic solvent.

The Lewis acids uses as a catalytic component may be typically exemplified by such as aluminium chloride, tin tetrachloride, vanadium tetrachloride and halogen atom-bearing organic aluminium compounds such as dialkyl aluminium chloride and alkyl aluminium dichloride.

Where the ring-opening polymerization product is prepared, said Lewis acids are generally used in an amount of 0.1 to 10.0 mols, more preferably 0.3 to 5.0 mols per mol of above-mentioned oxides and further where the catalytic system contains an organic aluminium compound, said aluminium compound is generally applied in an amount of 10.0 mols at most, more preferably 5.0 mols at most per mol of said oxides.

Further, the ring-opening polymerization product may be prepared by directly charging the oxides and Lewis acids, or the oxides, Lewis acids and organic aluminium compounds into a polymerization apparatus or by charging said apparatus with a product resulting from the beforehand reaction between the oxides and Lewis acids, or a powder prepared by jointly pulverizing the oxides and Lewis acids, or a mixture of said beforehand prepared reaction product or said powder and organic aluminium compounds.

Reaction between the oxides and Lewis acids can be effected at temperatures ranging from room temperature to 200° C with or without the inert organic solvent, with the proportion of the Lewis acids set at 0.1 to 10.0 mols, 0.3 to 5.0 mols per mol of the oxides.

The components of these catalytic systems (A), (B) may be added to a reaction system without pretreatment. Or it is possible to subject said components to pretreatment by pulverizing or copulverizing some or all of the respective catalytic components, carry out the heating or reaction of said components or extract the heated or pulverized or copulverized catalytic components or reaction products thereof by a solvent and thereafter add the components thus treated to a reaction (ring-opening polymerization) system.

The object of the ring-opening polymerization can be fully attained, as previously described, by the ring-opening polymerization of norbornene derivatives or a mixture of said derivatives and unsaturated cyclic compounds in the presence of a catalytic system (A), (B) with or without an inert organic solvent. Yet, the molecular weight of the resultant polymer can be controlled by adding to the polymerization system α-olefins (preferably α-olefins having 2 to 12 carbon atoms) such as ethylene, propylene, butene-1 and hexene-1; internal olefins such as butene-2 and hexene-2; conjugated diolefins such as butadiene and isoprene or nonconjugated diolefins such as 1,4-hexadiene (preferably conjugated and nonconjugated diolefins having 4 to 10 carbon atoms). In this case, it is generally recommended to add 10 parts by weight at most of said molecular weight controlling agent based on 100 parts by weight of the monomer.

As previously mentioned, the polymer can be obtained by the ring-opening polymerization of the subject monomer in the presence of an inert organic solvent or in the absence of said solvent (bulk polymerization). Said inert organic solvent is preferred to be the type which does not harmfully affect the catalytic system and has a boiling point of 0° to 250° C, more preferably 25° to 200° C. Typical of said solvents are aliphatic hydrocarbons such as pentane, heptane, hexane, petroleum ether and decane; aromatic hydrocarbons such as benzene, toluene and xylene; alicyclic hydrocarbons such as cyclohexane, decaline and cyclooctane; halogenated hydrocarbons such as methylene chloride; 1,2-dichloroethane, 1,1-dichloroethane, 1,2-dichloropropane, chloroform, chlorobenzene; and ethers such as diethyl ether and tetrahydrofuran.

The ring-opening polymerization products used in this invention should be purified (subjected to after-treatment) as the ring-opening polymerization products prepared by the processes set forth in the Japanese Pat. applications Nos. 31755/72, 108902/72, 119785/72, 119968/73 and 123329/73 are purified.

The processes of preparing the ring-opening polymerization products applied in the method of this invention are described in the above-mentioned patent applications.

For preparation of the composition of this invention, the aforesaid ring-opening polymerization homopolymer or copolymer may be used as the previously defined A component, alone or in combination with a resinous material (containing graft copolymers) and/or rubber-like material.

While said ring-opening polymerization homopolymer or copolymer may be mixed in advance with one or more kind of resinous and/or rubber-like (elastic) material, it is possible to carry out said mixing simultaneously with addition of stabilizers of phenolic compounds, thioethers of carboxylic acid esters and phosphite compounds or to blend the first-mentioned mixture with any of the above-mentioned group of stabilizers and thereafter with the remaining stabilizers.

Resinous material used as a component of the component A of the composition of this invention denotes vinyl chloride polymers, styrene homopolymer, methylmethacrylate homopolymer, copolymers prepared by copolymerizing any combination of vinyl monomers selected from the group consisting of styrene, acrylonitrile and methylmethacrylate, other forms of copolymer prepared by copolymerizing at least 50 percent by weight of any of said vinyl monomers and another monomer, and craft copolymers. The term "vinyl chloride polymers," as used in this invention, denotes homopolymers prepared by polymerizing vinyl chloride alone, and copolymers prepared by copolymerizing more than 50 mol% of vinyl chloride with less than 50 mol% of at least one monomer such as vinyl acetate, vinylidene chloride, ethylene, propylene acrylonitrile and maleic acid. These homopolymers and copolymers of vinyl chloride (namely, vinyl chloride polymers) are widely manufactured on an industrial scale by emulsion-, suspension- or bulk-polymerization. Preferred for the object of this invention is a vinyl chloride polymer having a polymerization degree of 350 to 1800, preferably 450 to 1500, suitably 600 to 1300.

The above-mentioned vinyl chloride polymer which is unstable to heat and light is likely to give rise to partial deterioration during the mixing process and consequently should advisably be mixed with a stabilizer (or dehydrochlorination inhibitor) such as metal soap, tin compounds and compounds containing epoxy radical.

The styrene homopolymer, methylmethacrylate homopolymer and above-mentioned copolymers can be prepared by the bulk-, solution-, emulsion- or suspension-polymerization or a combination thereof, using a catalytic system consisting of free-radical initiator such as organic peroxides or other compounds. the copolymers include acrylonitrile-styrene copolymer, methylmethacrylate-styrene copolymer, copolymers of methylmethacrylate as a main component and another monomer (referred to as "methylmethacrylate resin"), acrylonitrile-styrene-methylmethacrylate terpolymer, and copolymers mainly consisting of styrene or acrylonitrile. A most of the homopolymers of styrene and methylmethacrylate and various copolymers are widely manufactured on an industrial scale and applied in broad fields [for the manufacturing process, properties and use, refer to "Plastics Handbook" by Murahashi, Oda and Imoto, published by Asakura Publishing Company and to "Encyclopedia of Polymer Science and Technology (Plastics, resins, rubbers, fibers)" by Herman F. Mark et al, vol 1 to 16 (1964 – 1971) published by John Wiley & Sons, Inc.].

As used in this invention, the above-mentioned resinous material is preferably chosen to have a molecular weight of 3000 to 500000, more preferably 5000 to 200000, though said molecular weight may vary with the kind, thermal and mechanical properties and moldability of said resinous material.

The graft copolymers used as a component of the composition of this invention are prepared by grafting at least one vinyl compound selected from the group consisting of styrene, acrylonitrile and methylmethacrylate to the later described rubber-like material. Said grafting may be effected by the bulk-, emulsion-, suspension- or solution-polymerization or a combination thereof (for example, bulk-suspension polymerization).

The above-mentioned graft copolymers are desired to contain 1 to 85% by weight of rubber-like material and 99 to 15 percent by weight of vinyl compounds, or preferably 2 to 80 percent by weight of rubber-like material and 98 to 20 percent by weight of vinyl compounds.

The graft copolymers obtained by the above-mentioned graft polymerizing processes include methylmethacrylate-butadiene-styrene terpolymer (MBS resin) prepared by grafting styrene and methylmethacrylate to butadiene rubber or styrene-butadiene rubber, acrylonitrile-butadiene-styrene terpolymer (ABS resin) prepared by grafting styrene and acrylonitrile to butadiene rubber, acrylonitrile-butadiene rubber or styrene-butadiene rubber, acrylonitrile-chlorinated polyethylene-styrene terpolymer (ACS resin) prepared by grafting acrylonitrile and styrene to chlorinated polyethylene rubber, methylmethacrylate-chlorinated polyethylene-styrene terpolymer (MCS resin) prepared by grafting methylmethacrylate and styrene to chlorinated polyethylene rubber, graft copolymer (AEVS resin) prepared by grafting styrene and acrylinitrile to ethylene-vinyl acetate rubber, and graft copolymer (AAS resin) prepared by grafting styrene and acrylonitrile to acrylic ester rubber. For the object of this invention, the above-listed graft copolymers do not always require monomeric vinyl compounds to be full grafted to the rubber-like material (elastomer). But the graft copolymer may be of the type in which some of the vinyl compound is grafted to the rubber-like material and the other portion of said vinyl compound is polymerized or copolymerized, that is, the grafted material and polymerized vinyl compound are present in said grafted mass in a mixed form. The process of manufacturing these graft copolymers is already widely known. Some of said graft copolymers are manufactured on an industrial scale and are often used as a master batch in preparing high impact resin [for the manufacturing process, properties and use, refer to "Plastics Handbook" by Murahashi, Oda and Imoto, Published by Asakura Publishing Company and to "Encyclopedia of Polymer Science and Technology (Plastics, resins, rubbers, fibers)" by Herman F. Mark et al, vol 1 to 16 (1964 – 1971) published by John Wiley & Sons, Inc.]. The rubber-like material used in preparing the graft copolymer applied in the method of this invention may take a gel form. A resinous material grafted to the rubber-like material is preferably chosen to have an average molecular weight of 1000 to 200000 or more preferably 2000 to 100000.

The rubber-like material used as a component of the component A of the composition of this invention includes butadiene rubber, chlorinated polyethylene rubber, acrylic ester rubber, ethylene-vinyl acetate rubber, chloroprene rubber, chlorosulfonated polyethylene rubber and alkylene oxide rubber.

The butadiene type rubber includes butadiene rubber and rubber prepared by copolymerizing butadiene as a main component with a small amount (generally 30% by weight of most, preferably 25% by weight at most) of monomer such as styrene or acrylonitrile.

The rubber prepared by copolymerization may be of the random or block type. The butadiene type rubber is prepared by emulsion polymerization, using a redox catalyst or a free-radical initiator as a catalyst or by solution polymerization, using a catalyst consisting of organic lithium compounds (for example, n-butyllithium).

The chlorinated polyethylene rubber is prepared by chlorinating in a solvent or aqueous suspension ethylene homopolymer having a high density of 0.93 to 0.98 g/cc or a copolymer of ethylene and a small amount (generally less than 10 mol%) of $\alpha$-olefin such as propylene or butene-1. Said chlorinated polyethylene rubber is preferred to contain 25 to 45 percent by weight of chlorine.

The acrylic ester rubber is prepared by the emulsion polymerization of a mixture consisting of acrylic acid ester (for example, butyl acrylate) as a main component and a small amount (generally less than 10 percent by weight) of another monomer (for example, acrylonitrile) in the presence of a catalyst such as persulfate. This rubber is generally referred to as acrylic rubber.

The ethylenevinyl acetate rubber is prepared by co-polymerizing ethylene with vinyl acetate by, for example, the emulsion polymerization process. In this case, the content of the vinyl acetate is preferred to be 20 to 60 percent by weight, more preferably 30 to 50 percent by weight based on the rubber.

The chloroprene rubber is prepared by polymerizing a monomer consisting of chloroprene alone or said chloroprene and a small amount of another monomer by the bulk-, solution- or emulsion-polymerization using a catalyst of persulfates, peroxides or azo compounds. This polymerization is generally carried out in the presence of a polymerization-controlling agent such as mercaptans, sulfur and dialkylxanthogen disulfides.

The chlorosulfonated polyethylene rubber is prepared by chlorosulfonating in an organic solvent the homopolymer or copolymer of ethylene used in preparing the aforesaid chlorinated polyethylene rubber. Said chlorosulfonated polyethylene rubber is preferred to contain 20 to 50 percent by weight, more preferably 24 to 45 percent by weight of chlorine and 0.3 to 2.0 percent by weight, more preferably 0.5 to 1.7 percent by weight of sulfur.

The alkylene oxide rubber is prepared by polymerizing alkylene oxides such as ethylene oxide, propylene oxide and epichlorohydrin or other monomers mainly consisting of derivatives of said oxides in the presence of a catalytic system mainly composed of organic metal compounds (for example, organic aluminium compounds).

The above-mentioned various kinds of rubber-like material are preferably chosen to have a Mooney viscosity of 20 to 140, more preferably 30 to 120, or suitably 40 to 110 though said viscosity may vary with the kinds of said rubber-like material.

These rubber-like materials are widely manufactured on an industial scale and applied in broad fields, and the manufacturing processes, properties and applications of said materials are well known [refer to "Synthetic Rubbers Handbook" by S. Kanbara et al published by Asakura Publishing Company and to "Encyclopedia of Polymer Science and Technology (plastics, resins, rubbers, fibers)" by Herman F. Mark et al, vol 1 to 16 (1964 – 1971) published by John Wiley & Sons, Inc,].

The kinds of the resinous and rubber-like material, as well as the proportions thereof based on the ring-opening polymerization homopolymer or copolymer for the subject composition, can be determined according to the object for which said composition is applied.

One or more kinds of resinous and/or rubber-like material may be used. In the latter case, it is possible to mix said resinous and rubber-like materials in advance and then add the mixture to the homopolymer or copolymer or to mix all these components together in preparing the subject composition.

The proportion of the resinous material is generally chosen to be 99 percent by weight at most, more preferably 95 percent by weight or less, most preferably 80 % by weight or less based on the mixture of ring-opening polymerization homopolymer or copolymer and resinous materials and/or rubber-like materials, though said proportion may vary with the kinds of said resinous material and homopolymer or copolymer and the object for which the resultant composition is intended. The proportion of the rubber-like material is generally chosen to be 50 % by weight at most, more preferably 40 percent by weight or less, most particularly 30 percent by weight or less based on the above-mentioned mixture, though said proportion may vary with the kinds of said rubber-like material and homopolymer or copolymer and the object for which the resultant composition is intended. A larger proportion than 50 percent by weight of the rubber-like material undesirably reduces the mechanical properties (particularly the tensile strength) of the resultant composition.

The object of this invention can be attained by adding a stabilizer such as phenolic compounds, and, if necessary, together with thioethers of carboxylic esters or said thioethers and phosphite compounds to the ring-opening polymerization product (ring-opening polymerization homopolymer or copolymer) or a mixture of said homopolymer or copolymer and resinous and/or rubber-like material.

The phenolic compounds used as a stabilizer in this invention are selected from the group consisting of those expressed by the following general formulas (1) to (10):

(1) 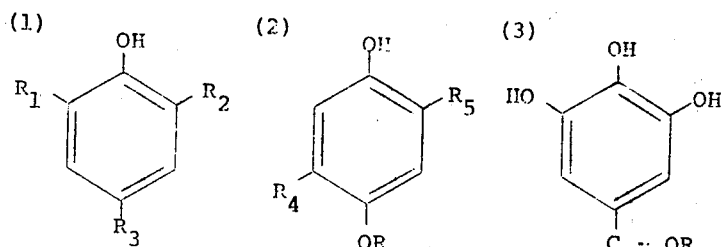
(2) 
(3) 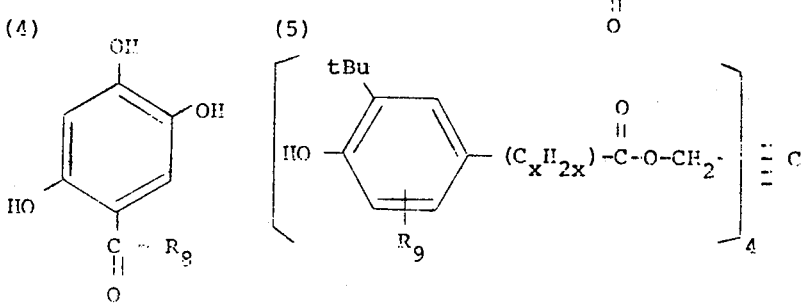
(4) 
(5) 
(6) 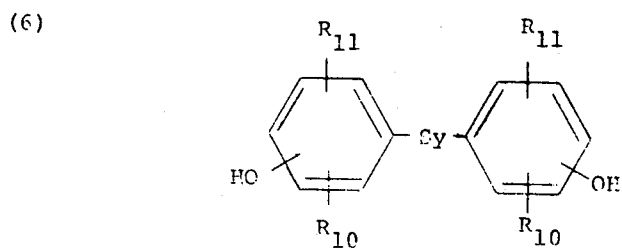
(7) 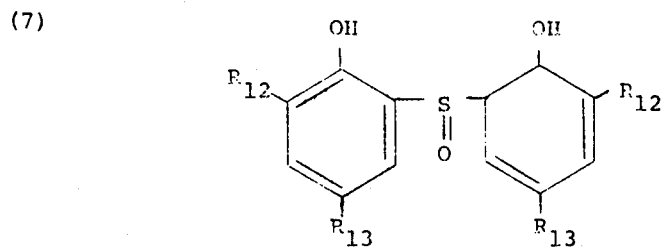
(8) 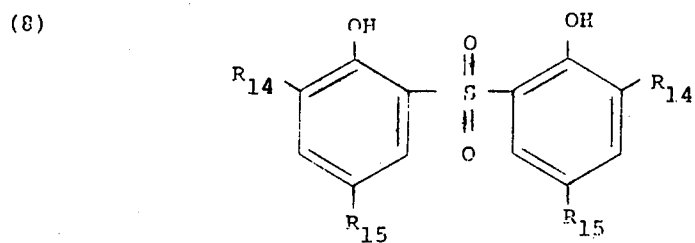
(9) 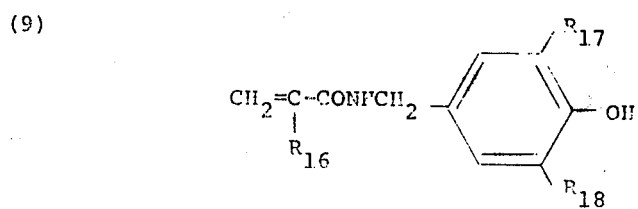

(10)

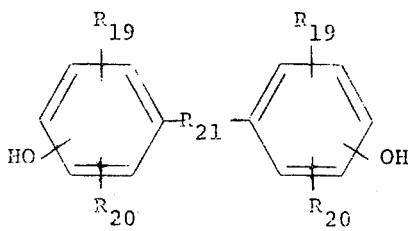

Throughout the above general formulas, $R_1$ to $R_{21}$, x and y respectively denote the same radicals as previously described.

The phenolic compounds may be divided into ten groups: (A), (B), (C), (D), (E), (G), (H), (I) and (J) corresponding to said compounds expressed by the above-mentioned general formulas (1) to (10) respectively.

The (A) group phenolic compounds used as a stabilizer in this invention may be typically exemplified by 2,4,6-trimethylphenol, 2,4,6-ethylphenol, 2,4,6-tri-isopropylphenol, 2,4-dimethyl-6-tert-butylphenol, 2,6-tert-butyl-4-methylphenol, 2-methyl-4,6-di-tert-butylphenol, 2,6-di-tert-butyl-4-ethylphenol, 2,6-di-tert-butyl-4-isobutylphenol, 2-propyl-4-methyl-6-tert-octylphenol, 2,6-di-tert-butyl-4-tert-amylphenol, 2,4-dimethyl-6-hexylphenol, 2,6-di-tert-anyl-4-methylphenol, 2,6-di-tert-amyl-4-methylphenol, 2,4-dimethyl-6-octadecylphenol, 2,6-distearyl-4-methylphenol, 2,6-dilauryl-4-methylphenol, 2,6-di-tert-octyl-4-methylphenol, 2,6-di-tert-butyl-4-stearylphenol, 2,6-di-tert-octyl-4-propylphenol, 2-tert-butyl-4-ethyl-6-tert-octylphenol, 2,4-dimethyl-6-($\alpha,\alpha,\gamma,\gamma$-tetramethylbutyl)phenol, 2,6-di($\alpha,\alpha,\gamma,\gamma$-tetramethyl butyl)-4-methylphenol, 2,4-dimethyl-6-cyclohexylphenol, 2,6-dicyclohexyl-4-methylphenol, 2-propyl-4-cyclohexyl-6-tert-butylphenol, 2,6-dicyclohexyl-4-tert-butylphenol, 2,4,6-tricyclopentylphenol, 2,6-di-tert-butyl-4-cyclopentylphenol, 2,4-dimethyl-6-cycloheptylphenol, 2,4,6-tricycloheptylphenol, 2-methyl-4-(p-methylcyclohexyl)-6-tert-amylphenol, 2-(1-methylcyclohexyl)-4-methylphenol, 2,6-di(1-methylcyclohexyl)-4-methylphenol, 2,4-dimethyl-6-benzylphenol, 2,6-dibenzyl-4-methylphenol, 2-(1-methylbenzyl)-4-methylphenol, 2,6-di-(1-methylbenzyl)-4-methylphenol, 2-(1-ethylbenzyl)-4-methylphenol, 2-(1-butylbenzyl)-4-etylphenol, 2,6-di(1-butylbenzyl)-4-methylphenol, 2,6-di(1-ethylbenzyl)-4-methylphenol, 2,6-di-tert-butyl-4-isopropylphenol, 2,6-di-tert-amyl-4-isopropylphenol, 2,6-diisopropyl-4-ethylphenol, 2-isopropyl-4-methyl-6-tert-butylphenol, 2-isobutyl-4-ethyl-6-tert-hexylphenol, 2,6-di-isopropyl-4-ethylphenol, 2,6-di-isopropyl-4-methylphenol, 2-isopropyl-4-n-butyl-6-methylphenol, 2-isopropyl-4-n-pentyl-6-methylphenol, 2-isopropyl-4-methyl-6-hexylphenol, 2-isobutyl-4-methyl-6-tert-hexylphenol, 2-isobutyl-4-ethyl-6-tert-butylphenol, 2-isobutyl-4-ethyl-6-isopropylphenol, 2-isobutyl-4-ethyl-6-tert-octylphenol, 2-isobutyl-4-n-butyl-6-tert-hexylphenol, 2-isohexyl-4-ethyl-6-n-butylphenol, 2-isohexyl-4-propyl-6-propylphenol, 2-isooctyl-4-methyl-6-ethylphenol, 2-isooctyl-4-butyl-6-ethylphenol, 2-isooctyl-4-butyl-6-ethylphenol, 2-isooctyl-4-isobutyl-6-ethylphenol, 2-isopropyl-4-methyl-6-benzylphenol, 2,6-dibenzyl-4-isobutyl-phenol, 2-(1-methylbenzyl)-4-isopropylphenol, 2,6-di(1-methylbenzyl)-4-isobutylphenol, 2-(1-butylbenzyl)-4-isobutylphenol, 2,6-di(1-methylnonadecy)-4-ethylphenol, 2,6-di(1-methylnonadecyl)-4-butylphenol, 2,6-di(1-methylnonadecyl)-4-laurylphenol, 2,6-di(methylpentadecyl)-4-propylphenol, 2,6-di(1-methylpentadecyl)-4-hexylphenol, 2,6-di(1-methylpentadecyl)-4-octylphenol, 2,6-di(1-methyltridecyl)-4-methylphenol, 2,6-di(1-methylundecyl)-4-nonylphenol, and 2,6-di(1-methylundecyl)-4-myristylphenol.

Typical among the (B) group phenolic compounds are 2-tert-butyl-4-methoxyphenol, 3-tert-butyl-4-methoxyphenol, 2,5-di-tert-butyl-4-methoxyphenol, 2-n-propyl-4-methoxyphenol, 3-isopropyl-4-methoxyphenol, 2,5-di-n-propyl-4-methoxyphenol, 2-hexyl-4-methoxyphenol, 3-hexyl-4-methoxyphenol, 2-methyl-4-methoxyphenol, 3-tert-octyl-4-methoxyphenol, 2-n-octyl-4-methoxyphenol, 3-n-hexyl-4-methoxyphenol, 3-methyl-5-tert-octyl-4-methoxyphenol, 3-n-octyl-4-methoxyphenol, 3-lauryl-4-ethoxyphenol, 2-tert-octyl-4-ethoxyphenol, 3-myristyl-4-ethoxyphenol, 2-myristyl-5-methyl-4-methoxyphenol, 3-palmityl-4-ethoxyphenol, 2-stearyl-4-n-butoxyphenol, 2-palmityl-4-n-butoxyphenol, 2-myristyl-4-n-butoxyphenol, 2-tert-butyl-4-dodecyl-oxyphenol, 2-methyl-4-dodecyl-oxyphenol, 2-n-pentyl-4-dodecyl-oxyphenol, 3-tert-butyl-4-stearyloxyphenol, 3-methyl-4-stearyloxyphenol, 2(1-methylcyclohexyl)-4-methoxy-phenol, 2(1-ethylcyclohexyl)-4-methoxyphenol, 2(1-butyl-cyclohexyl)-4-methoxyphenol, 2(1-methylbenzyl)-4-methoxyphenol, 2(1-ethylbenzyl)-4-methoxyphenol, and 2(1-butylbenzyl)-4-methoxyphenol.

Typical among the (C) group phenolic compounds are methyl gallate, ethyl gallate, n-propyl gallate, n-butyl gallate, n-pentyl gallate, n-hexyl gallate, n-octyl gallate, nonyl gallate, decyl gallate, lauryl gallate, myristyl gallate, palmityl gallate and stearyl gallate.

The (D) group phenolic compounds may be typically exemplified by 2,4,5-trihydroxy-acetophenone, 2,4,5-trihydroxy-n-butyrophenone, 2,4,5-trihydroxypropyophenone, 2,4,5-trihydroxy-stearophenone, 2,4,5-trihydroxy-palmitylophenone, 2,4,5-trihydroxy-myristylophenone, 2,4,5-trihydroxy-laurylophenone, 2,4,5-trihydroxy-nonylophenone, 2,4,5-trihydroxy-octylophenone, and 2,4,5-trihydroxy-heptylophenone.

Typical among the (E) group phenolic compounds are tetra[methylene-3-(3,5-di-tert-butyl-4-hydroxyphenyl)propionate]methane, tetra[methylene-3-(3-tert-butyl-5-n-pentyl-4-hydroxyphenyl)propionate]methane, tetra[methylene-4-(3,5-di-tert-butyl-4-hydroxyphenyl)butyrate]methane, and terta[methylene-4-(3-tert-butyl-5-n-hexyl-4-hydroxyphenyl)butyrate]methane.

Typical among the (F) group phenolic compounds are 2,2'-thiobis(4-methylphenol), 2,2'-thiobis(4-nonylphenol), 2,2'-thiobis(6-tert-butylphenol), 2,2'-thiobis(4,6-dimethylphenol), 2,2'-thiobis(4-methyl-6-tert-butylphenol), 2,2'-thiobis(4-methyl-6-laurylphenol), 2,2'-thiobis(4-ethyl-6-tert-butylphenol), 2,2'-thiobis(4-n-propyl-6-amylphenol), 2,2'-thiobis(4,6-di-tert-butylphenol), 2,2'-thiobis(4-n-butyl-6-sec-butylphenol), 2,2'-thiobis(4-amyl-6-tert-octylphenol), 2,2'-thiobis(4,6-dilaurylphenol), 2,2'-thiobis(4,6-distearylphenol), 2,2'thiobis[4-methyl-6-(1-methylcyclohexyl)phenol], 2,2'-thiobis[4-methyl-6-(1-methylbenzyl)phenol], 2,2'-thiobis(3-methyl-6-tert-butylphenol), 2,2'-thiobis[4-methoxy-6-tert-butylphenol], 2,2'-thiobis(4-methoxy-6-tert-octylphenol), 2,2'-thiobis(4-methoxy-6-sec-butylphenol), 2,2'-thiobis(4-tert-butoxy-6-tert-butylphenol), 4,4'-thiobis(2-tert-butylphenol), 4,4'-thiobis(3-methyl-6-tert-butylphenol), 4,4'-thiobis(3-methyl-6-n-octylphenol), 4,4'-thiobis(3-methyl-6-laurylphenol), 4,4'-thiobis(3-n-propyl-6-amylphenol), 4,4'-thiobis(3,6-di-tert-butylphenol), 4,4'-thiobis(3-amyl-6-tert-octylphenol), 4,4'-thiobis(3,6-dilaurylphenol), 4,4'thiobis(3,6-distearylphenol), 4,4'thiobis(3-methoxy-6-tert-octylphenol), 4,4'-thiobis[3-methyl-6-(1-methylcyclohexyl)phenol], 4,4'thiobis[3-methyl-6-(1-methylbenzyl)phenol], 4,4'-thiobis(2-methyl-6-tert-butylphenol), 4,4'-thiobis(2-methyl-6-laurylphenol), 4,4'-thiobis(2,6-di-tert-butylphenol), 4,4'-thiobis(2,6-distearylphenol), 4,4'-thiobis[2-methyl-6-(1-methylbenzy)phenol], 4,4'-thiobis(2-methyl-6-cyclohexylphenol), 4,4'-thiobis(2-tert-octyl-6-cyclohexylphenol), 4,4'-thiobis(2-methoxy-6-sec-butylphenol), 4,4-thiobis[2-ethoxy-6-sec-butylphenol), 4,4'-thiobis(2-tert-butoxy-6-tert-butylphenol), 2,2'-dithiobis(4-methyl-6-tert-butylphenol), 2,2-dithiobis(4-ethyl-6-sec-butylphenol), 2,2'-dithiobis(4-n-propyl-6-tert-butylphenol), 2,2'-dithiobis(4,6-di-tert-butylphenol), 2,2'-dithiobis(4-n-propoxy-6-tert-butylphenol), 2,2'-dithiobis(4-heptoxy-6-isopropylphenol), 4,4'-dithiobis(2-methyl-6-tert-butylphenol), 4,4'-dithiobis(2,6-di-tert-butylphenol), 4,4'-dithiobis[2-sec-eicosyl-6-(α-methylbenzyl)-phenol], 4,4'-dithiobis(2-sec-eicosyl-6-cyclohexylphenol), 4,4'-dithiobis(2-n-propoxyl-6-tert-butylphenol), 2,2'-trithiobis(4-methyl-6-tert-butylphenol), 2,2'-trithiobis(4-ethyl-6-sec-amylphenol), 2,2'-trithiobis(4,6-di-tert-butylphenol), 2,2'-trithiobis(4-methoxy-6-tert-butylphenol), 4,4'-trithiobis(3-ethyl-6-sec-amylphenol), 4,4'-trithiobis(2-methyl-6-sec-butylphenol), 4,4'-trithiobis(2,6-di-tert-butylphenol), 4,4'-trithiobis(2-isopropyl-6-cyclohexylphenol), 4,4'-trithiobis(2-sec-amyl-6(α,α-dimethylbenzyl)phenol), 4,4'-trithiobis(2-tert-amyl-6(0-methylcyclohexyl)phenol) and 4,4'-trithiobis(2methoxy-6-tert-butylphenol).

The (G) group phenolic compounds typically include 2,2'-bisphenol sulfoxide, 2,2'-bis(4-methylphenol) sulfoxide, 2,2'bis(4-isopropylphenol)sulfoxide, 2,2'-bis(4-tert-butylphenol) sulfoxide, 2,2'-bis(4-isoamylphenol)sulfoxide, 2,2'-bis(4-n-amylphenol)sulfoxide, 2,2'-bis[4-(1,1,3,3-tetramethylbutyl)phenol]sulfoxide, 2,2'-bis[4-(2-ethylhexyl)phenol]sulfoxide, 2,2'-bis(4-nonylphenol)sulfoxide, 2,2'-bis(4-dodecylphenol)sulfoxide, 2,2'-bis(4-methyl-6-tert-butylphenol)sulfoxide, 2,2'-bis(4,6-di-tert-butylphenol)sulfoxide, 2,2'-bis(4-phenylphenol)sulfoxide, 2,2'-bis(4-benzylphenol) sulfoxide, and 2,2'-bis(4-cyclohexylphenol)sulfoxide.

The (H) group phenolic compounds may be typically exemplified by 2,2'-bis(4-methyl-6-tert-butylphenol)-sulfone, 2,2'-bis(4-ethyl-6-tert-butylphenol)sulfone, 2,2'-bis(4-methylphenol)sulfone, 2,2'-bis(4-octylphenol)sulfone and 2,2'-bis(4-nonylphenol)sulfone.

The (I) group phenolic compounds typically include 2,6-di-tert-butyl-4-methacryloylaminomethylphenol, 2,6-diethyl-4-methacryloylaminomethylphenol, 2,6-diethyl-4-acryloylaminomethylphenol, 2,6-diisopropyl-4-methacryloylaminomethylphenol, 2,6-dimethyl-4-methacryloylaminomethylphenol, 2,6-dimethyl-4-acryloylaminomethylphenol, 2,6-di-n-propyl-4-acryloylaminomethylphenol, 2,6-diisopropyl-4-acryloylaminomethylphenol, 2,6-di-n-butyl-4-acryloylaminomethylphenol, 2,6-di-n-propyl-4-methacryloylaminomethylphenol, and 2,6-di-n-butyl-4-methacryloylaminomethylphenol.

Typical among the (J) group phenolic compounds are 2,2'-methylenebis-4-tert-dodecylphenol, 2,2'-methylenebis(4-methyl-6-tert-butylphenol), 2,2'-methylenebis(4-ethyl-6-tert-butylphenol), 2,2'-methylenebis(6-tert-butylphenol), 2,2'-methylenebis(4,6-dimethylphenol), 2,2'-methylenebis(4-methyl-6-amylphenol), 2,2'-methylenebis(4-tert-dodecyl-6-methylphenol), 2,2'-methylenebis[4-methyl-6-(1-methylcyclohexyl)-phenol], 4,4'-methylenebis(3-methylphenol), 4,4'-methylenebis(6-tert-butylphenol), 4,4'-methylenebis(3-ethyl-6-tert-dodecylphenol), 4,4'-methylenebis(3-tert-dodecyl-6-methylphenol), 4,4'-methylenebis[3-methyl-6-(1-methylbenzyl)phenol], 4,4'-methylenebis[3-methyl-6-(1-isobutylcyclohexyl)-phenol], 4,4'-methyllenebis(2,6-di-tert-tutylphenol), 4,4'-methylenebis(2,6-di-tertamylphenol), 4,4'-methylenebis (6-tertbutyl-O-cresol), 2,2'-ethylidenebis(4,6-dimethylphenol), 2,2'-ethylidenebis(2,6-diamylphenol), 2,2'-ethylidenebis(4-tert-butyl-6-tert-octylphenol), 4,4'-ethylidenebis(2,6-di-tert-butylphenol), 2,2'-isopropylidenebisphenol, 2,2'-isopropylidenebis(4-tert-butyl-6-n-dodecylphenol), 2,2'-isopropylidenebis(4,6-di-n-octylphenol), 4,4'-isopropylidenebis (3-tert-butyl-6-n-dodecylphenol), 4,4'-isopropylidenebis(3,6-di-n-octylphenol), 4,4'-isopropylidenebis(2-tert-butyl-6-n-dodecylphenol), 4,4'-isopropylidenebis(2,6-di-n-octylphenol), 2,2'-n-butylidenebis(4-methylphenol), 2,2'-n-butylidenebis [4-methyl-6-(1-methylbenzyl)phenol], 4,4'-n-butylidenebis(3-methylphenol), 4,4'-n-butylidenebis(3-methyl-6-tert-butylphenol), 4,4'-n-butylidenebis[3-methyl-6-(1-methylcyclohexyl) phenol], 4,4'-n-butylidenebis[3-methyl-6-(1-tert-butylbenzyl) phenol], 4,4'-n-butylidenebis[2-methylphenol], 4,4-n-butylidene-bis[2-methyl-6-(1-tert-butylbenzyl)phenol], 2,2'-isobutylidene-bis[4-n-octyl-6-(n-butylcyclohexyl)phenol], 4,4'-isobutylidene-bis[6-1-n-butylcyclohexyl)phenol], 4,4'-isobutylidenebis(3,6-di-n-octylphenol), 4,4'-isobutylidenebis(2,6-di-n-octylphenol), 2,2'-n-decamethylenebis(4-tert-butyl-6-methylphenol), 4,4'-n-decamethylenebis(3-methylphenol), 4,4'-n-decamethylenebis(3-tert-butyl-6-methylphenol), 4,4'-n-decamethylenebis(2-methylphenol), and 4,4'-n-decamethylenebis(2-tert-butyl-6-methylphenol).

Desired among the above-mentioned phenolic compounds are those containing radicals of $R_1$ to $R_8$ having 1 to 9 carbon atoms, a radical of $R_9$ having 3 to 4 carbon atoms, radicals of $R_{10}$, $R_{11}$, $R_{12}$, $R_{13}$, $R_{14}$, $R_{15}$, $R_{19}$ and $R_{20}$ having 1 to 18 carbon atoms, radicals of $R_{17}$ $R_{18}$ having 2 to 4 carbon atoms and a radical of $R_{21}$ having 1 to 12 carbon atoms. The more preferred ones of said desired phenolic compounds are those containing radicals of $R_{10}$, $R_{11}$, $R_{19}$ and $R_{20}$ having 1 to 4 carbon atoms and a radical of $R_{21}$ having 2 to 12 carbon atoms. Most suitable ones of the more preferred phenolic compounds are those containing a radical of $R_{21}$ having 2 to 8 carbon atoms.

The thioethers of carboxylic esters applied in this invention have the following general formula:

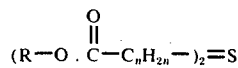

$$(R-O \cdot \overset{O}{\underset{\|}{C}}-C_nH_{2n}-)_2=S$$

where:
R = hydrocarbon radicals selected from the group consisting of an alkyl radical having 1 to 20 carbon atoms, aryl radical having 6 to 20 carbon atoms and aralkyl radical having 7 to 20 carbon atoms
n = an integer of 1 to 20

Typical among the thioethers of carboxylic esters applied in this invention are dibutylthiodipropionate, diamylthiodipropionate, dihexylthiodipropionate, diheptylthiodipropionate, dioctylthiodipropionate, dinonylthiodipropionate, dilaurylthiodipropionate, dimyristylthiodipropionate, laurylstearylthiodipropionate, distearylthiodipropionate, dihexylthiodibutyrate, dilaurylthiodibutyrate, dimyristylthiodibutyrate, dicetylthiodibutyrate, distearylthiodibutyrate, diphenylthiodicaproate, dimethylthiodiundecylate, and dibutylthiodiundecylate.

Desired among the aforesaid thioethers of carboxylic esters are those which contain a radical of R having 10 to 18 carbon atoms and wherein n denotes an integer of 2 to 4. More preferred among said desired thioethers are those which contain a radical of R having 10 to 12 carbon atoms and wherein n denotes an integer of 2.

The phosphite compounds used in this invention have either of the following general formulas (1) and (2):

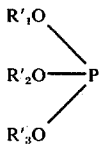 (1)

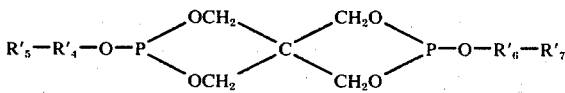 (2)

where:
$R'_1$ to $R'_7$ = the same radicals as previously mentioned

Those of the phosphite compounds used in this invention which are expressed by the general formula (1) typically include triethylphosphite, triisobutylphosphite, tri-2-ethylhexylphosphite, tridecylphosphite, tridodecylphosphite, tristearylphosphite, trioctadecylphosphite, triphenylphosphite, tricyclohexylphosphite, tribenzylphosphite, tritolyphosphite, tri-2-phenylethylphosphite, tri-tert-nonylphenylphosphite, tri(dimethylphenyl)phosphite, tricumenylphosphite, tri($\alpha$-naphthyl)phosphite, tri-tert-octylphenylphosphite, dibutylhexylphosphite, diphenyl(2-ethylhexylphosphite), phenyldiethylphosphite, diisooctyltolylphosphite, diphenylisodecylphosphite, phenyldiisodecylphosphite, diisodecyl-0-tert-butylphenylphosphite, diphenyloctadecylphosphite, diphenyldodecylethylphosphite, benzylmethylisopropylphosphite, butyldicresylphosphite, tributoxyethylphosphite, di(butoxyethyl) phenylphosphite, triphenyloxyethylphosphite, diphenyldodecyloxyethylphosphite, diphenyloxyethyloctadecylphosphite, trioctyloxyethylphosphite, tridodecyloxyethylphosphite, and dinonylphenyloxyethyloctadecylphosphite.

Those of the phosphite compounds which are expressed by the general formula (2) typically include 3,9-diphenoxy-2,4,8,10-tetraoxa-3,9-diphosphospiro-5,5-undecane, 3,9-di-(decyloxy)-2,4,8,10-tetraoxa-3,9-diphosphospiro-5,5-undecane, 3-phenoxy-9-isodecyloxy-2,4,8,10-tetraoxa-3,9-diphosphospiro-5,5-undecane, 3,9-distearyloxy-2,4,8,10-tetraoxa-3,9-diphosphospiro-5,5-undecane, and 3,9-ditolyloxy-2,4,8,10-tetraoxa-3,9-diphosphospiro-5,5-undecane.

Desired among said phosphite compounds are those containing radicals of $R_1'$, $R_2'$, and $R_3'$ having 8 to 12 carbon atoms, radicals of $R_4' + R_5'$ having 6 to 18 carbon atoms in total and $R_6' + R_7'$ having 6 to 18 carbon atoms in total.

For the object of this invention, the above-mentioned phenolic compounds, thioethers of carboxylic esters and phosphite compounds may respectively be used alone or in combination. These three types of components may respectively be used in an amount ranging from 0.01 to 10.0, or preferably from 0.05 to 5.0 parts by weight on the basis of 100 parts by weight of the ring-opening polymerization product or a mixture thereof with resinous materials and/or rubber-like materials. A smaller proportion than 0.01 part by weight of any of said three types of components results in the unsatisfactory stability of said ring-opening polymerization product or the mixture thereof. Conversely, any larger proportion than 10.0 parts by weight of any of said three types of components on the basis of 100 parts by weight of the ring-opening polymerization product or the mixture thereof would be meaningless, because the latter form of compound can not be expected to further increase in stability.

One process of blending all the components applied in this invention consists in homogeneously dissolving or suspending in water or an organic solvent the aforesaid (A) component of the ring-opening polymerization product or a mixture thereof with other materials and the (B) component of phenolic compounds; said (A) and (B) components plus the (C) component of thioethers of carboxylic esters; or said (A), (B) and (C) components plus the (D) component of phosphite compounds and thereafter removing water or said organic solvent.

Other processes are, for example, to knead the aforesaid various forms of mixture in a molten state, using a mixer generally applied in mixing synthetic resins such as a roll moll, extruder or Banbury mixer or to dry blend said mixtures, for example, by a ribbon mixer, Henschel mixer or tumbler. The first-mentioned process of kneading the various forms of mixture is preferred, because it provides a homogeneous composition with relative ease, admits of a simple operation and offers economic advantages. Where it is desired to obtain a far more homogeneous composition, it is advised to apply two or more of the above-mentioned blending processes, for example, to carry out blending on a ribbon mixer and further blend the resultant mixture on an extruder.

According to this invention any or combination of the previously described stabilizers are added to at least one compound selected from the group consisting of ring-opening polymerization homopolymers of the cyano-, ester-, ether- and imide-type norbornene derivatives, copolymers of the abovementioned types of norbornene derivatives and other copolymers of said derivatives and 50 mol% at most of an unsaturated cyclic compounds or a mixture of said ring-opening polymerization homopolymer or copolymer and a resinous and/or rubberlike material, thereby not only rendering the ring-opening polymerization polymer or copolymer or a compound containing said polymer or copolymer more prominently resistant to heat and oxygen, and enabling all the components to be more homogeneously blended, but also providing a colorless or substantially colorless composition, which also retains the transparency characterizing the above-mentioned ring-opening polymerization product.

The previously specified phenolic compounds used alone as a stabilizer in this invention render the resultant composition more prominently resistant to heat and oxygen than the methylenebis phenolic compounds hitherto accepted as a stabilizer for general synthetic resins. Further, it has been disclosed that a binary stabilizing system consisting of said phenolic compounds and thioethers of carboxylic esters or a ternary stabilizing system formed of said phenolic compounds, thioethers and phosphite compounds attains such a high degree of oxidation stability as could hardly be realized by the phenolic compounds alone, namely, these two or three stabilizing components display a synergetic effect among themselves.

Where the phenolic compounds are used together with the thioethers of carboxylic esters, the particularly effective ones of said phenolic compounds are (A) group (indicated by the aforesaid general formula (1), (expressed by the general formula (5)), (F) group (represented by the general formula (6), (I) group (denoted by the general formula (9) and (J) group (expressed by the general formula (10) phenolic compounds, more particularly (A) group, (E) group, (F) group and (I) group phenolic compounds.

Most suitable among the phenolic compounds are practically 2,6-di-tert-butyl-4-acryloylaminomethylphenol, 2,6-di-tert-butyl-P-cresol, 2,2'-thiobis-(4-methyl-6-tert-butylphenol) and tetra[methylene-3-(3,5-di-tert-butyl-4-hydroxyphenyl) propionate]methane. Most preferred among the thioethers of carboxylic esters is dilaurylthiodipropionate. Distearylthiodipropionate tends to lose the transparency of the resultant composition according to the kind of phenolic compound with which said dipropionate is combined.

Those of the phosphite compounds which are indicated by the general formula (2) are better than those represented by the general formula (1). The reason is that the phosphite compounds expressed by the general formula (1) mostly take the liquid state at room temperature and tend to present lower resistance to water. A stabilizing system in which the phenolic compounds, thioethers of carboxylic ester and phosphite compounds are blended in the ratio of 1:1:1 to 4, that is, a stabilizing system containing a larger amount of phosphite compounds than the other components is generally more effective to prevent the objectionable coloring of the resultant composition. Most suitable among those of the phosphite compounds which are expressed by the general formula (2) are practically diphenylpentaerythritoldiphosphite(3,9-diphenoxy-2,4,8,10-tetraoxa-3,9-diphosphospiro-5,5-undecane) and distearylpentaerythritoldiphosphite (3,9-distearyloxy-2,4,8,10-tetraoxa-3,9-diphosphospiro-5,5-undecane).

Where there is used a ternary stabilizing system consisting of the phenolic compounds, thioethers of carboxylic esters and phosphite compounds, the first two compounds display the same behaviors as in a binary stabilizing system omitting the phosphite compounds.

Other stabilizers than the previously described desired phenolic compounds, thioethers of carboxylic esters and phosphite compounds are objectionable, because the resultant compositions decrease in transparency and said other stabilizers rendily escape due to their high volatility during kneading or molding of the compositions under heat.

The composition of this invention which has excellent properties as described above can be put to practical application in the form just as produced. For elevation of stability to oxygen and heat, however, it is possible to use other forms of stabilizer than the above-mentioned stabilizers.

Further depending on the applications, the composition of this invention may be mixed with additives such as flame retardants, ultraviolet absorbers, lubricants, plasticizers, reinforcing agents, fillers, coloring agents, antistatic agents, foaming agents and electric property improvers to display a more prominant effect.

The composition of this invention, whether alone, or in a form mixed with the above-listed additives, can be molded by compression molding, extrusion molding, injection molding, blow molding and casting applied to general types of synthetic resin into various forms such as films, sheets, tapes, boards, rods, spheres, containers, pipes, and so on.

The composition of this invention can be used in wide fields by being molded into various products with its aforesaid advantage drown upon. For example, the compositions may be fabricated into vessels like buckets, films and secondary processed goods thereof such as bags, writing-materials, packing material, water pipes and joints thereof daily sundry goods, kitchen utensils, parts of machines and electric appliances including illumination apparatuses, tools for agriculture or marine product industry and parts thereof, interior articles and toys.

This invention will be more fully understood by reference to the examples which follow.

EXAMPLES 1 to 8, CONTROLS 1, 2

A fully dried and nitrogen-purged 20$l$ stainless steel autoclave was charged (followed by thorough stirring) with 4$l$ of a 5-cyano-bicyclo[2,2,1]-heptene-2(containing 40 percent of exo type isomer) as a monomer distilled for purification by a precision distillation device immediately before application, 12$l$ of 1,2-dichloroethane as a solvent dehydrated by calcium hydride immediately before application and 24.8 ml (0.612 mol% based on the monomer) of n-hexene-1 as a molecular weight-controlling agent. Added to this mixed solution were 96.6 ml of 1,2-dichloroethane solution of tungsten hexachloride (0.2 mol/$l$) as a polymerization catalyst, 115 ml of 1,2-dichloroethane solution of diethyl aluminium chloride (1.0 mol/$l$) as a polymerization catalyst and 96.6 ml of 1,2-dichloroethane solution of 1,1-diethoxyethane[$CH_3CH(OC_2H_5)_2$] as a third component. (Based on 1 mol of the monomer, the proportion of the tungsten hexachloride was 0.545 millimol, the proportion of the diethyl aluminum chloride was 3.27 millimols and the proportion of the 1,1-diethoxyethane was 1.64 millimols.) Polymerization was continued 2 hours at 70° C. Upon completion of polymerization, a solution containing a reaction product (including a ring-opening polymerization product, residual catalyst, solvent unreacted monomer and molecular weight-controlling agent) was taken out of the autoclave, and allowed to cool. 100 ml of monoethanolamine was added to said solution, followed by full stirring. The mass was poured in a large amount (about 40l) of methylalcohol to precipitate the ring-opening polymerization product obtained. This ring-opening polymerization product was subjected to two disolution-precipitation cycles by an acetone/methylalcohol system. After taken out of the system, the ring-opening polymerization product was dissolved in methylene chloride. The resultant solution was washed three times with a 1 percent aqueous solution of sodium tripolyphosphate. Then, water washing was carried out three times. The ring-opening polymerization product was diluted with acetone to a concentration of about 10 percent by weight. The diluted ring-opening polymerization product was precipitated by a large amount of methyl alcohol. The precipitated ring-opening polymerization product was taken out and dried 48 hours at vacuum and 45° C. The ring-opening polymerization product thus treated was a white flaky form, and indicated a conversion of 85.0 percent and a reduced viscosity of 0.70 as measured at 30° C in dimethylformamide in which said product was dissolved at a concentration of 0.1g/d$l$.

The ring-opening polymerization product purified by the above-mentioned process was pulverized into powders of about 10 mesh. 100 parts by weight of the powdered ring-opening polymerization product were mixed 3 minutes in a Henschel mixer with 3 parts by weight of each of the following stabilizers: 2,6-di-tert-butyl-p-cresol (hereinafter referred to as a "stabilizer 1"), 2-isobutyl-4-ethyl-6-tert-hexylphenol (hereinafter referred to as a "stabilizer 2"), 2-tert-butyl-4-methoxyphenol (hereinafter referred to as a "stabilizer 3"), 2-(1-methylbenzyl)-4-methoxyphenol (hereinafter referred to as a "stabilizer 4"), methyl gallate (hereinafter referred to as a "stabilizer 5"), stearyl gallate (hereinafter referred to as a "stabilizer 6"), 2,4,5-trihydroxy-n-butyrophenone (hereinafter referred to as a "stabilizer 7"), 2,4,5-trihydroxystearophenone (hereinafter referred to as a "stabilizer 8"), and the formerly used 2,2'-methylenebis(4-methyl-6-tert-butylphenol) (hereinafter referred to as a "stabilizer 9"). The respective mixtures were melted and kneaded in a 13 mm extruder (the cylinder temperature set at 150° C at point $C_1$ and 220° C at point $C_2$, the die temperature set at 220° C, and the screw rotated at the speed of 40 revolutions per minute).

Naked eye observation was made of discolorment occurring on the mixtures and a ring-opening polymerization product free from any stabilizer (a blank), after all these samples were allowed to stand 15 and 30 minutes at 220° C, the air or 60 minutes at 250° C in a hot press, the results being set forth in Table 1 below.

Table 1

| Number of example and control | Kind of stabilizer | Discolorment Left intact in the air (at 220° C) | | Left intact 60 minutes at 250° C in a hot press |
| --- | --- | --- | --- | --- |
| | | 15 min. | 30 min. | |
| Control 1 | Blank | 5 | 7 | 4 |
| Example 1 | 1 | 4 | 5 | 3 |
| 2 | 2 | 4 | 5 | 3 |
| 3 | 3 | 4 | 5 | 3 |
| 4 | 4 | 3 | 4 | 2 |
| 5 | 5 | 4 | 5 | 3 |
| 6 | 6 | 3 | 4 | 2 |
| 7 | 7 | 3 | 4 | 2 |
| 8 | 8 | 4 | 5 | 3 |
| Control 2 | 9 | 4 | 6 | 3 |

Note: The following numerals given in Table 1 above and other tables denote the various degrees of discolorment observed by the naked eye.
1 Colorless, transparent
2 Faintly yellow
3 Light yellow
4 Yellow
5 Yellowish brown
6 Chocolate
7 Dark yellowish brown
8 Dark brown
9 Brownish black
10 Black

EXAMPLE 9

The same type of autoclave as used in Example 1 was charged (followed by thorough stirring) with 3.0 kg of 5-methyl-5-methoxycarbonyl-bicyclo[2,2,1]-heptene-2 as a monomer distilled for purification at vacuum by a precision distillation device immediately before application, 9$l$ of 1,2-dichloroethane as a solvent dehydrated by calcium hydride immediately before application and 22.2 m$l$ (1.0 mol% based on the monomer) of n-hexene-1 as a molecular weight controlling agent. Added to this mixture solution were 71.7 m$l$ of 1,2-dichloroethane solution of tungsten hexachloride (0.2 mol/l) as a polymerization catalyst, 81.6 m$l$ of 1,2-dichloroethane solution of diethyl aluminium chloride (1.0 mol/$l$) as a polymerization catalyst and 71.7 m$l$ of 1,2-dichloroethane solution of 1,1-diethoxyethane as a third component. (Based on 1 mol of the monomer, the proportion of the tungsten hexachloride was 0.8 millimol, the proportion of the diethyl aluminium chloride was 4.8 millimols and the proportion of the 1,1-diethoxyethane was 2.4 millimols). Ring-opening polymerization was continued 3 hours at 45° to 5° C. Upon completion of polymerization, purification (aftertreatment) was carried out in the same manner as in Example 1. The resultant ring-opening polymerization product presented a white flaky form and indicated a conversion of 85.0 percent and a reduced viscosity of 0.74 as measured in 1,2-dichloroethane at 30° C in which said product was dissolved at a concentration of 0.1g/dl.

The ring-opening polymerization product purified as described above was pulverized into powders of about 10 mesh. The powdered ring-opening polymerization product free from a stabilizer which was allowed to stand 15 and 30 minutes at 220° C in the air presented discolorments of 3 (light yellow) and 4 (yellow) respectively. When hot pressed 60 minutes at 250° C at a pressure of 100 kg/cm$^2$, said powdered ring-opening polymerization product was discolored to a shade of 4 (yellow).

100 parts by weight of the powdered ring-opening polymerization product was mixed with 3 parts by weight of the stabilizer 1 in the Henschel mixer in the same manner as in Example 1. The mixture was melted and kneaded in an extruder in the same manner as in Example 1. When allowed to stand 15 and 30 minutes at 220° C in the air, the extruded mixture indicated discolorments of 1 (colorless, transparent) and 2 (faintly yellow) respectively. When hot pressed 60 minutes at 250° C at a pressure of 100 kg/cm$^2$, said mixture still presented a discolorment of 2 (faintly yellow).

Mixing was carried out in the Henschel mixer in substantially the same manner as described above, excepting that the stabilizer 1 used therein was replaced by the conventional stabilizer 9 for comparison. The mixture was kneaded in an extruder in the same manner as in Example 1. When allowed to stand 15 and 30 minutes at 220° C in the air, the extruded mixture showed discolorments of 2 (faintly yellow) and 3 (light yellow) respectively. When hot pressed 60 minutes at 250° C at a pressure of 100 kg/cm$^2$, the pressed mixture presented a discolorment of 3 (light yellow).

EXAMPLES 10 to 14, CONTROLS 3 to 12

A fully dried and nitrogen-purged autoclave of the same type as used in Example 1 was charged (followed by thorough stirring) with 11.4$l$ of 1,2-dichloroethane as a solvent dehydrated by calcium hydride immediately before application, 2.84 kg (20 mols; monomer concentration of 20 wt/vol%) of 5,5-dicyano-bicyclo[2,2,1]-heptene-2 as a monomer distilled for purification at vacuum by a precision distillation device immediately before application and 24.8 m$l$ (1 mol% based on the monomer) of n-hexene-1 as a molecular weight controlling agent. Added to the charged mass were 100 ml (0.1 mol% based on the monomer) of 1,2-dichloroethane solution of tungsten hexachloride (0.2 mol/l) as a polymerization catalytic component, 100 m$l$ (3 mols per mol of the tungsten hexachloride) of 1,2-dichloroethane solution of 1,1-diethoxyethane (0.6 mol/$l$) as a third component and 120 m$l$ (6 mols per mol of the tungsten hexachloride) of 1,2-dichloroethane solution of diethyl aluminium chloride (1.0 mol/$l$) as a catalytic component. Polymerization was continued 5 hours at 70° C. The charged mass was poured in 30$l$ of methyl alcohol containing 5 percent by volume of 35 wt percent hydrochloric acid, followed by thorough mixing, and filtration. The ring-opening polymerization product obtained was fully washed with methyl alcohol and dried 48 hours at vacuum at 45° C. As the result, said product had a weight of 2.07 kg, presented a white powdery form, and indicated conversion of 73.0 percent and a reduced viscosity of 0.54 as measured in dimethylformamide at 30° C in which said product was dissolved at a concentration of 0.1 g/dl. This product is hereinafter referred to as a "polymer 1".

After dried and purged with nitrogen, the autoclave used in Example 1 was charged (followed by stirring for homogeneous mixing) with 8.0l of 1,2-dichloroethane as a solvent dehydrated by calcium hydride immediately before application, 2.66 kg (20 mols; monomer concentration of 25 wt/vol%) of 5-cyanomethyl-bicyclo[2,2,1]-heptene-2 as a monomer distilled for purification at vacuum by a precision distillation device immediately before application and 17.3 mol% based on the monomer) of n-hexene-1 as a molecular weight-controlling agent. Added to the charged mass were 70ml (0.07 mol% based on the monomer) of 1,2-dichloroethane solution of tungsten hexachloride (0.2 mol/l) as a polymerization catalytic component, 70 ml (0.21 mol% based on the monomer) of 1,2-dichloroethane solution of 1,1-diethoxyethane (0.6 mol/l) as a third component and 84 ml (0.42 mol% based on the monomer) of 1,2-dichloroethane solution of diethyl aluminium chloride (1.0 mol%/l) as a catalytic component. Polymerization was continued 4 hours at 70° C. Aftertreatment was carried out in the same manner as in Example 1. The ring-opening polymerization product obtained had a weight of 2.31 kg, presented a white powdery form, and indicated a conversion of 87% and a reduced viscosity of 0.68 as measured in dimethylformamide at 30° C in which said product was dissolved at a concentration of 0.1 g/dl. This polymer is hereinafter referred to as a "polymer 2".

After fully dried and purged with nitrogen, the clave used in Example 1 was charged (followed by stirring for homogeneous mixing) with 8.0l of 1,2-dichloroethane as a solvent dehydrated by calcium hydride immediately before application, 2.66 kg (20 mol; monomer concentration of 25 wt/vol%) of 5-cyano-5-methyl-bicyclo[2,2,1]-heptene-2 as a monomer distilled for purification at vacuum by a precision distillation device immediately before application and 17.3 ml (0.7 mol% based on the monomer) of n-hexene-1 as a molecular weight-controlling agent. Added to the charged mass were 80ml (0.08 mol% based on the monomer) of 1,2-dichloroethane solution of tungsten hexachloride (0.2 mol/l) as a polymerization catalytic component, 80 ml (3 mols per mol of the tungsten hexachloride) of 1,2-dichloroethane solution of 1,1-diethoxyethane (0.6 mol/l) as a third component and 96 ml (6 mols per mol of the tungsten hexachloride) of 1,2-dichloroethane solution of diethyl aluminium chloride (1.0 mol/l) as a polymerization catalytic component. Polymerization was continued 3 hours at 70° C. Upon completion of polymerization, aftertreatment was effected in the same manner as in Example 1. The ring-opening polymerization product obtained had a weight of 2.18 kg, assumed a white powdery form and indicated a conversion of 82 percent and a reduced viscosity of 0.65 as measured in dimethylformamide at 30° C in which said product was dissolved at a concentration of 0.1 g/dl. This product is hereinafter referred to as a "polymer 3."

After fully dried and purged with nitrogen, the autoclave used in Example 1 was charged (followed by stirring for homogeneous mixing) with 12.0l of 1,2-dichloroethane as a solvent purified in the same manner as in Example 1, 3.34 kg (28 mols) of 5-cyano-bicyclo[2,2,1]-heptene-2 as a monomer purified in the same manner as in Example 1, 0.82 kg (12 mols) of cyclopentene also as a monomer precisely distilled for purification and 34.6 ml (0.7 mol% based on the monomer) of n-hexene-1 as a molecular weight-controlling agent. Added to the charged mass were 120 ml (0.06 mol% based on the monomer) of 1,2-dichloroethane solution of tungsten hexachloride (0.2 mol/l) as a polymerization catalytic component, 120 ml (3 mols per mol of the tungsten hexachloride) of 1,2-dichloroethane solution of 1,1-diethoxyethane (0.6 mol/l) as a third component, and 144 ml (6 mols per mol of the tungsten hexachloride) of 1,2-dichloroethane solution of diethyl aluminium chloride (1.0 mol/l). Polymerization was continued 4 hours at 70° C. Upon completion of polymerization, aftertreatment was carried out in the same manner as in Example 1. The product obtained had a weight of 3.04 kg and presented a white powdery form, and, upon element analysis, was formed to be a copolymer containing 67 mol% of 5-cyano-bicyclo[2,2,1]-heptene-2. Said copolymer indicated a reduced viscosity of 0.62, as measured in dimethylformamide at 30° C in which said copolymer was dissolved at a concentration of 0.1 g/dl. This product is hereinafter referred to as a "polymer 4."

After fully dried and purged with nitrogen, the autoclave used in Example 1 was charged (followed by stirring for homogeneous mixing) with 8.0l of 1,2-dichloroethane as a solvent purified in the same manner as in Example 1, 1.67 kg (14 mols) of 5-cyano-bicyclo[2,2,1]-heptene-2 as a monomer purified in the same manner as in Example 1, 0.95 kg (6 mols) of 5-methyl-5-methoxycarbonyl-bicyclo[2,2,1]-heptene-2 also as a monomer purified in the same manner as in Example 1 and 14.8 ml (0.6 mol% based on the monomer) of n-hexene-1 as a molecular weight-controlling agent. Added to the charged mass were 75 ml (0.075 mol% based on the monomer) of 1,2-dichloroethane solution of tungsten hexachloride as a polymerization catalytic component, 75 ml (3 mols per mol of the tungsten hexachloride) of 1,2-dichloroethane solution of 1,1-diethoxyethane (0.6 mol/l) as a third component and 90 ml (6 mols per mol of the tungsten hexachloride) of 1,2-dichloroethane solution of diethyl aluminium chloride (1.0 mol/l) also as a polymerization catalytic component. Polymerization was continued 3 hours at 70° C. Upon completion of polymerization, aftertreatment was carried out in the same manner as in Example 1. The product obtained had a weight of 2.23 kg, presented a white powdery form, and upon element analysis, was found to be a copolymer containing 74 mol% of 5-cyano-bicyclo [2,2,1]-heptene-2. The product indicated a reduced viscosity of 0.72 as measured in dimethylformamide at 30° C in which the product was dissolved at a concentration of 0.1 g/dl. This product is hereinafter referred to as a "polymer 5."

The various polymers prepared by the above-mentioned processes were pulverized to about 10 mesh. 3 parts by weight of 2,6-di-tert-butyl-p-cresol (stabilizer 1) were added to 100 parts by weight of each polymer sample. 3 parts by weight of 2,2'-methylenebis(4-methyl-6-tert-butylphenol) (conventional stabilizer 9) were added to 100 parts by weight of each polymer sample. The mixture was blended in a dry state Henschel the Henchel mixer and then kneaded in a molten state in an extruder as in Example 1.

Naked eye observation was made of discolorment occurring on the respective mixture samples and blank polymer samples free from a stabilizer when all these samples were allowed to stand 15 and 30 minutes at 220° C in the air and also when heated 60 minutes at 250° C in a hot press, the results being set forth in Table 2 below.

Table 2

| No. of example and control | Polymer | Kind of stabilizer | Discolorment Left intact at 220° C in the air | | Heated 60 min. at 250° C in a hot press |
|---|---|---|---|---|---|
| | | | 15 min. | 30 min. | |
| Control 3 | 1 | blank | 7 | 9 | 5 |
| Example 10 | 1 | 1 | 5 | 6 | 3 |
| Control 4 | 1 | 9 | 6 | 7 | 4 |
| Control 5 | 2 | blank | 4 | 6 | 4 |
| Example 11 | 2 | 1 | 2 | 4 | 2 |
| Control 6 | 2 | 9 | 3 | 5 | 3 |
| Control 7 | 3 | blank | 5 | 7 | 4 |
| Example 12 | 3 | 1 | 4 | 5 | 3 |
| Control 8 | 3 | 9 | 4 | 6 | 3 |
| Control 9 | 4 | blank | 4 | 6 | 4 |
| Example 13 | 4 | 1 | 2 | 4 | 3 |
| Control 10 | 4 | 9 | 3 | 5 | 3 |
| Control 11 | 5 | blank | 4 | 6 | 4 |
| Example 14 | 5 | 1 | 2 | 4 | 3 |
| Control 12 | 5 | 9 | 3 | 5 | 3 |

Note: The numerals given in Table 2 above denote the same shades of discolorment as indicated in Table 1.

EXAMPLES 15 TO 18, CONTROLS 13, 14

100 parts by weight of the ring-opening polymerization product of 5-cyano-bicyclo[2,2,1]-heptene-2 prepared in Example 1 and different amounts (shown in Table 3 below) of the stabilizer 1 (2,6-di-tert-butyl-p-cresol), stabilizer 7 (2,4,5-trihydroxy-n-butyrophenone) and stabilizer 9 [(2,2'-methylenebis(4-methyl-6-tert-butylphenol)] were dry blended in a Henschel mixer as in Example 1. The mixture was kneaded in a molten state in an extruder as in Example 1.

Naked eye observation was made of discolorment appearing on the kneaded samples when they were allowed to stand in the air and also when heated in a hot press as in Example 1, the results being set forth in Table 3 below.

Table 3

| No. of example and Control | Stabilizer Kind | Stabilizer Proportion (part by weight) | Discolorment Left intact at 220° C in the air 15 min. | 30 min. | Heated 60 min. at 250° C in a hot press |
|---|---|---|---|---|---|
| Example 15 | 1 | 1.0 | 4 | 6 | 3 |
| Example 16 | 1 | 5.0 | 3 | 5 | 2 |
| Example 17 | 7 | 1.0 | 4 | 5 | 3 |
| Example 18 | 7 | 5.0 | 3 | 4 | 2 |
| Control 13 | 9 | 1.0 | 5 | 7 | 3 |
| Control 14 | 9 | 5.0 | 4 | 6 | 3 |

Note: The numerals given in Table 3 above denote the same shades of discolorment as indicated in Table 1.

EXAMPLES 19 TO 22, CONTROLS 15 TO 18

50 parts by weight of the ring-opening polymerization product samples of 5-cyano-bicyclo[2,2,1]-heptene-2 prepared in the same manner as in Example 1 and 50 parts by weight of polyvinyl chloride having a polymerization degree of 1100 containing 3 percent by weight of dibutyltin maleate as a stabilizer (manufactured by Kureha Chemical Industry Co., Ltd. under a trade name "Kureha PVC S901") were kneaded in a molen state on a hot roll whose surface temperature was set at 180° C. The kneaded mass is hereinafter referred to as a "composition A."

100 parts by weight of the above-mentioned ring-opening polymerization product samples of 5-cyano-bicyclo[2,2,1]-heptene-2 and 50 parts by weight of styrene-butadiene rubber having a Mooney viscosity of 50 and containing 23.5 percent by weight of styrene (manufactured by Japan Synthetic Rubber Co., Ltd. under a trade name "JSR-1502") were kneaded in a molten state in the same manner as described above. The kneaded mass is hereinafter referred to as a "composition B."

100 parts by weight of said ring-opening polymerization product samples of 5-cyano-bicyclo[2,2,1]-heptene-2 and 20 parts by weight of methylmethacrylate-butadiene-styrene terpolymer (manufactured by Kanegafuchi Chemical Industry Co., Ltd. under a trade name "Kaneace B-12") were kneaded in a molten state in the same manner as described above. The kneaded mass is hereinafter referred to as a "composition C."

50 parts by weight of the ring-opening polymerization product samples of 5-cyano-bicyclo[2,2,1]-heptene-2,50 parts by weight of the aforesaid polyvinyl chloride containing 3% by weight of dibutyltin maleate and 10 parts by weight of the above-mentioned styrene-butadiene rubber were kneaded in a molten state in the same manner as mentioned above. The kneaded mass is hereinafter referred to as a "composition D."

100 parts by weight of the respective compositions A to D and 3.0 parts by weight of 2,6-di-tert-butyl-p-cresol (stabilizer 1) were kneaded on a hot roll in the same manner as described above.

Naked eye observation was made of discolorment appearing on the kneaded samples and blank polymer samples free from a stabilizer (controls) when all these samples were allowed to stand at 220° C, 15 and 30 minutes in the air and also heated 60 minutes at 250° C in a hot press, the results being shown in Table 4 below.

Table 4

| No. of Example and Control | Kind of composition | Discolorment Left intact at 220° C in the air 15 min. | 30 min. | Heated 60 min. at 250° C in a hot press |
|---|---|---|---|---|
| Example 19 | A | 4 | 5 | 3 |
| Control 15 | A | 5 | 6 | 4 |
| Example 20 | B | 3 | 4 | 3 |
| Control 16 | B | 5 | 7 | 4 |
| Example 21 | C | 3 | 4 | 3 |
| Control 17 | C | 5 | 7 | 4 |
| Example 22 | D | 4 | 5 | 3 |
| Control 18 | D | 5 | 6 | 4 |

Note:
(1) The numerals given in Table 4 above denote the same shades of discolorment as in Table 1.
(2) The samples of Examples 19 and 22 and Controls 15 and 18 were allowed to stand at 200° C, 15 and 30 minutes in the air and also heated 60 minutes in the air and also heated 60 minutes at 180° C in a hot press.

EXAMPLES 23 TO 25, CONTROLS 19

100 parts by weight of the respective ring-opening polymerization products used in Example 1 and 3 parts by weight of tetra[methylene-3-(3,5-di-tert-butyl-4-hydroxyphenyl)propionate]methane (hereinafter referred to as a "stabilizer 10", tetra[methylene-3-(3-tert-butyl-5-n-pentyl-4-hydroxyphenyl)propionate]methane (hereinafter referred to as a "stabilizer 11"), tetra[methylene-4-(3,5-di-tert-butyl-4-hydroxyphenyl)butyrate]methane (hereinafter referred to as a "stabilizer 12"), and octadecyl-3-(3',5'-di-tert-butyl-4'-hydroxyphenyl)propionate (hereinafter referred to as a "stabilizer 13") respectively were mixed in the same manner as in Example 1.

Naked eye observation was made of discolorant presented on said mixed samples in the same manner as in Example 1, the results being indicated in Table 5 below. In this experiment, the composition of Control 19 lost transparency and presents a somewhat different shade of discolorment from the other samples.

Table 5

| No. of Example and Control | Kind of stabilizer | Discolorment Left intact at 220° C in the air | | Heated 60 min. at 250° C in a hot press |
| --- | --- | --- | --- | --- |
| | | 15 min. | 30 min. | |
| Example 23 | 10 | 4 | 5 | 3 |
| Example 24 | 11 | 4 | 5 | 3 |
| Example 25 | 12 | 3 | 6 | 3 |
| Control 19 | 13 | 5 | 6 | 3 |

Note: The numerals given in Table 5 above denote the same shades of discolorment as in Table 1.

EXAMPLES 26, 27, CONTROL 21

100 parts by weight of the powdered ring-opening polymerization product used in Example 9 were mixed with 3 parts by weight of the stabilizer 10, and 100 parts by weight of said powdered product were also mixed with 3 parts by weight of the stabilizer 12 in the same manner as in Example 9. Naked eye observation was made of discolorment occurring on said mixed samples in the same manner as in Example 9, the results being set forth in Table 6 below.

Table 6

| No. of Example | Kind of stabilizer | Discolorment Left intact at 220° C in the air | | Heated 60 minutes at 250° C in a hot press |
| --- | --- | --- | --- | --- |
| | | 15 min. | 30 min. | |
| Example 26 | 10 | 1 | 2 | 2 |
| Example 27 | 12 | 2 | 3 | 2 |

Note: The numerals given in Table 6 above denote the same shades of discolorment as in Table 1.

EXAMPLES 28 TO 37

100 parts by weight of the powdered polymer 1, 2, 3, 4 or 5 and 3 parts by weight of tetra[methylene-3-(3,5-di-tert-butyl-4-hydroxyphenyl)propionate]methane (stabilizer 10) were mixed in the same manner as in Example 23 to 25, and also 100 parts by weight of said powdered polymer 1, 2, 3, 4 or 5 and 3 parts by weight of tetra[methylene-4-(3,5-di-tert-butyl-4-hydroxyphenyl)butyrate]methane (stabilizer 12) were mixed as in Example 1.

Naked eye observation was made of discolorment appearing on said mixed samples in the same manner as in Example 1, the results being set forth in Table 7 below.

Table 7

| No. of Example | Kind of polymer | Kind of stabilizer | Discolorment Left intact at 220° C in the air | | Heated 60 minutes at 250° C in a hot press |
| --- | --- | --- | --- | --- | --- |
| | | | 15 min. | 30 min. | |
| Example 28 | 1 | 10 | 4 | 5 | 3 |
| Example 29 | 1 | 12 | 5 | 6 | 3 |
| Example 30 | 2 | 10 | 2 | 4 | 2 |
| Example 31 | 2 | 12 | 3 | 5 | 3 |
| Example 32 | 3 | 10 | 4 | 6 | 3 |
| Example 33 | 3 | 12 | 3 | 5 | 3 |
| Example 34 | 4 | 10 | 3 | 5 | 3 |
| Example 35 | 4 | 12 | 2 | 4 | 3 |
| Example 36 | 5 | 10 | 2 | 4 | 3 |
| Example 37 | 5 | 12 | 3 | 5 | 3 |

Note: The numerals given in Table 7 above denote the same shades of discolorment as in Table 1.

EXAMPLES 38 TO 43

100 parts by weight of the ring-opening polymerization product of 5-cyano-bicyclo[2,2,1]-heptene-2 used in Example 1 were mixed each time with different amounts (shown in Table 8 below) of the stabilizer 10, namely, tetra [methylene-3-(3,5-di-tert-butyl-4-hydroxyphenyl)propionate] methane and stabilizer 11, namely, tetra[methylene-3-(3-tert-butyl-5-n-pentyl-4-hydroxyphenyl)propionate]methane and stabilizer 12, namely, tetra[methylene-3-(3,5-di-tert-butyl-4-hydroxyphenyl)butyrate]methane in the same manner as in Examples 23 to 25.

Naked eye observation was made of discolorment appearing on said mixed samples in the same manner as in Example 1, the results being presented in Table 8 below.

Table 8

| No. of Example | Stabilizer | | Discolorment | | Heated 60 minutes at 250° C in a hot press |
| --- | --- | --- | --- | --- | --- |
| | Kind | Proportion (parts by weight) | Left intact at 220° C in the air | | |
| | | | 15 min. | 30 min. | |
| Example 38 | 10 | 1 | 4 | 5 | 3 |
| 39 | 10 | 5 | 3 | 4 | 2 |
| 40 | 11 | 1 | 4 | 6 | 3 |

Table 8-continued

| No. of Example | Stabilizer Kind | Proportion (parts by weight) | Discolorment Left intact at 220° C in the air 15 min. | 30 min. | Heated 60 minutes at 250° C in a hot press |
| --- | --- | --- | --- | --- | --- |
| 41 | 11 | 5 | 3 | 4 | 2 |
| 42 | 12 | 1 | 4 | 6 | 3 |
| 43 | 12 | 5 | 3 | 5 | 2 |

Note: The numerals given in Table 8 above denote the shades of discolorment as in Table 1.

EXAMPLES 44 TO 47

100 parts by weight of each of the compositions A, B, C and D used in Examples 19 to 22 and 3 parts by weight of the stabilizer 10, namely, tetra[methylene-3-(3,5-di-tert-butyl-4-hydroxyphenyl) propionate]methane, were mixed in the same manner as described in Examples 19 to 22.

Naked eye observation was made of discolorment presented on said mixed samples when all these samples were allowed to stand at 200° C and 220° C 15 and 30 minutes in the air and also heated 30 and 60 minutes at 200° C and 250° C respectively in a hot press, the results being given in Table 9 below.

EXAMPLES 49 TO 53

The ring-opening polymerization product of 5-cyano-bicyclo[2,2,1]-heptene-2 was dry blended in a Henschel mixer as in Example 1 with each of the following different stabilizers from that of Example 1: 2,2'-thiobis(4-methyl-6-tert-butylphenol) (hereinafter referred to as a "stabilizer 15"), 2,2'-thiobis(4-octylphenol) (hereinafter referred to as a "stabilizer 16"), 4,4'-bis(2,6-di-tert-butylphenol) sulfoxide (hereinafter referred to as a "stabilizer 17"), 2,2'-bis(4-methyl-6-tert-butylphenol) sulfoxide (hereinafter referred to as a "stabilizer 18"), and 2,2'-bis(4-methyl-6-tert-butylphenol)sulfone (hereinafter referred to as a Table 9

| No. of Example and Control | Kind of composition | Discolorment Left intact at 200° C in the air | | Left intact at 220° C in the air | | Heated in a hot press | |
| --- | --- | --- | --- | --- | --- | --- | --- |
| | | 15 min. | 30 min. | 15 min. | 30 min. | at 200° C 30 min. | at 200° C 60 min. |
| Example 44 | A | 3 | 4 | — | — | 3 | — |
| Example 45 | B | — | — | 3 | 4 | — | 3 |
| Example 46 | C | — | — | 3 | 4 | — | 3 |
| Example 47 | D | 4 | 5 | — | — | 4 | — |

Note: The numerals given in Table 9 above denote the same shades of discolorment as in Table 1.

EXAMPLE 48

100 parts by weight of the powdered product used in Example 1 were mixed with 3 parts by weight of 4,4-thiobis (3-methyl-6-tert-butylphenol) (hereinafter referred to as a "stabilizer 14") in the same manner as described in Example 1.

Naked eye observation was made of discolorment appearing on the mixed mass (composition) when it was allowed to stand at 220° C, 15 and 30 minutes in the air and also heated 60 minutes at 250° C in a hot press. The composition presented a discolorment 3 (light yellow) and a discolorment 4 (yellow) when allowed to stand at 220° C, 15 and 30 minutes respectively in the air and a discolorment 3 (light yellow) when heated 60 minutes at 250° C in a hot press.

"stabilizer 19"). The blended samples were kneaded in a molten state in an extruder as in Example 1.

Naked eye observation was made of discolorment indicated on said kneaded samples in the same manner as in Example 1, the results being set forth in Table 10 below.

Table 10

| No. of Example | Kind of Stabilizer | Discolorment Left intact at 220° C in the air 15 min. | 30 min. | Heated 60 minutes at 250° C in a hot press |
| --- | --- | --- | --- | --- |
| Example 49 | 15 | 3 | 4 | 3 |
| 50 | 16 | 4 | 5 | 3 |
| 51 | 17 | 4 | 5 | 3 |
| 52 | 18 | 5 | 6 | 3 |
| 53 | 19 | 4 | 6 | 3 |

Note: The numerals given in Table 10 above denote the same shades of discolorment as in Table 1.

EXAMPLES 54 TO 97, CONTROLS 20 TO 35

After fully dried and purged with nitrogen, the autoclave used in Example 48 was charged (followed by stirring for homogeneous mixing) with 9.01 of 1,2-dichloroethane as a solvent dehydrated by calcium hydride immediately before application, 3.0 kg (19.75 mols) of 5-methoxy-carbonyl-bicyclo[2,2,1]-heptene-2 as a monomer distilled for purification at vacuum by a precision distillation device immediately before application and 36.7 ml (1.5 mol% based on the monomer) of n-hexene-1 as a molecular weight-controlling agent.

Added to the charged mass were 59.3 ml (0.06 mol% based on the monomer) of 1,2-dichloroethane solution of tungsten hexachloride (0.2 mol/l) as a polymerization catalytic component, 59.3 ml (3 mols per mol of the tungsten hexachloride) of 1,2-dichloroethane solution of 1,1-diethoxyethane (0.6 mol/l) as a third component and 71.7 ml (6 mols per mol of the tungsten hexachloride) of 1,2-dichloroethane solution of diethyl aluminium monochloride (1.0 mol/l) as a polymerization catalytic component. Ring-opening polymerization was continued 3 hours at 50° C. The product purified in the same manner as in Example 48 upon completion of polymerization had a weight of 2.40 kg, assumed a white powdery form and indicated a reduced viscosity of 0.42 as measured in 1,2-dichloroethane at 30° C in which the product was dissolved at a concentration of 0.1 g/dl. This product is hereinafter referred to as a "polymer 6."

Ring-opening polymerization was carried out in substantially the same manner as in the case of the polymer 6, excepting that the monomer used consisted of 3.0 kg (18.07 mols) of 5-acetoxymethyl-bicyclo[2,2,1]-heptene-2; the proportion of n-hexene-1 as a molecular weight-controlling agent was changed to 33.6 ml (1.25 mol% based on the monomer); the proportion of 1,2-dichloroethane solution of tungsten hexachloride (0.2 mol/l) as a polymerization catalytic component was changed to 54.3 ml (0.06 mol% based on the monomer); the proportion of 1,2-dichloroethane solution of 1,1-diethoxyethane (0.6 mol/l) as a third component was changed to 54.3 ml (3 mols per mol of the tungsten hexachloride); the proportion of 1,2-dichloroethane solution of diethyl aluminium monochloride (1.0 mol/l) as a catalytic component was changed to 65.7 ml (6 mols per mol of the tungsten hexachloride); and said polymerization was continued 4 hours at 45° C. The product purified in the same manner as in Example 48 upon completion of polymerization had a weight of 2.23 kg, and indicated a white powdery form, and a reduced viscosity of 0.45 as measured in 1,2-dichloroethane at 30° C in which the product was dissolved at a concentration of 0.1 g/dl. This product is hereinafter referred to as a "polymer 7."

Ring-opening polymerization was carried out in substantially the same manner as in the case of the polymer 6, excepting that the monomer used consisted of 3.0 kg of 5-acetoxy-bicyclo[2,2,1]-heptene-2; the proportion of n-hexene-1 as a molecular weight-controlling agent was changed to 30.6 ml (1.25 mol% based on the monomer), and said polymerization was continued 4 hours at 45° C. The product purified in the same manner as in Example 48 upon completion of polymerization had a weight of 2.50 kg, presented a white powdery form and indicated a reduced viscosity of 0.47 as measured in 1,2-dichloroethane at 30° C in which the product was dissolved at a concentration of 0.1 g/dl. This product is hereinafter referred to as a "polymer 8."

Ring-opening polymerization was conducted in substantially the same manner as in the case of the polymer 6, excepting that the monomer used consisted of 3.0 kg of 5,6-dimethoxycarbonyl-bicyclo[2,2,1]-heptene-2; the proportion of n-hexene-1 as a molecular weight-controlling agent was changed to 25.3 ml (1.25 mol% based on the monomer); the proportion of 1,2-dichloroethane solution of tungsten hexachloride (0.2 mol/l) as a polymerization catalytic component was changed to 49.5 ml (1.25 mol% based on the monomer); the proportion of 1,2-dichloroethane solution of 1,1-diethoxyethane (0.6 mol/l) as a third component was changed to 49.5 ml (3 mols per mol of the tungsten hexachloride) and the proportion of 1,2-dichloroethane solution of diethyl aluminium monochloride (1.0 mol/l) as a polymerization catalytic component was changed to 59.9 ml (6 mols per mol of the tungsten hexachloride); and said polymerization was continued 5 hours at 45° C. The product purified in the same manner as in Example 48 upon completion of polymerization had a weight of 26.5 kg, and indicated a white powdery form and a reduced viscosity of 0.48 as measured in 1,2-dichloro-ethane at 30° C in which the product was dissolved at a concentration of 0.1 g/dl. This product is hereinafter referred to as a "polymer 9."

Ring-opening polymerization was undertaken in substantially the same manner as in the case of the polymer 6, excepting that the monomers used consisted of 2.03 kg (17 mols) of 5-cyano-bicyclo[2,2,1]-heptene-2 and 0.43 kg (3 mols) of 5,5-dicyano-bicyclo[2,2,1]-heptene-2; the proportion of 1,2-dichloroethane as a solvent was changed to 11.4l; the proportion of n-hexene-1 as a molecular weight-controlling agent was changed to 24.8 ml (1 mol% based on the total amount of the monomers); the proportion of 1,2-dichloroethane solution of tungsten hexachloride (0.2 mol/l) as a polymerization catalytic component was changed to 100 ml (0.1 mol% based on the total amount of the monomers); the proportion of 1,2-dichloroethane solution of 1,1-diethoxyethane (0.6 mol/l) as a third component was changed to 100 ml (3 mols per mol of the tungsten hexachloride); the proportion of 1,2-dichloroethane solution of diethyl aluminium monochloride (1.0 mol/l) as a polymerization catalytic component was changed to 120 ml (6 mols per mol of the tungsten hexachloride); and said polymerization was continued 5 hours at 70° C. The product purified in the same manner as in Example 1 upon completion of polymerization had a weight of 2.09 kg, presented a white powdery form and indicated a reduced viscosity of 0.55 as measured in dimethylformamide at 30° C in which the copolymer was dissolved at a concentration of 0.1 g/dl. The ring-opening polymerization copolymer was found to contain 11.0 mol% of 5,5-dicyano-bicyclo[2,2,1]-heptene-2. This product is hereinafter referred to as a "polymer 10."

After fully dried and purged with nitrogen, the autoclave used in Example 48 was charged (followed by stirring for homogeneous mixing) with 9.0l of 1,2-dichloroethane as a solvent dehydrated by calcium hydride immediately before application, 2.03 kg (17 mols) of 5-cyano-bicyclo[2,2,1]-heptene-2 as a monomer purified in the same manner as in Example 1, 0.49 kg (3 mols) of 3,6-methylene-1,2,3,6-tetrahydro-cis-phthalic anhydride (wholly an exo type isomer) also as a monomer purified by recrystallization immediately before application, with the molar ratio of the first to the second monomer chosen to be 85:15. Added to the charged mass were 100 ml of 1,2-dichloroethane solution of tungsten hexachloride-acetaldehyde diethylacetal as a polymerization catalytic component (in said solution the tungsten hexachloride was dissolved at a concentration of 0.2 mol/l and represented 0.1 mol% based on the total amount of the monomers, and the acetaldehyde diethylacetal was represented 3 mols per mol of the tungsten hexachloride) and followed by heating at 60° C. After stirring for homogeneous mixing, added to the mass were 120 ml of toluene solution of diethyl aluminium chloride as a polymerization catalytic component (in said solution, the diethyl aluminium chloride was dissolved at a concentration of 1 mol/l and represented 6 mols per mol of the tungsten hexachloride). Ring-opening polymerization was continued 2 hours at the above-mentioned temperature of 60° C and further 18 hours at room temperature. The reaction system presented a brown opaque solid form (a nonflowing soft swollen mass). After pulverized, the solid mass was thoroughly washed with methylalcohol. The washed powders were dried 24 hours at 50° C and vacuum. The product obtained had a 2.19 kg and presented a whitish light yellow color. Infrared absorption spectral analysis showed that the product represented an absorption of 2245 cm$^{-1}$ of nitrile group and 1700 to 1860 cm$^{-1}$ of acid anhydride group. Upon element analysis, the product was found to be a copolymer containing 14.2 mol% of 3,6-methylene-1,2,3,6-tetrahydro-cis-phthalic anhydride. This product is hereinafter referred to as a "polymer 11."

Ring-opening polymerization was performed in substantially the same manner as in the case of the polymer 11, excepting that the monomers used consisted of 2.34 kg (19.6 mols) of 5-cyano-bicyclo[2,2,1-heptene-2 and 0.065 kg (0.4 mol) of 3,6-methylene-1,2,3,6-tetrahydro-cis-phthalic anhydride, with the molar ratio of the first to the second monomer chosen to be 98:2; the proportion of 1,2-dichloroethane as a solvent was changed to 7.0l; the proportion of 1,2-dichloroethane solution of tungsten hexachlorideacetaldehyde diethylacetal as a polymerization catalytic component was changed to 60 ml (in said solution, the tungsten hexachloride was dissolved at a concentration of 0.2 mol/l and represented 0.06 mol% based on the total amount of the monomers, and the acetaldehyde diethylacetal was represented 3 mols per mol of the tungsten hexachloride); the proportion of 1,2-dichloroethane solution of diethyl aluminium monochloride (1.0 mol/l) as a polymerization catalytic component was changed to 72 ml (6 mols per mol of the tungsten hexachloride); and ring-opening polymerization was continued 5 hours at 50° C. Upon completion of polymerization, the reaction system presented a brown solid form (a nonflowing soft swollen mass). After pulverized, the solid mass was purified in the same manner as in the case of the polymer 22. The product obtained had a weight of 2.24 kg, presented a light yellow, and, upon element analysis, was found to be a copolymer containing 1.2 mol% of 3,6-methylene-1,2,3,6-tetrahydro-cis-phthalic anhydride. The copolymer indicated a reduced viscosity of 0.53 as measured in dimethyl formamide at 30° C in which the copolymer was dissolved at a concentration of 0.1 g/dl. This product is hereinafter referred to as a "polymer 12."

After fully dried and purged with nitrogen, the autoclave used in Example 1 was charged (followed by stirring for homogeneous mixing) with 7.0l of 1,2-dichloroethane as a solvent dehydrated by calcium hydride immediately before application, 2.38 kg (20 mols) of 5-cyano-bicyclo[2,2,1]-heptene-2 as a monomer distilled for purification by a precision distillation device immediately before application and 6.8g of 5-phenyl-bicyclo[2,2,1]-heptene-2 (0.002 mol) also as a monomer. Added to the charged mass were 60 ml of 1,2-dichloroethane solution of tungsten hexachlorideacetaldehyde diethylacetal as a polymerization catalytic component (in said solution, the tungsen hexachloride was dissolved at a concentration of 0.2 mol/l and the acetaldehyde diethylacetal was represented 3 mols per mol of the tungsten hexachloride), and 72 ml of toluene solution of diethyl aluminium chloride as a polymerization catalytic component (in said solution, the diethyl aluminum chloride was dissolved at a concentration of 1 mol/l and represented 6 mols per mol of the tungsten hexachloride). Ring-opening polymerization was continued 2 hours at 70° C. The reaction system was substantially solidified. Said polymerization was continued two more hours. The product purified in the same manner as in Example 48 upon completion of polymerization had a weight of 2.28 kg and presented a faintly yellow color. Nuclear magnetic resonance spectral analysis showed that the product was a copolymer containing 0.2 mol% of 5-phenyl-bicyclo[2,2,1]-heptene-2. The copolymer indicated a reduced viscosity of 1.03 as measured in dimethylformamide at 30° C in which the copolymer was dissolved at a concentration of 0.1 g/dl. This product is hereinafter referred to as a "polymer 13."

Ring-opening polymerization was carried out in substantially the same manner as in the case of polymer 13, excepting that 5-phenyl-bicyclo[2,2,1]-heptene-2 used in a monomer in the above-mentioned case was replaced by 2-phenyl-1,4,5,8-dimethano-1,2,3,4,4a,5,8-,8a-octahydronapthalene (In this case, the copolymerization ratio and the proportions of the catalytic components based on the total amount of the monomers were the same as in the case of the polymer 13). The product purified upon completion of copolymerization in the same manner as in the case of the polymer 13 had a weight of 2.26 kg and presented a faintly yellow color, and, upon element analysis, was found to be a copolymer containing 0.2 mol% of 2-phenyl-1,4,5,8-dimethano-1,2,3,4,4a,5,8,8a-octahydronaphthalene.

The copolymer indicated a reduced viscosity of 0.91 as measured in dimethylformamide at 30° C in which the copolymer was dissolved at a concentration of 0.1 g/dl. This product is hereinafter referred to as a "polymer 14."

A fully dried and nitrogen-purged 20l stainless steel autoclave was charged (followed by stirring for homogeneous mixing) with 7.0l of 1,2-dichloroethane dehydrated by calcium hydride immediately before application, 2.03 kg (17 mols) of 5-cyano-bicyclo[2,2,1]-heptene-2 as a monomer distilled for purification by a precision distillation device immediately before application and 0.40 kg (3 mols) of 1,4-dihydro-1,4-methanonaphthalene, also as a monomer and 17.3 ml (0.7 mol% based on the total amount of the monomers) of n-hexene-1 as a molcular weight-controlling agent. Added to the charged mass were 60 ml of 1,2-dichloroethane solution of tungsten hexachloride as a polymerization catalytic component (in said solution, the tungsten hexachloride was represented 6 millimols per mol of the total amount of the monomers), 60 ml of 1,2-dichloroethane solution of 1,1-diethoxyethane (0.6 mol/l) as a third component and 72 ml of 1,2-dichloroethane solution of diethyl aluminium chloride (1.0 mol/l) (in said solutions, the 1,1-diethoxyethane was used at the rate of 3 mols per mol of the tungsten hexachloride, and the proportion of the diethyl aluminium chloride constituted 6 mols per mol of said tungsten hexachloride). Ring-opening polymerization was continued 5 hours with the temperature of the reaction system raised to 50° C and stirring carried out at said temperature. The product purified in the same manner as in Example 1 upon completion of polymerization had a weight of 2.16 kg, presented a faintly yellow color, and, upon element analysis, was found to be a copolymer containing 13 mol% of 1,4-dihydro-1,4-methanonaphthalene. The copolymer indicated a reduced viscosity of 0.50 as measured in dimethylformamide at 30° C in which the copolymer was dissolved at a concentration of 0.1 g/dl. This product is hereinafter referred to as a "polymer 15."

Ring-opening polymerization was conducted in substantially the same manner as in the case of the polymer 15, excepting that the monomers used consisted of 2.03 kg (17 mols) of 5-cyano-bicyclo[2,2,1]-heptene-2 as a monomer and 0.71 kg (3 mols) of 2,5-diethoxycarbonyl-bicyclo[2,2,1]-hepta-2,5-diene. The product purified in the same manner as in Example 1 upon completion of polymerization had a weight of 2.20 kg, showed a faintly yellow color, and, upon element analysis, was found to be a copolymer containing 14.5 mol% of 2,5-diethoxycarbonyl-bicyclo[2,2,1]-hepta-2,5-diene. The copolymer indicated a reduced viscosity of 0.49 as measured in dimethylformamide at 30° C in which the copolymer was dissolved at a concentration of 0.1 g/dl. This product is hereinafter referred to as a "polymer 16."

Ring-opening polymerization was effected in substantially the same manner as in the case of the polymer 15, excepting that the monomers used consisted of 2.03 kg (17 mols) of 5-cyano-bicyclo[2,2,1]-heptene-2 and 0.43 kg (3 mols) of 5-(2-pyridyl)-bicyclo[2,2,1]-heptene-2. The product purified in the same manner as in the case of Example 1 upon completion of polymerization had a weight of 1.92 kg, presented a faintly yellow color, and upon element analysis, was found to be a copolymer containing 10.3 mol% of 5-(2-pyridyl)-bicyclo[2,2,1]-heptene-2. The copolymer indicated a reduced viscosity of 0.46 as measured in dimethylformamide at 30° C in which the copolymer was dissolved at a concentration of 0.1 g/dl. This product is hereinafter referred to as a "polymer 17."

Ring-opening polymerization was undertaken in substantially the same manner as in the case of the polymer 15, excepting that the monomers used consisted of 2.03 kg (17 mols) of 5-cyano-bicyclo[2,2,1]-heptene-2 and 0.43 kg (3 mols) of 5-chloromethyl-bicyclo[2,2,1]-heptene-2, and said polymerization was continued 3 hours at 50° C. The product purified in the same manner as in Example 1 upon completion of polymerization had a weight of 2.36 kg, presented a faintly yellow color, and, upon element analysis, was found to be a copolymer containing 16 mol% of 5-chloromethyl-bicyclo[2,2,1]-heptene-2. The copolymer indicated a reduced viscosity of 0.50 as measured at 30° C in which the copolymer was dissolved at a concentration of 0.1 g/dl. This product is hereinafter referred to as a "polymer 18."

Ring-opening polymerization was carried out in substantially the same manner as in Example 15, excepting that the monomer used consisted of 3.04 kg (20 mols) of 5-methoxy-bicyclo[2,2,1]-heptene-2, and said polymerization was continued 4 hours at 50° C. The product purified in the same manner as in Example 1 upon completion of polymerization had a weight of 2.75 kg, presented a faintly yellow color and indicated a reduced viscosity of 0.59 as measured in toluene at 30° C in which the product was dissolved at a concentration of 0.1 g/dl. This product is hereinafter referred to as a "polymer 19."

Ring-opening polymerization was conducted in substantially the same manner as in the case of the polymer 15, excepting that the monomer used consisted of 4.38 kg of N-butyl-3,6-methylene-1,2,3,6-tetrahydro-cis-phthalimide (wholly an exo type isomer); the proportion of 1,2-dichloroethane as a solvent was changed to 9.0l; the proportion of 1,2-dichloroethane solution of tungsten hexachloride (0.2 mol/l) as a polymerization catalytic component was changed to 100 ml (in said solution, the tungsten hexachloride was dissolved at the rate of 10 millimols per mol of the monomer); the proportion of 1,2-dichloroethane solution of 1,1-diethoxyethane (0.6 mol/l) as a third component was changed to 100 ml (3 mols per mol of the tungsten hexachloride); the proportion of 1,2-dichloroethane solution of diethyl aluminium monochloride (1.0 mol/l) as a polymerization catalytic component was changed to 120 ml (6 mols per mol of the tungsten hexachloride); and said polymerization was continued 5 hours at 60° C. The product purified in the same manner as in Example 1 upon completion of polymerization had a weight of 3.68 kg, presented a faintly yellow color and indicated a reduced viscosity of 0.72, as measured in dimethylformamide at 30° C in which the product was dissolved at a concentration of 0.1 g/dl. This product is hereinafter referred to as a "polymer 20."

Ring-opening polymerization was effected in substantially the same manner as in the case of the polymer 20, excepting that the monomer used consisted of 5.71 kg of N-methyl-4-(5-bicyclo[2,2,1]-hepta-2-enyl)phthalimide (wholly exo type isomer). The product purified in the same manner as in Example 1 upon completion of polymerization had a weight of 5.02 kg, presented a faintly yellow color, and indicated a reduced viscosity of 0.70 as measured in chloroform at 30° C in which the product was dissolved at a concentration of 0.1 g/dl. This product is hereinafter referred to as a "polymer 21."

The ring-opening polymerization product thus prepared was pulverized into powders of about 10 mesh. 100 parts by weight of powdered ring-opening polymerization product used in Example 9 (hereinafter referred to as a "PN-M") or any of the powdered polymer 1 to 21 was dry blended in a Henschel mixer with 3 parts by weight of 4,4'-thiobis(3-methyl-6-tert-butylphenol) namely, stabilizer 14) and 100 parts by weight of said powdered ring-opening polymerization product were also dry blended in a Henschel mixer with 3 parts by weight of 2,2'-bis(4-methyl-6-tert-butylphenol) sulfoxide (namely, stabilizer 18). The blended mass was kneaded in a molten state in an extruder.

Naked eye observation was made of discolorment appearing on the kneaded samples containing the above-mentioned stabilizers in the same manner as in Example 1, the results being set forth in Table 11-2 below.

Naked eye observation was also made of discolorment presented on any of the polymer 6 to 21 free from a stabilizer (controls) under the same conditions as described above, the results being set forth in Table 11-1 below.

Table 11-1

| No. of Control | Kind of polymer | Discolorment Left intact at 220° C in the air 15 min. | 30 min. | Heated 60 min. at 250° C in a hot press |
|---|---|---|---|---|
| Control 20 | 6 | 3 | 4 | 3 |
| 21 | 7 | 4 | 5 | 3 |
| 22 | 8 | 4 | 6 | 3 |
| 23 | 9 | 3 | 4 | 3 |
| 24 | 10 | 5 | 8 | 4 |
| 25 | 11 | 5 | 8 | 4 |
| 26 | 12 | 5 | 7 | 4 |
| 27 | 13 | 5 | 7 | 4 |
| 28 | 14 | 5 | 7 | 4 |
| 29 | 15 | 4 | 6 | 4 |
| 30 | 16 | 4 | 5 | 4 |
| 31 | 17 | 5 | 6 | 4 |
| 32 | 18 | 4[1] | 5[1] | — |
| 33 | 19 | 3 | 4 | 4 |
| 34 | 20 | 3 | 5 | 4 |
| 35 | 21 | 4 | 5 | 4 |

[1]Allowed to stand at 200° C in the air

Table 11-2

| No. of Example | Kind of polymer | Kind of stabilizer | Discolorment Left intact at 220° C in the air 15 min. | 30 min. | Heated 60 minutes at 250° C in a hot press |
|---|---|---|---|---|---|
| Example 54 | PN-M | 14 | 2 | 3 | 2 |
| 55 | PN-M | 18 | 2 | 3 | 2 |
| 56 | 3 | 14 | 3 | 5 | 3 |
| 57 | 3 | 18 | 4 | 6 | 3 |
| 58 | 2 | 14 | 3 | 4 | 3 |
| 59 | 2 | 18 | 3 | 5 | 3 |
| 60 | 1 | 14 | 4 | 6 | 3 |
| 61 | 1 | 18 | 5 | 6 | 3 |
| 62 | 6 | 14 | 2 | 3 | 2 |
| 63 | 6 | 18 | 2 | 4 | 2 |
| 64 | 7 | 14 | 3 | 4 | 2 |
| 65 | 7 | 18 | 3 | 4 | 2 |
| 66 | 8 | 14 | 3 | 5 | 2 |
| 67 | 8 | 18 | 4 | 5 | 2 |
| 68 | 9 | 14 | 2 | 3 | 2 |
| 69 | 9 | 18 | 2 | 4 | 2 |
| 70 | 9 | 14 | 2 | 4 | 3 |
| 71 | 5 | 18 | 3 | 5 | 3 |
| 72 | 4 | 14 | 2 | 5 | 3 |
| 73 | 4 | 18 | 3 | 5 | 3 |
| 74 | 10 | 14 | 3 | 5 | 3 |
| 75 | 10 | 18 | 4 | 5 | 3 |
| 76 | 11 | 14 | 3 | 5 | 3 |
| 77 | 11 | 18 | 4 | 5 | 3 |
| 78 | 12 | 14 | 3 | 4 | 3 |
| 79 | 12 | 18 | 3 | 5 | 3 |
| 80 | 13 | 14 | 3 | 4 | 3 |
| 81 | 13 | 18 | 3 | 5 | 3 |
| 82 | 14 | 14 | 3 | 4 | 3 |
| 83 | 14 | 18 | 4 | 5 | 3 |
| 84 | 15 | 14 | 4 | 5 | 3 |
| 85 | 15 | 18 | 3 | 5 | 3 |
| 86 | 16 | 14 | 2 | 4 | 3 |
| 87 | 16 | 18 | 3 | 4 | 3 |
| 88 | 17 | 14 | 3 | 5 | 3 |
| 89 | 17 | 18 | 4 | 5 | 3 |
| 90 | 18 | 14 | 2[1] | 4[1] | — |
| 91 | 18 | 18 | 3[1] | 1[1] | — |
| 92 | 19 | 14 | 2 | 3 | 3 |
| 93 | 19 | 18 | 2 | 4 | 3 |
| 94 | 20 | 14 | 2 | 4 | 3 |
| 95 | 20 | 18 | 3 | 4 | 3 |
| 96 | 21 | 14 | 3 | 4 | 2 |
| 97 | 21 | 18 | 3 | 4 | 2 |

[1]Allowed to stand at 200° C in the air
Note: The numerals given in Table 11-1 and Table 11-2 above denote the same shades of discolorment as in Table 1.

1) Allowed to stand at 200° C in the air
Note: The numerals given in Table 11-1 and Table 11-2 above denote the same shades of discolorment as in Table 1.

EXAMPLES 98 to 101

100 parts by weight of each of the compositions A to D used in Examples 44 to 47 and 3.0 parts by weight of 4,4'-thiobis (3-methyl-6-tert-butylphenol) (namely, stabilizer 14) were mixed in the same manner as in Examples 44 to 47.

Naked eye observation was made of discolorment occurring on said mixed samples in the same manner as in Examples 44 to 47, the results being presented in Table 12 below.

Table 12

| No. of Example | Kind of composition | Discolorment | | | | Heated in a hot press | |
|---|---|---|---|---|---|---|---|
| | | Allowed to stand in the air | | | | | |
| | | 15 min. at 200° C | 30 min. at 200° C | 15 min. at 220° C | 30 min. at 220° C | 30 min. at 200° C | 60 min. at 250° C |
| Example 98 | $A_3$ | 3 | 4 | — | — | 3 | — |
| Example 99 | $B_3$ | — | — | 4 | 5 | — | 3 |
| Example 100 | $C_3$ | — | — | 3 | 4 | — | 3 |
| Example 101 | $D_3$ | 3 | 5 | — | — | 4 | — |

Note: The numerals given in Table 12 above denote the same shades of discolorment as in Table 1.

EXAMPLE 102

100 parts by weight of the powdered ring-opening polymerization product used in Example 1 and 3 parts by weight of 2,6-di-tert-butyl-4-acryloylaminomethylphenol (hereinafter referred to as a "stabilizer 20") were mixed in the same manner as in Example 1.

Naked eye observation was made of discolorment appearing on said mixed sample (composition) when it was allowed to stand at 220° C, 15 and 30 minutes in the air and also heated 60 minutes at 250° C in a hot press. The sample presented a discolorment of 3 (light yellow) and 5 (yellowish brown) when left intact at 220° C, 15 and 30 minutes respectively in the air, and a discolorment of 3 (light yellow) when heated 60 minutes at 250° C in a hot press.

EXAMPLES 103 to 105

A ring-opening polymerization product was blended with a stabilizer in a Henscel mixer as in Example 102, excepting that 2,6-di-tert-butyl-4-acryloylaminomethylphenol used as a stabilizer in Example 102 was replaced by 2,6-diethyl-4-acryloylaminomethylphenol (hereinafter referred to as a "stabilizer 21"), 2,6-diethyl-4-methacryloylaminomethylphenol (hereinafter referred to as a "stabilizer 22") and 2,6-diisopropyl-4-methacryloylaminomethylphenol (hereinafter referred to as a "stabilizer 23"). The respective mixtures were kneaded in a molten state in an extruder as in Example 102.

Naked eye observation was made of discolorment presented on the kneaded samples in the same manner as in Example 1, the results being set forth in Table 13 below.

Table 13

| No. of Example | Kind of stabilizer | Discolorment Left intact at 220° C in the air | | Heated 60 minutes at 250° C in a hot press |
|---|---|---|---|---|
| | | 15 min. | 30 min. | |
| Example 103 | 21 | 4 | 5 | 3 |
| 104 | 22 | 4 | 5 | 3 |
| 105 | 23 | 3 | 5 | 3 |

Note: The numerals given in Table 13 above denote the same shades of discolorment as in Table 1.

EXAMPLES 106 to 149

100 parts by weight of each pulverized PN-M and polymer 1 to 21 were mixed with 3 parts by weight of 2,6-di-tert-butyl-4-acryloylaminomethylphenol (namely, stabilizer 20) in a Henschel mixer, and 100 parts by weight of said ring-opening polymerization product were similarly mixed with 3 parts by weight of 2,6-diisopropyl-4-methacryloylaminomethylphenol (namely, stabilizer 23) in a Henschel mixer. The blended mass was kneaded in a molten state in an extruder.

Naked eye observation was made of discolorment appearing on said mixed samples in the same manner as in Example 1, the results being given in Table 14 below.

Table 14

| No. of Example | Kind of polymer | Kind of stabilizer | Discolorment Left intact at 220° C in the air | | Heated 60 minutes at 250° C in a hot press |
|---|---|---|---|---|---|
| | | | 15 min. | 30 min. | |
| Example 106 | PN-M | 20 | 2 | 3 | 2 |
| 107 | PN-M | 23 | 2 | 4 | 2 |
| 108 | 3 | 20 | 4 | 5 | 3 |
| 109 | 3 | 23 | 4 | 6 | 3 |
| 110 | 2 | 20 | 3 | 4 | 3 |
| 111 | 2 | 23 | 3 | 6 | 3 |
| 112 | 1 | 20 | 4 | 5 | 3 |
| 113 | 1 | 23 | 5 | 6 | 3 |
| 114 | 6 | 20 | 2 | 4 | 2 |
| 115 | 6 | 23 | 2 | 4 | 2 |
| 116 | 7 | 20 | 2 | 4 | 2 |
| 117 | 7 | 23 | 3 | 4 | 2 |
| 118 | 8 | 20 | 3 | 5 | 2 |
| 119 | 8 | 23 | 4 | 5 | 2 |
| 120 | 9 | 20 | 2 | 4 | 2 |
| 121 | 9 | 23 | 2 | 4 | 2 |
| 122 | 5 | 20 | 3 | 5 | 3 |
| 123 | 5 | 23 | 4 | 5 | 3 |
| 124 | 4 | 20 | 3 | 5 | 3 |
| 125 | 4 | 23 | 3 | 5 | 3 |

Table 14-continued

| No. of Example | Kind of polymer | Kind of stabilizer | Discolorment Left intact at 220 °C in the air | | Heated 60 minutes at 250 °C in a hot press |
|---|---|---|---|---|---|
| | | | 15 min. | 30 min. | |
| 126 | 10 | 20 | 3 | 5 | 3 |
| 127 | 10 | 23 | 4 | 5 | 3 |
| 128 | 11 | 20 | 3 | 5 | 3 |
| 129 | 11 | 23 | 4 | 5 | 3 |
| 130 | 12 | 20 | 3 | 4 | 3 |
| 131 | 12 | 23 | 4 | 6 | 3 |
| 132 | 13 | 20 | 3 | 4 | 3 |
| 133 | 13 | 23 | 3 | 5 | 3 |
| 134 | 14 | 20 | 4 | 5 | 3 |
| 135 | 14 | 23 | 4 | 6 | 3 |
| 136 | 15 | 20 | 4 | 5 | 3 |
| 137 | 15 | 23 | 3 | 5 | 3 |
| 138 | 16 | 20 | 2 | 4 | 3 |
| 139 | 16 | 23 | 3 | 4 | 3 |
| 140 | 17 | 20 | 4 | 5 | 3 |
| 141 | 17 | 23 | 4 | 5 | 3 |
| 142 | 18 | 20 | 3[1] | 4[1] | — |
| 143 | 18 | 23 | 2[1] | 4[1] | — |
| 144 | 19 | 20 | 2 | 4 | 3 |
| 145 | 19 | 23 | 2 | 4 | 3 |
| 146 | 20 | 20 | 3 | 4 | 3 |
| 147 | 20 | 23 | 2 | 4 | 3 |
| 148 | 21 | 20 | 2 | 4 | 3 |
| 149 | 21 | 23 | 3 | 4 | 3 |

[1]Allowed to stand at 200° C in the air

EXAMPLES 150 to 153

100 parts by weight of each of the compositions A to D were mixed with 3.0 parts by weight of 2,6-di-tert-butyl-4-acryloylaminomethylphenol (namely, stabilizer 20) in the same manner as in Examples 44 to 47.

Naked eye observation was made of discolorment presented on said mixed samples in the same manner as in Examples 44 to 47, the results being set forth in Table 15 below.

Table 15

| No. of Example | Kind of composition | Discolorment Left intact in the air | | | | Heated in a hot press | |
|---|---|---|---|---|---|---|---|
| | | 15 min. at 200° C | 30 min. at 200° C | 15 min. at 200° C | 30 min. at 220° C | 30 min. at 200° C | 60 min. at 250° C |
| Example 150 | A | 3 | 4 | — | — | 3 | — |
| 151 | B | — | — | 4 | 6 | — | 3 |
| 152 | C | — | — | 3 | 5 | — | 3 |
| 153 | D | 4 | 5 | — | — | 4 | — |

Note: The numerals given in Table 15 above denote the same shades of discolorment as in Table 1.

EXAMPLE 154

100 parts by weight of the powdered ring-opening polymerization product used in Example 1 and 3 parts by weight of 4,4'-butylidenebis(6-tert-butyl-m-cresol) (hereinafter referred to as a "stabilizer 24") were mixed in the same manner as in Example 1.

Naked eye observation was made of discolorment appearing on said mixed sample (composition) when it was allowed to stand at 220° C 15 and 30 minutes in the air and also heated 60 minutes at 250° C in a hot press. The sample presented a discolorment 3 (light yellow) and a discolorment 4 (yellow) when allowed to stand at 220° C 15 and 30 minutes respectively, and also a discolorment 3 (light yellow) when heated 60 minutes at 250° C in a hot press.

EXAMPLES 155 to 157

A polymerization product and a stabilizer were mixed in substantially the same manner as in Example 154, excepting that the 4,4'-butylidenebis(6-tert-butyl-m-cresol) used as a stabilizer in Example 154 was replaced by 2,2'-ethylidenebis(2,6-diamylphenol) (hereinafter referred to as a "stabilizer 25"), 2,2'-isopropylidenebis(4-tert-butyl-6-n-dodecylphenol) (hereinafter referred to as a "stabilizer 26"), and 4,4'-n-butylidenebis(3-methylphenol) (hereinafter referred to as a "stabilizer 27").

Naked eye observation was made of discolorment appearing on all said mixed samples in the same manner as in Example 154, at 220° C 15 and 30 minutes in the air and also heated 60 minutes at 250° C in a hot press, the results being indicated in Table 16 below.

Table 16

| No. of Example | Kind of stabilizer | Discolorment Left intact at 220° C in the air | | Heated 60 minutes at 250° C in a hot press |
|---|---|---|---|---|
| | | 15 min. | 30 min | |
| Example 155 | 25 | 4 | 5 | 3 |
| Example 156 | 26 | 3 | 5 | 3 |

Table 16-continued

| No. of Example | Kind of stabilizer | Discolorment Left intact at 220° C in the air 15 min. | 30 min | Heated 60 minutes at 250° C in a hot press |
|---|---|---|---|---|
| Example 157 | 27 | 3 | 5 | 3 |

Note: The numerals given in Table 16 above denote the same shades of discolorment as in Table 1.

EXAMPLES 158 to 201

100 parts by weight of each powdered PN-M and polymer 1 to 21 and 3 parts by weight of 4,4-butylidenebis(6-tert-butyl-m-cresol) (namely, stabilizer 24) were mixed, and also 100 parts by weight of each powdered PN-M and polymer 1 to 21 and 3 parts by weight of 2,2-ethylidenebis (2,6-diamylphenol) (namely, stabilizer 25) were mixed in the same manner as in Example 1.

Naked eye observation was made of discolorment appearing on said mixed samples in the same manner as in Example 1, the results results being presented in Table 17 below.

Table 17

| No. of Example | Kind of polymer | Kind of stabilizer | Discolorment Left intact at 220° C in the air 15 min. | 30 min. | Heated 60 min. at 250° C in a hot press |
|---|---|---|---|---|---|
| Example 158 | PN-M | 24 | 2 | 3 | 2 |
| 159 | PN-M | 25 | 2 | 4 | 2 |
| 160 | 3 | 24 | 3 | 5 | 3 |
| 161 | 3 | 25 | 4 | 5 | 3 |
| 162 | 2 | 24 | 3 | 4 | 3 |
| 163 | 2 | 25 | 4 | 5 | 3 |
| 164 | 2 | 24 | 4 | 5 | 3 |
| 165 | 1 | 25 | 4 | 6 | 3 |
| 166 | 6 | 24 | 2 | 3 | 2 |
| 167 | 6 | 25 | 2 | 4 | 2 |
| 168 | 7 | 24 | 2 | 4 | 2 |
| 169 | 7 | 25 | 3 | 4 | 2 |
| 170 | 8 | 24 | 3 | 4 | 2 |
| 171 | 8 | 25 | 3 | 5 | 2 |
| 172 | 9 | 24 | 2 | 3 | 2 |
| 173 | 5 | 25 | 2 | 4 | 2 |
| 174 | 5 | 24 | 3 | 4 | 3 |
| 175 | 5 | 25 | 3 | 5 | 3 |
| 176 | 4 | 24 | 2 | 4 | 3 |
| 177 | 4 | 25 | 3 | 4 | 3 |
| 178 | 10 | 24 | 4 | 5 | 3 |
| 179 | 10 | 25 | 4 | 6 | 3 |
| 180 | 11 | 24 | 4 | 5 | 3 |
| 181 | 11 | 25 | 3 | 5 | 3 |
| 182 | 12 | 24 | 3 | 5 | 3 |
| 183 | 12 | 25 | 4 | 6 | 3 |
| 184 | 13 | 24 | 3 | 4 | 3 |
| 185 | 13 | 25 | 3 | 4 | 3 |
| 186 | 14 | 24 | 4 | 6 | 3 |
| 187 | 14 | 25 | 4 | 5 | 3 |
| 188 | 15 | 24 | 3 | 5 | 3 |
| 189 | 15 | 25 | 4 | 5 | 3 |
| 190 | 16 | 24 | 2 | 4 | 3 |
| 191 | 16 | 25 | 3 | 4 | 3 |
| 192 | 17 | 24 | 4 | 5 | 3 |
| 193 | 17 | 25 | 3 | 4 | 3 |
| 194 | 18 | 24 | 3[1] | 4[1] | — |
| 195 | 18 | 25 | 3[1] | 4[1] | — |
| 196 | 19 | 24 | 2 | 4 | 3 |
| 197 | 19 | 25 | 3 | 4 | 3 |
| 198 | 20 | 24 | 2 | 4 | 3 |
| 199 | 20 | 25 | 2 | 4 | 3 |
| 200 | 21 | 24 | 3 | 4 | 3 |
| 201 | 21 | 25 | 2 | 4 | 3 |

[1]At 200° C in the air

EXAMPLES 202 to 205

100 parts by weight of each of said compositions A, B C and D used in Examples 44 to 47 and 3 parts by weight of 4,4'-butylienebis(6-tert-butyl-m-cresol (namely, stabilizer 24) were mixed in a molten state on a hot roll whose surface temperature was set at 180° C.

Naked eye observation was made of discolorment appearing on said mixed samples in the same manner as in Examples 44 to 47, the results being set forth in Table 18 below.

Table 18

| No. of Example | Kind of composition | Discolorment | | | | Heated in a hot press | |
|---|---|---|---|---|---|---|---|
| | | Left intact in the air | | | | | |
| | | 15 min. at 200° C | 30 min. at 200° C | 15 min. at 220° C | 30 min. at 220° C | 30 min. at 200° C | 60 min. at 250° C |
| Example 202 | A | 3 | 4 | — | — | 3 | — |
| 203 | B | — | — | 4 | 6 | — | 3 |
| 204 | C | — | — | 4 | 5 | — | 3 |
| 205 | D | 4 | 5 | — | — | 4 | — |

Note: The numerals given in Table 18 above denote the same shades of discolorment in Table 1.

EXAMPLE 206

100 parts by weight of the powdered ring-opening polymerization product used in Example 1, 1.5 parts by weight of 2,6-di-tert-butyl-p-cresol as a phenolic compound ("stabilizer 1") and 1.5 parts by weight of dilaurylthiodipropionate as a thioether compounds (hereinafter referred to as a "stabilizer (a)") were mixed in the same manner as in Example 1.

Naked eye observation was made of discolorment appearing on said mixed samples (compositions) when they were allowed to stand at 220° C 15 and 30 minutes in the air and also heated 60 minutes at 250° C in a hot press. The samples indicated a discolorment 3 (light yellow) and a discolorment 4 (yellow) when left intact at 220° C 15 and 30 minutes respectively in the air and also a discolorment 3 (light yellow) when heated 60 minutes at 250° C in a hot press.

EXAMPLES 207 to 224, CONTROL 36

A ring-opening polymerization product and stabilizers were blended in a Henschel mixer as in Example 206, excepting that the stabilizer 1 of a phenolic compound, namely, 2,6-di-tert-butyl-p-cresol was replaced by 2-isobutyl-4-ethyl-6-tert-hexylphenol ("stabilizer 2"), 2-tert-butyl-4methoxyphenol ("stabilizer 3"), 2-(1-methylbenzyl)-4-methoxyphenol ("stabilizer 4"), methyl gallate ("stabilizer 5"), stearyl gallate ("stabilizer 6"), 2,4,5-trihydroxy-n-butyrophenone (a "stabilizer 7"), 2,4,5-trihydroxy-stearophenone ("stabilizer 8"), tetra[methylene-3-(3,5-di-tert-butyl-4-hydroxyphenyl) propionate]methane (hereinafter referred to as a "stabilizer 10"), tetra[methylene-3-(3-tert-butyl-5-n-pentyl-4-hydroxyphenyl) propionate]methane (hereinafter referred to as a "stabilizer 11"), 4,4'-thiobis(3-methyl-6-tert-butylphenol) (hereinafter referred to as a "stabilizer 14"), 2,2'-thiobis (4-octylphenol) (hereinafter referred to as a "stabilizer 16"), 4,4'-bis(2,6-di-tert-butylphenol)sulfoxide (hereinafter referred to as a "stabilizer 17"), 2,2'-bis(4-methyl-6-tert-butylphenol)sulfoxide (hereinafter referred to as a "stabilizer 18"), 2,2'-bis(4-methyl-6-tert-butylphenol) sulfone (hereinafter referred to as a "stabilizer 19"), 2,6-di-tert-butyl-4-acryloylaminomethylphenol (hereinafter referred to as a "stabilizer 20"), 2,6-diisopropyl-4-methacryloylaminomethylphenol (hereinafter referred to as a "stabilizer 23"), 4,4'-butylidenebis(6-tert-butyl-m-cresol) (hereinafter referred to as a "stabilizer 24"), and 2,2'-methylenebis(4-methyl-6-tert-butylphenol) (hereinafter referred to as a "stabilizer 9"). Each blended mass was kneaded in a molten state in an extruder.

For comparison, 100 parts by weight of a ring-opening polymerization product and 3.0 parts by weight of the stabilizer (a) (stabilizer 1 was not added) were blended and kneaded in a molten state in substantially the same manner as in Example 206.

All the kneaded samples containing the above-listed stabilizers were allowed to stand at 220° C, 15 and 30 minutes in the air and also heated 60 minutes at 250° C in a hot press. Naked eye observation was made of discolorment appearing on said samples, the results being given in Table 19 below.

Table 19

| No. of Example and Control | Kind of stabilizer | Discolorment Left intact at 220° C in the air | | Heated 60 minutes at 250° C in a hot press |
|---|---|---|---|---|
| | | 5 min. | 30 min. | |
| Example 207 | 2 | 3 | 4 | 3 |
| 208 | 3 | 3 | 4 | 3 |
| 209 | 4 | 2 | 4 | 2 |
| 210 | 5 | 3 | 4 | 3 |
| 211 | 6 | 2 | 4 | 2 |
| 212 | 7 | 2 | 4 | 2 |
| 213 | 8 | 3 | 4 | 3 |
| 214 | 10 | 3 | 4 | 3 |
| 215 | 11 | 3 | 4 | 3 |
| 216 | 14 | 3 | 4 | 3 |
| 217 | 16 | 3 | 5 | 3 |
| 218 | 17 | 3 | 5 | 3 |
| 219 | 18 | 4 | 5 | 3 |
| 220 | 19 | 4 | 5 | 3 |
| 221 | 20 | 3 | 4 | 3 |
| 222 | 23 | 3 | 4 | 3 |
| 223 | 24 | 3 | 4 | 3 |
| 224 | 9 | 3 | 4 | 3 |
| Control 36 | — | 8 | 9 | 5 |

EXAMPLE 225

A ring-opening polymerization product and stabilizers were blended in a Henschel mixer as in Example 206, excepting that the stabilizer (a) of a thioether compound used in Example 206 was replaced by dimiristylthiodipropionate (hereinafter referred to as a "stabilizer (b)"). The blended mass was kneaded in a molten state in an extruder as in Example 206. The kneaded sample was tested for stability to air (oxygen) and heat in the same manner as in Example 206. Namely, when allowed to stand at 220° C 15 and 30 minutes in the air, the sample presented a discolorment 3 (light yellow) and a discolorment 5 (yellowish brown) respectively, and, when heated 60 minutes at 250° C in a hot press, a discolorment 3 (light yellow).

EXAMPLE 226

100 parts by weight of a ring-opening polymerization product were blended in a Henschel mixer as in Example 206 with all of the following three types of stabilizer: 0.5 part by weight of the stabilizer 1, 0.5 part by weight of the stabilizer (a) and 2.0 parts by weight of diphenylpentaerythritoldiphosphite as a phosphite compound (hereinafter referred to as a "stabilizer (A)"). The blended mass was kneaded in a molten state in an extruder as in Example 206. The kneaded sample was tested for stability to air (oxygen) and heat. Namely, when allowed to stand at 220° C 15 and 30 minutes in the air, the sample indicated a discolorment 2 (faintly yellow) and a discolorment 3 (light yellow) respectively, and, when heated 60 minutes at 250° C in a hot press, a discolorment 3 (light yellow).

EXAMPLES 227 to 229

A ring-opening polymerization product and stabilizers were blended in a Henschel mixer as in Example 226, excepting that the stabilizer (A) of phosphite compound, namely diphenylpentaerythritol diphosphite used in Example 226 was replaced by monooctyldiphenylphosphite (hereinafter referred to as a "stabilizer (B)"), trisnonylphenylphosphite (hereinafter referred to as a "stabilizer (C)"), and distearylpentaerythritoldiphosphite (hereinafter referred to as a "stabilizer (D)") respectively. Each blended mass was kneaded in a molten state in an extruder as in Example 226.

Naked eye observation was made of discolorment appearing on the kneaded samples in the same manner as in Example 226, the results being set forth in Table 20 below.

Table 20

| No. of Example | Kind of stabilizer | Discolorment Left intact at 220° C in the air 15 min. | 30 min. | Heated 60 minutes at 250° C in a hot press |
|---|---|---|---|---|
| Example 227 | (B) | 3 | 3[1] | 3 |
| 228 | (C) | 3 | 3[1] | 3 |
| 229 | (D) | 2 | 3 | 3 |

[1]Discolorment only slightly increased in shade, namely, was little different from the shade when the sample was left intact 15 minutes.

EXAMPLES 230 to 243

A ring-opening polymerization product was blended in a Henschel mixer as in Example 226 with the phenolic, thioether and phosphite stabilizers whose types and amounts were changed as shown in Table 21 below. The blended mass was kneaded in a molten state as in Example 226. The kneaded samples were tested for stability to air (oxygen) and heat, the results being given in Table 21 below. The amounts are in parts by weight.

Table 21

| No. of Example | Phenolic compound Type | Amount | Thioether compound Type | Amount | Phosphite compound Type | Amount | Discolorment Left intact at 220° C in the air 15 min. | 30 min. | Heated 60 minutes at 250° C in a hot press |
|---|---|---|---|---|---|---|---|---|---|
| Example 230 | (1) | 1.0 | (a) | 1.0 | (A) | 1.0 | 3 | 3[1] | 3 |
| 231 | (1) | 1.25 | (a) | 1.25 | (A) | 0.5 | 3 | 3[1] | 3 |
| 232 | (1) | 0.5 | (b) | 0.5 | (B) | 2.0 | 3 | 4 | 3 |
| 233 | (1) | 0.5 | (b) | 0.5 | (C) | 2.0 | 3 | 3[1] | 3 |
| 234 | (1) | 0.5 | (b) | 0.5 | (D) | 2.0 | 2 | 3 | 3 |
| 235 | (3) | 0.5 | (a) | 0.5 | (A) | 2.0 | 3 | 3[1] | 3 |
| 236 | (5) | 0.5 | (a) | 0.5 | (A) | 2.0 | 3 | 3[1] | 3 |
| 237 | (7) | 0.5 | (a) | 0.5 | (A) | 2.0 | 3 | 3[1] | 3 |
| 238 | (10) | 0.5 | (a) | 0.5 | (A) | 2.0 | 2 | 3 | 3 |
| 239 | (14) | 0.5 | (a) | 0.5 | (A) | 2.0 | 3 | 3[1] | 3 |
| 240 | (17) | 0.5 | (a) | 0.5 | (A) | 2.0 | 3 | 3[1] | 3 |
| 241 | (19) | 0.5 | (a) | 0.5 | (A) | 2.0 | 3 | 4 | 3 |
| 242 | (20) | 0.5 | (a) | 0.5 | (A) | 2.0 | 2 | 3 | 3 |
| 243 | (9) | 0.5 | (a) | 0.5 | (A) | 2.0 | 2 | 3 | 3 |

[1]Discolorment only slightly increased in shade than when the sample was left intact 15 minutes.

EXAMPLES 244 to 291

100 parts by weight of the respective powdered PN-M and polymer 1 to 21 were blended in a Henschel mixer as in Example 206 each time with a mixed stabilizer W consisting of 0.5 part by weight of the stabilizer 1, namely, 2,6-di-tert-butyl-p-cresol, 0.5 part by weight of the stabilizer (a), namely, dilaurylthiodipropionate and 2.0 parts by weight of the stabilizer (A), namely, diphenyl pentaerythritoldiphosphite; a mixed stabilizer X consisting of 1.5 parts by weight of the stabilizer 20, namely, 2,6-di-tert-butyl-4-acryloylaminomethylphenol and 1.5 parts by weight of the stabilizer (a); a mixed stabilizer Y consisting of 1.5 parts by weight of the stabilizer 1 and 1.5 parts by weight of the stabilizer (a); and a mixed stabilizer Z consisting of 1.5 parts by weight of the stabilizer 20 and 1.5 parts by weight of the stabilizer (A). The blended samples were kneaded in a molten state in an extruder as in Example 206.

Naked eye observation was made of discolorment appearing on the kneaded samples, in the same manner as in Example 206, the results being set forth in Table 22 below.

the stabilizer Z consisting of 1.5 parts by weight of the stabilizer 20 and 1.5 parts by weight of the stabilizer Table 22

| Number of Example | Kind of polymer | Mixed stabilizer | | Discolorment Left intact at 220° C in the air | | Heated 60 min. at 250° C in a hot press |
|---|---|---|---|---|---|---|
| | | | | 15 min. | 30 min. | |
| 244 | PN-M | Mixed stabilizer | W | 2 | 3 | 2 |
| 245 | " | " | X | " | " | " |
| 246 | 3 | " | W | 3 | 4 | 3 |
| 247 | " | " | X | " | 5 | " |
| 248 | 2 | " | W | " | 3[1] | " |
| 249 | " | " | X | " | 4 | " |
| 250 | 1 | " | W | 4 | 5 | " |
| 251 | " | " | X | " | " | " |
| 252 | 6 | " | W | 2 | 3 | 2 |
| 253 | " | " | X | " | " | " |
| 254 | 7 | " | W | " | " | " |
| 255 | " | " | X | " | " | " |
| 256 | 8 | " | W | 3 | 4 | " |
| 257 | " | " | X | 4 | 4[1] | " |
| 258 | 9 | " | W | 2 | 3 | " |
| 259 | " | " | X | " | " | " |
| 260 | 5 | " | W | 3 | 4 | 3 |
| 261 | " | " | X | " | 3[1] | " |
| 262 | 4 | " | W | 2 | 4 | " |
| 263 | " | " | X | " | " | " |
| 264 | 10 | " | W | 3 | " | " |
| 265 | " | " | X | " | " | " |
| 266 | 11 | " | W | " | " | " |
| 267 | " | " | X | " | " | " |
| 268 | 12 | " | W | " | " | " |
| 269 | " | " | X | " | 5 | " |
| 270 | 13 | " | W | 2 | 3 | " |
| 271 | " | " | X | " | 4 | " |
| 272 | 14 | " | W | 3 | " | " |
| 273 | " | " | X | " | " | " |
| 274 | 15 | " | W | " | " | " |
| 275 | " | " | X | " | 5 | " |
| 276 | 16 | " | W | 2 | 3 | 3 |
| 277 | " | " | X | " | " | " |
| 278 | 17 | " | W | 3 | 4 | " |
| 279 | " | " | X | " | " | " |
| 280 | 18 | " | W | 2[2] | 3[2] | — |
| 281 | " | " | X | " | " | — |
| 282 | 19 | " | W | " | " | 3 |
| 283 | " | " | X | " | " | " |
| 284 | 20 | " | W | " | 4 | " |
| 285 | " | " | X | " | 3 | " |
| 286 | 21 | " | W | " | " | " |
| 287 | " | " | X | " | " | " |
| 288 | 22 | " | Y | " | " | 2 |
| 289 | 1 | " | " | 4 | 5 | 3 |
| 290 | 5 | " | " | 3 | 4 | " |
| 291 | 4 | " | " | 2 | 3 | " |

[1]Discolorment slightly more increased in shade when the sample was left intact 30 minutes than in the case of 15 minutes
[2]At 200° C in the air

EXAMPLES 292 to 301

100 parts by weight of the respective compositions A, B, C and D used in Examples 44 to 47 were kneaded in a molten state on a hot roll each time with the mixed stabilizer W, mixed stabilizer X, mixed stabilizer Y and (A).

Naked eye observation was made of discolorment appearing on the kneaded samples of said compositions A to D in the same manner as in Examples 44 to 47, the results being shown in Table 23 below.

Table 23

| Number of Example | Kind of composition | Mixed stabilizer | | Discolorment Left intact at 200° C in the air | | Left intact at 220° C in the air | | Heated in a hot | |
|---|---|---|---|---|---|---|---|---|---|
| | | | | 15 min. | 30 min. | 15 min. | 30 min. | 30 min. at 200° C | 60 min. at 250° C |
| Example 292 | A | Mixed stabilizer | W | 2 | 3 | — | — | 3 | — |
| 293 | A | " | X | 2 | 4 | — | — | 3 | — |
| 294 | B | Mixed stabilizer | W | — | — | 3 | 5 | — | 3 |
| 295 | B | " | X | — | — | 3 | 4 | — | 3 |
| 296 | C | Mixed stabilizer | W | — | — | 3 | 4 | — | 3 |
| 297 | C | " | X | — | — | 3 | 4 | — | 3 |
| 298 | D | Mixed stabilizer | W | 3 | 4 | — | — | 4 | — |
| 299 | D | " | X | 3 | 4 | — | — | 4 | — |
| 300 | A | Mixed stabilizer | Y | 2 | 3 | — | — | 3 | — |
| 301 | B | " | | — | — | 3 | 5 | — | 3 |

The foregoing description shows that the ring-opening polymerization homopolymers of the cyano-, ester-, ether- and imide- type norbornene derivatives, copolymers of any combination of these derivatives, other copolymers of any of said derivatives and another unsaturated cyclic compound, and a combination of any of said ring-opening polymerization products and resinous and/or rubber-like material can provide compositions displaying improved stability to air (oxygen) and heat when blended with phenolic compounds, or phenolic compounds and thioether compounds, or phenolic compounds, thioether compounds and phosphite compounds as stabilizers.

What we claim is:

1. High heat stability compositions of ring-opening polymerization product which comprise (A) 100 parts by weight of at least one ring-opening polymerization product selected from the group consisting of (a) ring-opening polymerization homopolymers of norbornene derivatives containing at least one nitrile group, (b) ring-opening polymerization homopolymers of norbornene derivatives containing at least one ester group, (c) ring-opening polymerization homopolymers of norbornene derivatives containing at least one ether group, (d) ring-opening polymerization homopolymers of norbornene derivatives containing at least one N-substituted cyclic imide group, (e) ring-opening polymerization copolymers of any combination of said norbornene derivatives, and (f) other ring-opening polymerization copolymers of any of said norbornene derivatives and 50 mol% at most of other unsaturated cyclic compounds, (B) 0.01 to 10.0 parts by weight of at least one of phenolic compounds whose chemical structures may be expressed by the general formulas:

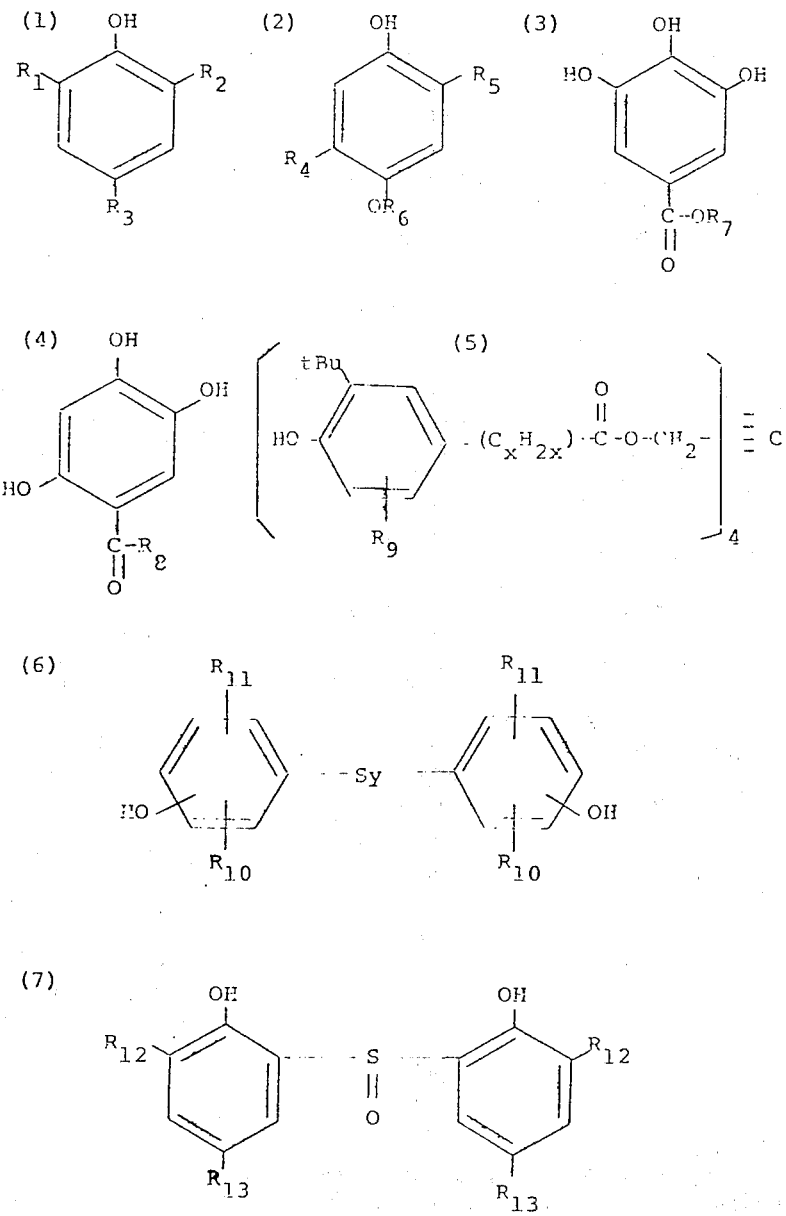

(8)

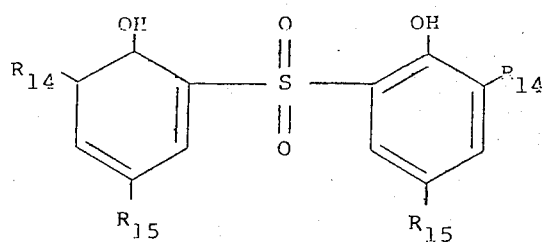

(9)

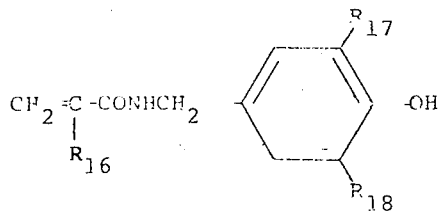

(10)

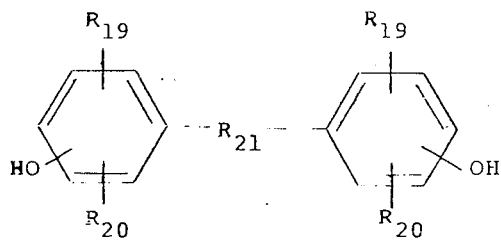

wherein:

$R_1, R_2, R_3, R_4, R_5$ = hydrogen atom or hydrocarbon radicals selected from the group consisting of alkyl radicals having 1 to 20 carbon atoms, cycloalkyl radicals having 4 to 20 carbon atoms, 1-alkyl cycloalkyl radicals containing alkyl radicals having 1 to 20 carbon atoms and 1-alkylbenzyl radicals containing alkyl radicals having 1 to 20 carbon atoms at lease two of $R_1, R_2, R_3$ = hydrocarbon radicals at least one of $R_4, R_5$ = hydrocarbon radicals $R_6, R_7, R_8$ = alkyl radicals having 1 to 20 carbon atoms $R_9$ = alkyl radicals having 1 to 6 carbon atoms $R_{10}, R_{11}$ = hydrogen atom or hydrocarbon radicals selected from the group consisting of alkyl radicals having 1 to 20 carbon atoms, cycloalkyl radicals having 4 to 20 carbon atoms, atoms, alkyl-substituted cycloalkyl radicals having 5 to 20 carbon atoms and aralkyl radicals having 7 to 20 carbon atoms or alkoxy radicals having 1 to 20 carbon atoms at least one of $R_{10}, R_{11}$ = hydrocarbon radicals $R_{12}, R_{13}, R_{14}, R_{15}$ = hydrogen atom or hydrocarbon radicals selected from the group consisting of alkyl radicals having 1 to 20 carbon atoms, aryl radicals having 6 to 20 carbon atoms, cycloalkyl radicals having 4 to 20 carbon atoms and aralkyl radicals having 7 to 20 carbon atoms $R_{16}$ = hydrocarbon atom or methyl radical $R_{17}, R_{18}$ = alkyl radicals having 1 to 4 carbon atoms $R_{19}, R_{20}$ = hydrogen atom, alkyl radicals having 1 to 12 carbon atoms, cycloalkyl radicals having 4 to 20 carbon atoms, aryl radicals having 6 to 20 carbon atoms, 1-alkyl cycloalkyl radical containing alkyl radicals having 1 to 12 carbon atoms or 1 alkylbenzyl radicals containing alkyl radicals having 1 to 12 carbon atoms $R_{21}$ = alkylidene radicals having 2 to 12 carbon atoms or alkylene radicals having 2 to 12 carbon atoms x = integer of 1 to 6 y = integer of 1, 2, or 3, and (C) 0.01 to 10 parts by weight of thioethers of carboxylic esters whose chemical structure may be expressed by the general formula:

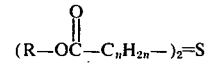

where:

R = hydrocarbon radicals selected from the group consisting of alkyl radicals having 1 to 20 carbon atoms, aryl radicals having 6 to 20 carbon atoms and aralkyl radicals having 7 to 20 carbon atoms n = integer of 1 to 20.

2. High heat stability compositions according to claim 1, wherein the (A) component is further blended with 99 percent by weight at most of resinous material based on the resultant mixed mass.

3. High heat stability compositions according to claim 1, wherein the (A) component is further blended with 50 percent by weight at most of rubber-like material based on the resultant mixed mass.

4. High heat stability compositions according to claim 2, wherein the (A) component is further blended with 50% by weight at most of rubber-like material based on the resultant mixed mass.

5. High heat stability compositions according to claim 1, wherein 100 parts by weight of the (A) component are blended with at least one selected from among phosphite compounds whose chemical structure may be expressed by the general formula:

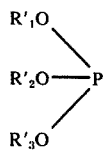

and the general formula:

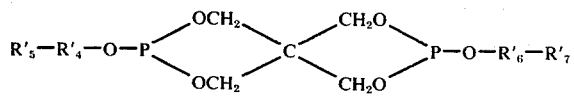

where:

R′$_1$, R′$_2$, R′$_3$ = alkyl radicals having 1 to 20 carbon atoms, cycloalkyl radicals having 4 to 20 carbon atoms, aryl radicals having 6 to 20 carbon atoms, aralkyl radicals having 7 to 20 carbon atoms, alkoxy alkyl radicals having 2 to 20 carbon atoms or substituted or nonsubstituted phenyloxyalkyl radical having 7 to 20 carbon atoms R′$_4$, R′$_6$ = alkylene radicals having 1 to 20 carbon atoms alkylidene radicals having 2 to 20 carbon atoms or phenylene radicals R′$_5$, R′$_7$ = hydrogen atom, alkyl radicals having 1 to 20 carbon atoms, aryl radicals having 6 to 20 carbon atoms, aralkyl radicals having 7 to 20 carbon atoms, alkaryl radicals having 7 to 20 carbon atoms, aryl radicals having 6 to 20 carbon atoms and containing hydroxyl radicals, aralkyl radicals having 7 to 20 carbon atoms and containing hydroxyl radicals or alkaryl radicals having 7 to 20 carbon atoms and containing hydroxyl radical.

6. High heat stability compositions according to claim 2, wherein 100 parts by weight of the (A) component are blended with at least one selected from among phosphite compounds whose chemical structure may be expressed by the general formula:

R′$_1$O\
R′$_2$O—P\
R′$_3$O/ and the general formula:

R′$_5$—R′$_4$—O—P(OCH$_2$)(OCH$_2$)C(CH$_2$O)(CH$_2$O)P—O—R′$_6$—R′$_7$ where:

R′$_1$, R′$_2$, R′$_3$ = alkyl radicals having 1 to 20 carbon atoms, cycloalkyl radicals having 4 to 20 carbon atoms, aryl radicals having 6 to 20 carbon atoms, aralkyl radicals having 7 to 20 carbon atoms, alkoxy alkyl radicals having 2 to 20 carbon atoms or substituted or nonsubstituted phenyloxyalkyl radical having 7 to 20 carbon atoms R′$_4$, R′$_6$ = alkylene radicals having 1 to 20 carbon atoms, alkylidene radicals having 2 to 20 carbon atoms or phenylene radicals R′$_5$, R′$_7$ = hydrogen atom, alkyl radicals having 1 to 20 carbon atoms, aryl radicals having 6 to 20 carbon atoms, aralkyl radicals having 7 to 20 carbon atoms, alkaryl radicals having 7 to 20 carbon atoms, aryl radicals having 6 to 20 carbon atoms and containing hydroxyl radicals, aralkyl radicals having 7 to 20 carbon atoms and containing hydroxyl radicals or alkaryl radicals having 7 to 20 carbon atoms and containing hydroxyl radical.

7. High heat stability compositions according to claim 3, wherein 100 parts by weight of the (A) component are blended with at least one selected from among phosphite compounds whose chemical structure may be expressed by the general formula:

R′$_1$O\
R′$_2$O—P\
R′$_3$O/ and the general formula:

R′$_5$—R′$_4$—O—P(OCH$_2$)(OCH$_2$)C(CH$_2$O)(CH$_2$O)P—O—R′$_6$—R′$_7$ where:

R′$_1$, R′$_2$, R′$_3$ = alkyl radicals having 1 to 20 carbon atoms, cycloalkyl radicals having 4 to 20 carbon atoms, aryl radicals having 6 to 20 carbon atoms, aralkyl radicals having 7 to 20 carbon atoms, alkoxy alkyl radicals having 2 to 20 carbon atoms or substituted or nonsubstituted phenyloxyalkyl radical having 7 to 20 carbon atoms R′$_4$, R′$_6$ = alkylene radicals having 1 to 20 carbon atoms, alkylidene radicals having 2 to 20 carbon atoms or phenylene radicals R′$_5$, R′$_7$ = hydrogen atom, alkyl radicals having 1 to 20 carbon atoms, aryl radicals having 6 to 20 carbon atoms, aralkyl radicals having 7 to 20 carbon atoms, alkaryl radicals having 7 to 20 carbon atoms, aryl radicals having 6 to 20 carbon atoms and containing hydroxyl radicals, aralkyl radicals having 7 to 20 carbon atoms and containing hydroxyl radicals or alkaryl radicals having 7 to 20 carbon atoms and containing hydroxyl radical.

8. High heat stability compositions according to claim 4, wherein 100 parts by weight of the (A) component are blended with at least one selected from among phosphite compounds whose chemical structure may be expressed by the general formula:

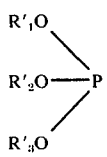

and the general formula:

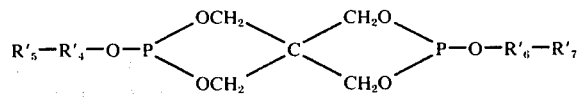

where:
- $R'_1, R'_2, R'_3$ = alkyl radicals having 1 to 20 carbon atoms, cycloalkyl radicals having 4 to 20 carbon atoms, aryl radicals having 6 to 20 carbon atoms, aralkyl radicals having 7 to 20 carbon atoms, alkoxy alkyl radicals having 2 to 20 carbon atoms or substituted or nonsubstituted phenyloxyalkyl radical having 7 to 20 carbon atoms
- $R'_4, R'_6$ = alkylene radicals having 1 to 20 carbon atoms alkylidene radicals having 2 to 20 carbon atoms or phenylene radicals
- $R'_5, R'_7$ = hydrogen atom, alkyl radicals having 1 to 20 carbon atoms, aryl radicals having 6 to 20 carbon atoms, aralkyl radicals having 7 to 20 carbon atoms, alkaryl radicals having 7 to 20 carbon atoms, aryl radicals having 6 to 20 carbon atoms and containing hydroxyl radicals, aralkyl radicals having 7 to 20 carbon atoms and containing hydroxyl radicals or alkaryl radicals having 7 to 20 carbon atoms and containing hydroxyl radical.

9. High heat stability compositions according to claim 2, wherein the resinous material is selected from the group consisting of vinyl chloride homopolymer, styrene homopolymer, methylmethacrylate homopolymer, copolymers prepared by copolymerizing any combination of vinyl monomers selected from the group consisting of vinyl chloride, styrene, acrylonitrile and methylmethacrylate, other copolymers of at least 50% by weight of any of said vinyl monomers and other monomers, and grafted copolymers formed by grafting at least one vinyl compound selected from the group consisting of styrene, acrylonitrile and methylmethacrylate to the rubber-like material.

10. High heat stability compositions according to claim 4, wherein the resinous material is selected from the group consisting of vinyl chloride homopolymer, styrene homopolymer, methylmethacrylate homopolymer, copolymers prepared by copolymerizing any combination of vinyl monomers selected from the group consisting of vinyl chloride, styrene, acrylonitrile and methylmethacrylate, other copolymers of at least 50% by weight of any of said vinyl monomers and other monomers, and grafted copolymers formed by grafting at least one vinyl compound selected from the group consisting of styrene, acrylonitrile and methylmethacrylate to the rubber-like material.

11. High heat stability compositions according to claim 6, wherein the resinous material is selected from the group consisting of vinyl chloride homopolymer, styrene homopolymer, methylmethacrylate homopolymer, copolymers prepared by copolymerizing any combination of vinyl monomers selected from the group consisting of vinyl chloride, styrene, acrylonitrile and methylmethacrylate, other copolymers of at least 50 percent by weight of any of said vinyl monomers and other monomers, and grafted copolymers formed by grafting at least one vinyl compound selected from the group consisting of styrene, acrylonitrile and methylmethacrylate to the rubber-like material.

12. High heat stability compositions according to claim 8, wherein the resinous material is selected from the group consisting of vinyl chloride homopolymer, styrene homopolymer, methylmethacrylate homopolymer, copolymers prepared by copolymerizing any combination of vinyl monomers selected from the group consisting of vinyl chloride, styrene acrylonitrile and methylmethacrylate, other copolymers of at least 50 percent by weight of any of said vinyl monomers and other monomers, and grafted copolymers formed by grafting at least one vinyl compound selected from the group consisting of styrene, acrylonitrile and methylmethacrylate to the rubber-like material.

13. High heat stability compositions according to claim 3, wherein the rubber-like material is selected from the group consisting of butadiene rubber, chlorinated polyethylene rubber, acrylic ester rubber, ethylene-vinyl acetate rubber, chloroprene chloroprene rubber, chlorosulfonated polyethylene rubber and alkylene oxide rubber.

14. High heat stability compositions according to claim 4, wherein the rubber-like material is selected from the group consisting of butadiene rubber, chlorinated polyethylene rubber, acrylic ester rubber, ethylene-vinyl acetate rubber, chloroprene rubber, chlorosulfonated polyethylene rubber and alkylene oxide rubber.

15. High heat stability compositions according to claim 7, wherein the rubber-like material is selected from the group consisting of butadiene rubber, chlorinated polyethylene rubber, acrylic ester rubber, ethylene-vinyl acetate rubber, chloroprene rubber, chlorosulfonated polyethylene rubber and alkylene oxide rubber.

16. High heat stability compositions according to claim 8, wherein the rubber-like material is selected from the group consisting of butadiene rubber, chlorinated polyethylene rubber, acrylic ester rubber, ethylene-vinyl acetate rubber, chloroprene rubber, chlorosulfonated polyethylene rubber and alkylene oxide rubber.

17. High heat stability compositions according to claim 1, wherein the phenolic compounds are those containing radicals of $R_1$ to $R_8$ having 1 to 9 carbon atoms, a radical of $R_9$ having 3 to 4 carbon atoms, radicals of $R_{10}, R_{11}, R_{12}, R_{13}, R_{14}R_{15}, R_{19}$ and $R_{20}$ having 1 to 18 carbon atoms, radicals of $R_{17}$, and $R_{18}$ having 2 to 4 carbon atoms and a radical of $R_{21}$ having 1 to 12 carbon atoms.

18. High heat stability compositions according to claim 2, wherein the phenolic compounds are those containing radicals of $R_1$ to $R_8$ having 1 to 9 carbon atoms, a radical of $R_9$ having 3 to 4 carbon atoms, radicals of $R_{10}$, $R_{11}$, $R_{12}$, $R_{13}$, $R_{14}$, $R_{15}$, $R_{19}$ and $R_{20}$ having 1 to 18 carbon atoms, radicals of $R_{17}$, and $R_{18}$ having 2 to 4 carbon atoms and a radical of $R_{21}$ having 1 to 12 carbon atoms.

19. High heat stability compositions according to claim 3, wherein the phenolic compounds are those containing radicals of $R_1$ to $R_8$ having 1 to 9 carbon atoms, a radical of $R_9$ having 3 to 4 carbon atoms, radicals of $R_{10}$, $R_{11}$, $R_{12}$, $R_{13}$, $R_{14}$, $R_{15}$, $R_{19}$ and $R_{20}$ having 1 to 18 carbon atoms, radicals of $R_{17}$, and $R_{18}$ having 2 to 4 carbon atoms and a radical of $R_{21}$ having 1 to 12 carbon atoms.

20. High heat stability compositions according to claim 4, wherein the phenolic compounds are those containing radicals of $R_1$ to $R_8$ having 1 to 9 carbon atoms, a radical of $R_9$ having 3 to 4 carbon atoms, radicals of $R_{10}$, $R_{11}$, $R_{12}$, $R_{13}$, $R_{14}$, $R_{15}$, $R_{19}$ and $R_{20}$ having 1 to 18 carbon atoms, radicals of $R_{17}$, and $R_{18}$ having 2 to 4 carbon atoms and a radical of $R_{21}$ having 1 to 12 carbon atoms.

21. High heat stability compositions according to claim 1 wherein the phenolic compounds are selected from among compounds whose chemical structures may be expressed by the general formulas:

having 4 to 20 carbon atoms, 1-alkyl cycloalkyl radicals containing alkyl radicals having 1 to 20 carbon atoms, and 1-alkyl benzyl radicals containing alkyl radicals having 1 to 20 carbon atoms at least two of $R_1$, $R_2$, $R_3$ = hydrocarbon radicals $R_9$ = alkyl radicals having 1 to 6 carbon atoms $R_{10}$, $R_{11}$ hydrogen atom or hydrocarbon radicals selected from the group consisting of alkyl radicals having 1 to 20 carbon atoms, cycloalkyl radicals having 4 to 20 carbon atoms, alkyl-substituted cycloalkyl radicals having 5 to 20 carbon atoms and aralkyl radicals having 7 to 20 carbon atoms or alkoxy radicals having 1 to 20 carbon atoms at least one of $R_{10}$, $R_{11}$ = hydrocarbon radicals $R_{16}$ = hydrogen atom or methyl radical $R_{17}$, $R_{18}$ = alkyl radicals having 1 to 4 carbon atoms $R_{19}$, $R_{20}$ = hydrogen atom, alkyl radicals having 1 to 12 carbon atoms, cycloalkyl radicals having 4 to 20 carbon atoms, aryl radicals having 6 to 20 carbon atoms, 1-alkyl cycloalkyl radicals containing alkyl radicals having 1 to 12 carbon atoms or 1-alkylbenzyl radicals containing alkyl radicals having 1 to 12 carbon atoms $R_{21}$ = alkylidene radicals having 2 to 12 carbon atoms or alkylene radicals having 2 to 12 carbon atoms

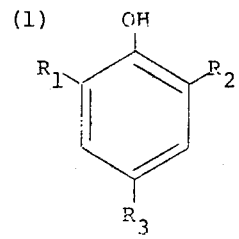

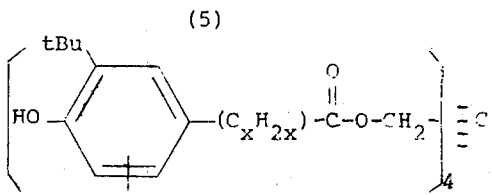

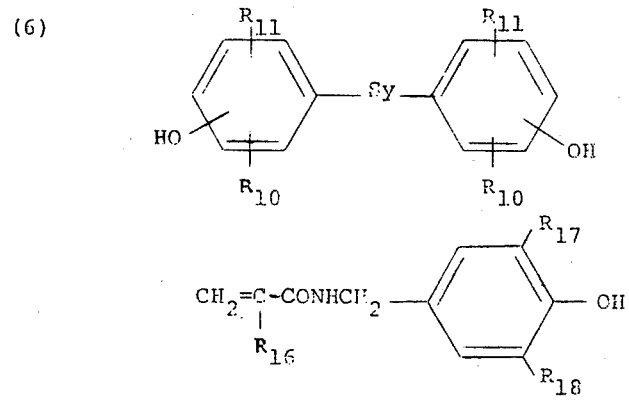

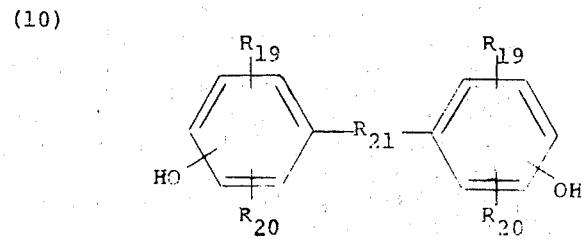

wherein:

$R_1$, $R_2$, $R_3$ = hydrogen atom or hydrocarbon radicals selected from the group consisting of alkyl radicals having 1 to 20 carbon atoms, cycloalkyl radicals x = an integer of 1 to 6
y = an integer of 1 to 3.

22. High heat stability compositions according to claim 2, wherein the phenolic compounds are selected from among compounds whose chemical structures may be expressed by the general formulas:

(1) 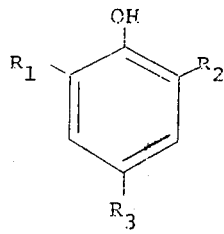

(5) 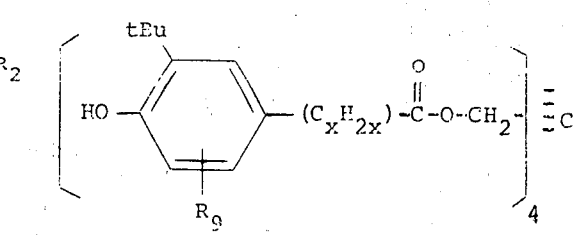

(6) 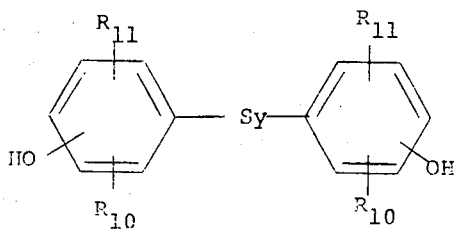

(9) 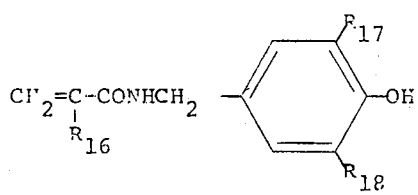

(10) 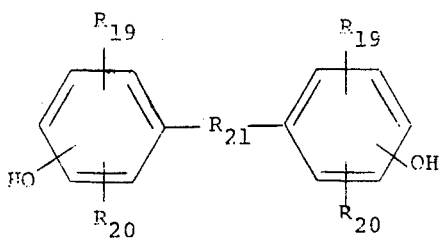

wherein:
$R_1$, $R_2$, $R_3$ = hydrogen atom or hydrocarbon radicals selected from the group consisting of alkyl radicals having 1 to 20 carbon atoms, cycloalkyl radicals having 4 to 20 carbon atoms, 1-alkyl cycloalkyl radicals containing alkyl radicals having 1 to 20 carbon atoms, and 1-alkyl benzyl radicals containing alkyl radicals having 1 to 20 carbon atoms at least two of $R_1$, $R_2$, $R_3$ = hydrocarbon radicals
$R_9$ = alkyl radicals having 1 to 6 carbon atoms
$R_{10}$, $R_{11}$ = hydrogen atom or hydrocarbon radicals selected from the group consisting of alkyl radicals having 1 to 20 carbon atoms, cycloalkyl radicals having 4 to 20 carbon atoms, alkyl-substituted cycloalkyl radicals having 5 to 20 carbon atoms and aralkyl radicals having 7 to 20 carbon atoms or alkoxy radicals having 1 to 20 carbon atoms at least one of $R_{10}$, $R_{11}$ = hydrocarbon radicals
$R_{16}$ = hydrogen atom or methyl radical
$R_{17}$, $R_{18}$ = alkyl radicals having 1 to 4 carbon atoms
$R_{19}$, $R_{20}$ = hydrogen atom, alkyl radicals having 1 to 12 carbon atoms, cycloalkyl radicals having 4 to 20 carbon atoms, aryl radicals having 6 to 20 carbon atoms, 1-alkyl cycloalkyl radicals containing alkyl radicals having 1 to 12 carbon atoms or 1-alkylbenzyl radicals containing alkyl radicals having 1 to 12 carbon atoms
$R_{21}$ = alkylidene radicals having 2 to 12 carbon atoms
x = an integer of 1 to 6
y = an integer of 1 to 3.

23. High heat stability compositions according to claim 3, wherein the phenolic compounds are selected from among compounds whose chemical structures may be expressed by the general formulas:

(1) 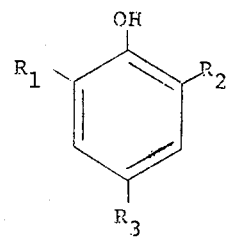

(5) 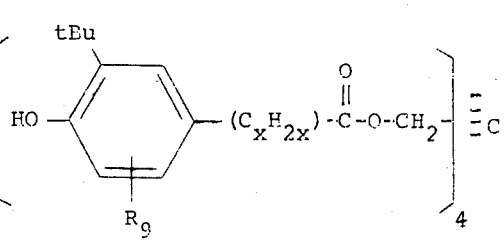

(6) 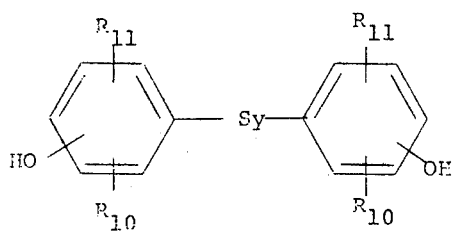

(9) 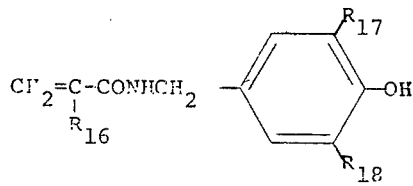

(10) 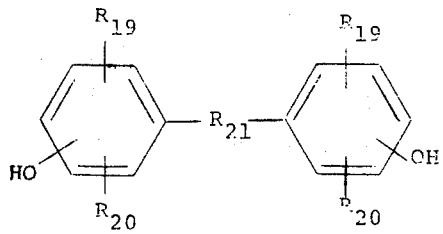

wherein:

$R_1$, $R_2$, $R_3$ = hydrogen atom or hydrocarbon radicals selected from the group consisting of alkyl radicals having 1 to 20 carbon atoms, cycloalkyl radicals having 4 to 20 carbon atoms, 1-alkyl cycloalkyl radicals containing alkyl radicals having 1 to 20 carbon atoms, and 1-alkyl benzyl radicals containing alkyl radicals having 1 to 20 carbon atoms at least two of R, $R_2$, $R_3$ = hydrocarbon radicals $R_9$ = alkyl radicals having 1 to 6 carbon atoms $R_{10}$, $R_{11}$ = hydrogen atom or hydrocarbon radicals selected from the group consisting of alkyl radicals having 1 to 20 carbon atoms, cycloalkyl radicals having 4 to 20 carbon atoms, alkyl-substituted cycloalkyl radicals having 5 to 20 carbon atoms and aralkyl radicals having 7 to 20 carbon atoms or alkoxy radicals having 1 to 20 carbon atoms at least one of $R_{10}$, $R_{11}$ = hydrocarbon radicals $R_{16}$ = hydrogen atom or methyl radical $R_{17}$, $R_{18}$ = alkyl radicals having 1 to 4 carbon atoms $R_{19}$, $R_{20}$ = hydrogen atom, alkyl radicals having 1 to 12 carbon atoms, cycloalkyl radicals having 4 to 20 carbon atoms, aryl radicals having 6 to 20 carbon atoms, 1-alkyl cycloalkyl radicals containing alkyl radicals having 1 to 12 carbon atoms or 1-alkylbenzyl radicals containing alkyl radicals having 1 to 12 carbon atoms $R_{21}$ = alkylidene radicals having 2 to 12 carbon atoms or alkylene radicals having 2 to 12 carbon atoms x = an integer of 1 to 6 y = an integer of 1 to 3.

24. High heat stability compositions according to claim 4, wherein the phenolic compounds are selected from among compounds whose chemical structures may be expressed by the general formulas:

(1) 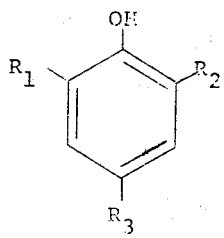

(5) 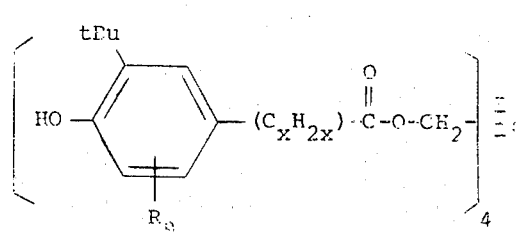

(6) 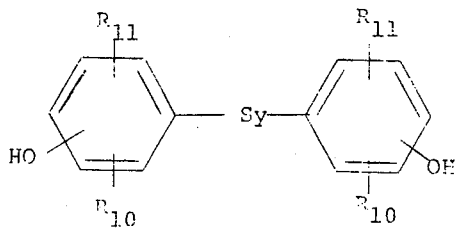

(9) 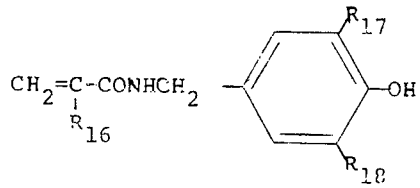

(10) 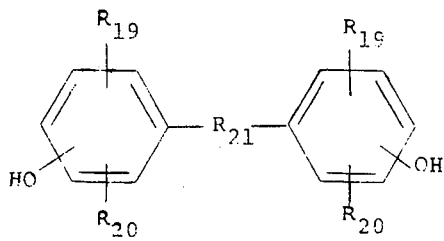

wherein:
R$_1$, R$_2$, R$_3$ = hydrogen atom or hydrocarbon radicals selected from the group consisting of alkyl radicals having 1 to 20 carbon atoms, cycloalkyl radicals having 4 to 20 carbon atoms, 1-alkyl cycloalkyl radicals containing alkyl radicals having 1 to 20 carbon atoms, and 1-alkyl benzyl radicals containing alkyl radicals having 1 to 20 carbon atoms at least two of R$_1$, R$_2$, R$_3$ = hydrocarbon radicals R$_9$ = alkyl radicals having 1 to 6 carbon atoms R$_{10}$, R$_{11}$ = hydrogen atom or hydrocarbon radicals selected from the group consisting of alkyl radicals having 1 to 20 carbon atoms, cycloalkyl radicals having 4 to 20 carbon atoms, alkyl-substituted cycloalkyl radicals having 5 to 20 carbon atoms and aralkyl radicals having 7 to 20 carbon atoms or alkoxy radicals having 1 to 20 carbon atoms at least one of R$_{10}$, R$_{11}$ = hydrocarbon radicals R$_{16}$ = hydrogen atom or methyl radical R$_{17}$, R$_{18}$ = alkyl radicals having 1 to 4 carbon atoms R$_{19}$, R$_{20}$ = hydrogen atom, alkyl radicals having 1 to 12 carbon atoms, cycloalkyl radicals having 4 to 20 carbon atoms, aryl radicals having 6 to 20 carbon atoms, 1-alkyl cycloalkyl radicals containing alkyl radicals having 1 to 12 carbon atoms or 1-alkylbenzyl radicals containing alkyl radicals having 1 to 12 carbon atoms R$_{21}$ = alkylidene radicals having 2 to 12 carbon atoms or alkylene radicals having 2 to 12 carbon atoms x = an integer of 1 to 6 y = an integer of 1 to 3.

25. High heat stability compositions according to claim 1, wherein the thioethers of carboxylic esters are compounds which contain a radical of R having 10 to 18 carbon atoms, and wherein n is an integer of 2 to 4 associated with said thioethers.

26. High heat stability compositions according to claim 2, wherein the thioethers of carboxylic esters are compounds which contain a radical of R having 10 to 18 carbon atoms, and wherein n is an integer of 2 to 4 associated with said thioethers.

27. High heat stability compositions according to claim 3, wherein the thioethers of carboxylic esters are compounds which contain a radical of R having 10 to 18 carbon atoms, and wherein n is an integer of 2 to 4 associated with said thioethers.

28. High heat stability compositions according to claim 4, wherein the thioethers of carboxylic esters are compounds which contain a radical of R having 10 to 18 carbon atoms, and wherein n is an integer of 2 to 4 associated with said thioethers.

29. High heat stability compositions according to claim 5, wherein the phosphite compounds are those containing radicals of R'$_1$, R'$_2$, R'$_3$ each having 8 to 12 carbon atoms, radicals of R'$_4$+ R'$_5$ having 6 to 18 carbon atoms in total, and radicals of R'$_6$+ R'$_7$ having 6 to 18 carbon atoms in total.

30. High heat stability compositions according to claim 6, wherein the phosphite compounds are those containing radicals of R'$_1$, R'$_2$, R'$_3$ each having 8 to 12 carbon atoms, radicals of R'$_4$+ R'$_5$ having 6 to 18 carbon atoms in total, and radicals of R'$_6$+ R'$_7$ having 6 to 18 carbon atoms in total.

31. High heat stability compositions according to claim 7, wherein the phosphite compounds are those containing radicals of R'$_1$, R'$_2$, R'$_3$ each having 8 to 12 carbon atoms, radicals of R'$_4$+ R'$_5$ having 6 to 18 carbon atoms in total, and radicals of R'$_6$+ R'$_7$ having 6 to 18 carbon atoms in total.

32. High heat stability compositions according to claim 8, wherein the phosphite compounds are those containing radicals of R'$_1$, R'$_2$, R'$_3$ each having 8 to 12 carbon atoms, radicals of R'$_4$+ R'$_5$ having 6 to 18 carbon atoms in total, and radicals of R'$_6$+ R'$_7$ having 6 to 18 carbon atoms in total.

* * * * *